United States Patent
Suwa et al.

(10) Patent No.: US 9,366,910 B2
(45) Date of Patent: Jun. 14, 2016

(54) LIQUID CRYSTAL DISPLAY AND METHOD OF MANUFACTURING THE SAME

(75) Inventors: Shunichi Suwa, Kanagawa (JP); Yuichi Inoue, Kanagawa (JP); Ryo Ogawa, Tokyo (JP); Tsuyoshi Kamada, Kanagawa (JP); Masashi Miyakawa, Tokyo (JP); Tadaaki Isozaki, Kanagawa (JP); Masahiko Nakamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 250 days.

(21) Appl. No.: 13/145,077

(22) PCT Filed: Jan. 22, 2010

(86) PCT No.: PCT/JP2010/050784
§ 371 (c)(1),
(2), (4) Date: Jul. 18, 2011

(87) PCT Pub. No.: WO2010/087281
PCT Pub. Date: Aug. 5, 2010

(65) Prior Publication Data
US 2011/0273652 A1 Nov. 10, 2011

(30) Foreign Application Priority Data

Jan. 30, 2009 (JP) ................. 2009-020654
Sep. 1, 2009 (JP) ................. 2009-201925
Sep. 30, 2009 (JP) ................. 2009-228727
Dec. 22, 2009 (JP) ................. 2009-290980

(51) Int. Cl.
*C09K 19/00* (2006.01)
*G02F 1/1337* (2006.01)
(Continued)

(52) U.S. Cl.
CPC ...... *G02F 1/133788* (2013.01); *C08G 73/1075* (2013.01); *G02F 1/133711* (2013.01);
(Continued)

(58) Field of Classification Search
CPC .............. G02F 1/133711; G02F 1/133723; G02F 1/13378; G02F 1/133788; G02F 1/133707; C08G 73/1075; C08G 73/1042; C08G 73/1025; Y10T 428/10; Y10T 428/1005; Y10T 428/1018; Y10T 428/1023
USPC ........ 428/1.1, 1, 2, 1.25, 1.26, 1.27; 349/123, 349/127, 130; 430/20, 287.1; 252/299.01, 252/299.4; 528/335, 345
See application file for complete search history.

(56) References Cited

U.S. PATENT DOCUMENTS 6,340,506 B1   1/2002   Buchecker et al.
6,501,524 B1   12/2002  Yoshida et al.
(Continued)

FOREIGN PATENT DOCUMENTS

CN   1395593 A   2/2003
CN   1869779 A   11/2006
(Continued)

OTHER PUBLICATIONS

Extended European Search Report for EP application No. 10735749.3 dated Feb. 14, 2013.
(Continued)

*Primary Examiner* — Ruiyun Zhang
(74) *Attorney, Agent, or Firm* — Dentons US LLP

(57) ABSTRACT

A method of manufacturing a liquid crystal display element capable of easily improving response characteristics without using a large apparatus is provided. After alignment films 22 and 32 made of a polymer compound including a crosslinkable functional group as a side chain and a bulky skeleton such as an adamantane skeleton are formed in a TFT substrate 20 and a CF substrate 30, the alignment films 22 and 32 are arranged to face each other, and a liquid crystal layer 40 including liquid crystal molecules 41 is sealed between the alignment films 22 and 32, and then, in a state where the liquid crystal molecules 41 are aligned to allow long-axis directions thereof to be oblique with respect to a substrate surface, the polymer compound in the alignment films 22 and 32 is reacted to form a polymer compound including a cross-linked structure, and predetermined pretilts are provided to liquid crystal molecules 41A and 41B placed in proximity to the alignment films 22 and 32, respectively.

7 Claims, 11 Drawing Sheets

(51) Int. Cl.
  *C08G 73/10* (2006.01)
  *G02F 1/137* (2006.01)
(52) U.S. Cl.
  CPC . *G02F1/133707* (2013.01); *G02F 2001/13712* (2013.01); *G02F 2001/133715* (2013.01); *Y10T 428/10* (2015.01); *Y10T 428/1023* (2015.01)

(56) References Cited

U.S. PATENT DOCUMENTS

| | | | |
|---|---|---|---|
| 2003/0039768 A1* | 2/2003 | Buchecker et al. | 428/1 |
| 2004/0080685 A1 | 4/2004 | Yamada et al. | |
| 2006/0066544 A1* | 3/2006 | Sasaki et al. | 345/87 |

FOREIGN PATENT DOCUMENTS

| | | |
|---|---|---|
| JP | 04-350822 | 12/1992 |
| JP | 10-073821 | 3/1998 |
| JP | 10-087859 | 4/1998 |
| JP | 10-170921 | 6/1998 |
| JP | 10-232400 | 9/1998 |
| JP | 10-252646 | 9/1998 |
| JP | 11-133430 | 5/1999 |
| JP | 11-326638 | 11/1999 |
| JP | 2000-193976 | 7/2000 |
| JP | 2001-517719 | 10/2001 |
| JP | 2002-082336 | 3/2002 |
| JP | 2003-073471 | 3/2003 |
| JP | 2008225010 A * | 9/2008 |
| JP | 2008-262074 | 10/2008 |
| TW | 200702849 A | 1/2007 |
| WO | 97/44704 | 11/1997 |
| WO | 2006/121220 | 11/2006 |
| WO | WO/2008/117615 | 10/2008 |
| WO | WO 2008/117615 A1 | 10/2008 |

OTHER PUBLICATIONS

Extended European Search Report for EP application No. 11005869.0 dated Feb. 14, 2013.
Extended European Search Report for EP application No. 11005868.2 dated Feb. 14, 2013.
Extended European Search Report for EP application No. 10735750.1 dated Feb. 14, 2013.
International Search Report dated Apr. 20, 2010.
Chinese Office Action issued in connection with related Chinese Patent Application No. CN 201080013019.X dated Oct. 18, 2013.
Japanese Office Action issued in connection with related Japanese Patent Application No. 2009-290980 dated Jan. 21, 2014.
Japanese Office Action issued in connection with related Japanese Patent Application No. 2009-290979 dated Jan. 21, 2014.
Chinese Office Examination Report issued in connection with related Chinese Patent Application No. CN 201080013019.X dated Oct. 29, 2014.
Chinese Office Examination Report issued in connection with related Chinese Patent Application No. CN 201080013022.1 dated Nov. 4, 2014.
Japanese Office Examination Report issued in connection with related Japanese Patent Application No. 2014-057660 dated Apr. 28, 2015 with English translation.

* cited by examiner

LIQUID CRYSTAL DISPLAY AND METHOD OF MANUFACTURING THE SAME

TECHNICAL FIELD

The present invention relates to a liquid crystal display including a liquid crystal display element in which a liquid crystal layer is sealed between a pair of substrates including alignment films on facing surfaces thereof, and a method of manufacturing a liquid crystal display.

BACKGROUND ART

In recent years, as display monitors for liquid crystal televisions, notebook personal computers and car navigation systems, liquid crystal displays (LCDs) are frequently used. The liquid crystal displays are classified into various display modes (systems) depending on molecular arrangement (alignment) of liquid crystal molecules included in a liquid crystal layer sandwiched between substrates. As a display mode, for example, a TN (Twisted Nematic) mode in which liquid crystal molecules are twisted to be aligned in a state where no voltage is applied is well known. In the TN mode, liquid crystal molecules have positive dielectric anisotropy, that is, a property in which the dielectric constants in a long-axis direction of the liquid crystal molecules are larger than those in a short-axis direction. Therefore, the liquid crystal molecules are configured to be aligned in a direction perpendicular to a substrate surface in a plane parallel to the substrate surface while sequentially turning the alignment directions of the liquid crystal molecules.

On the other hand, a VA (Vertical Alignment) mode in which liquid crystal molecules are aligned perpendicularly with respect to a substrate surface in a state where no voltage is applied attracts increasing attention. In the VA mode, liquid crystal molecules have negative dielectric anisotropy, that is, a property in which dielectric constants in a long-axis direction of liquid crystal molecules are smaller than those in a short-axis direction, and a wider viewing angle than that in the TN mode is achievable.

Such a VA mode liquid crystal display has a configuration in which when a voltage is applied, liquid crystal molecules aligned in a direction perpendicular to a substrate are turned in a direction parallel to the substrate in response to the application of the voltage by negative dielectric anisotropy, thereby allowing light to pass therethrough. However, as the liquid crystal molecules aligned in the direction perpendicular to the substrate are turned in an arbitrary direction, the liquid crystal molecules are misaligned by the application of the voltage to cause deterioration of response characteristics with respect to voltage.

Therefore, to improve response characteristics, a technique of limiting a direction where liquid crystal molecules are turned in response to a voltage has been studied. More specifically, a technique (photo-alignment film technique) of providing a pretilt angle to liquid crystal molecules with use of an alignment film formed by applying linearly-polarized light of ultraviolet light, or applying ultraviolet light in an oblique direction with respect to a substrate surface, and the like have been studied. As the photo-alignment film technique, for example, there is known a technique of forming an alignment film by applying linearly-polarized light of ultraviolet light or applying ultraviolet light in an oblique direction with respect to a substrate surface to a film made of a polymer including a chalcone structure to cross-link a double bond portion in the chalcone structure (refer to PTLs 1 to 3). Moreover, in addition to this, there is a technique of forming an alignment film with use of a mixture of a vinyl cinnamate derivative polymer and a polyimide (refer to PTL 4). Further, a technique of forming an alignment film by applying linearly-polarized light with a wavelength of 254 nm to a film including a polyimide to decompose a part of the polyimide (refer to PTL 5), or the like is known. Moreover, as a technique related to the photo-alignment film technique, there is a technique of forming a liquid crystal alignment film by forming a film made of a liquid crystal polymer compound on a film made of a polymer including a dichromatic photoreactive building block such as an azobenzene derivative irradiated with linearly-polarized light or oblique light (refer to PTL 6).

CITATION LIST

Patent Literature

[PTL 1] Japanese Patent Application Unexamined Publication No. H10-087859
[PTL 2] Japanese Patent Application Unexamined Publication No. H10-252646
[PTL 3] Japanese Patent Application Unexamined Publication No. 2002-082336
[PTL 4] Japanese Patent Application Unexamined Publication No. H10-232400
[PTL 5] Japanese Patent Application Unexamined Publication No. H10-073821
[PTL 6] Japanese Patent Application Unexamined Publication No. H11-326638

DISCLOSURE OF THE INVENTION

However, in a liquid crystal display element in related art which uses a technique of providing a pretilt to liquid crystal molecules, sufficient response characteristics are not obtained, and a further improvement is desired. Moreover, the above-described photo-alignment film technique has an issue that a large light irradiation apparatus such as an apparatus of applying linearly-polarized light or an apparatus of applying light in an oblique direction with respect to a substrate surface is necessary to form an alignment film. Further, there is an issue that to manufacture a liquid crystal display having multi-domains in which alignment of liquid crystal molecules are partitioned by arranging a plurality of sub-pixels in a pixel for the sake of achieving a wider viewing angle, while a larger apparatus is necessary, manufacturing steps are complicated. More specifically, in the liquid crystal display having multi-domains, an alignment film is formed so as to provide different pretilts for respective sub-pixels. Therefore, in the case where the above-described photo-alignment film technique is used to manufacture the liquid crystal display having multi-domains, light is applied to respective sub-pixels, and mask patterns for respective sub-pixels are necessary, so the light irradiation apparatus is still larger.

The present invention is made to solve the above-described issues, and it is a first object of the invention to provide a liquid crystal display including a liquid crystal display element capable of improving response characteristics. Moreover, it is a second object of the invention to provide a method of manufacturing a liquid crystal display capable of easily improving response characteristics without using a large apparatus.

A liquid crystal display according to a first mode of the invention for achieving the above-described first object includes:
a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") including a polymer compound with a side chain cross-linked, the polymer compound including a crosslinkable functional group as a side chain and including one or more kinds of skeletons represented by expressions (1) to (11) in a main chain, and the compound (compound-subjected-to-alignment-process) with the side chain cross-linked provides a pretilt to liquid crystal molecules. Moreover, a liquid crystal display element according to a first mode for achieving the above-described first object is configured of the liquid crystal display element in the liquid crystal display according to the first mode of the invention. Herein, "crosslinkable functional group" means a group capable of forming a cross-linked structure.

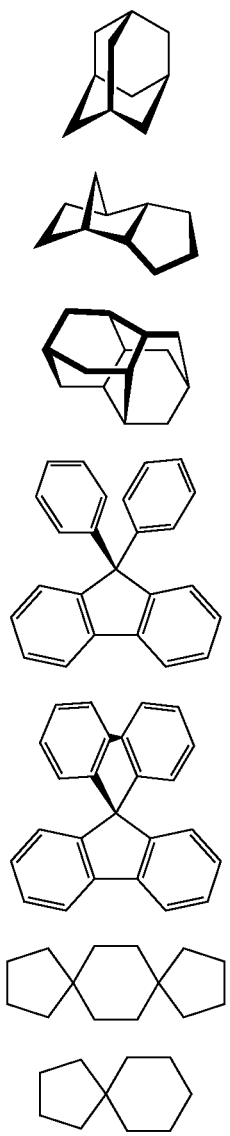

(8)

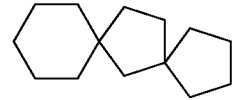

(9)

(10)

(11)

A liquid crystal display according to a second mode of the invention for achieving the above-described first object includes:

a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") including a polymer compound with a side chain cross-linked, the polymer compound including a crosslinkable functional group as a side chain and including, in a main chain, (a) a skeleton structure in which two or more planar structures are twisted around one another, or (b) a skeleton structure in which two or more eight or less-membered ring steric structures are twisted around one another, and the compound (compound-subjected-to-alignment-process) with the side chain cross-linked provides a pretilt to liquid crystal molecules. Moreover, a liquid crystal display element according to a second mode for achieving the above-described first object is configured of the liquid crystal display element in the liquid crystal display according to the second mode of the invention.

A liquid crystal display according to a third mode of the invention for achieving the above-described first object includes:

a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") including a polymer compound with a side chain cross-linked, the polymer compound including a crosslinkable functional group as a side chain and including, in a main chain, (a) an adamantane homolog, (b) a spiro compound, or (c) a structure represented by an expression (21) in which two or more ring structures are included and two or more of the ring structures share two or more atoms, and the compound (compound-subjected-to-alignment-process) with the side chain cross-linked provides a pretilt to liquid crystal molecules. Moreover, a liquid crystal display element according to a third mode for achieving the above-described first object is configured of the liquid crystal display element in the liquid crystal display according to the third mode of the invention.

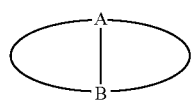

(21)

where A and B are trivalent or higher valent organic groups which are the same as or different from each other.

A liquid crystal display according to a fourth mode of the invention for achieving the above-described first object includes:

a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") with a side chain cross-linked, the compound including a crosslinkable functional group as a side chain and including a polyimide compound in a main chain, the polyimide compound being configured of one or both of compounds represented by expressions (31) and (32) as precursor diamines, and the compound (compound-subjected-to-alignment-process) with the side chain cross-linked provides a pretilt to liquid crystal molecules. Moreover, a liquid crystal display element according to a fourth mode for achieving the above-described first object is configured of the liquid crystal display element in the liquid crystal display according to the fourth mode of the invention.

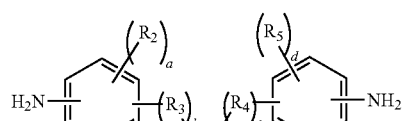

(31)

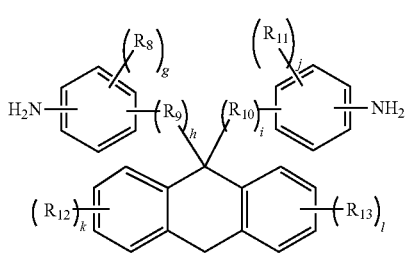

(32)

where R2, R5, R6 and R7 are alkyl groups, alkoxy groups or halogen atoms which are the same as or different from one another, R3 and R4 are divalent organic groups which are the same as or different from each other, a, d, e and f each are an integer of 0 to 4 both inclusive, b and c each are 0 or 1, R8, R11, R12 and R13 are alkyl groups, alkoxy groups or halogen atoms which are the same as or different from one another, R9 and R10 are divalent organic groups which are the same as or different from each other, g, j, k and l each are an integer of 0 to 4 both inclusive, and h and i each are 0 or 1.

A liquid crystal display according to a fifth mode of the invention for achieving the above-described first object includes:

a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") including a photosensitive functional group as a side chain and including one or more of skeletons represented by expressions (1) to (11) in a main chain, and the compound (compound-subjected-to-alignment-process) provides a pretilt to liquid crystal molecules. Moreover, a liquid crystal display element according to a fifth mode for achieving the above-described first object is configured of the liquid crystal display element in the liquid crystal display according to the fifth mode of the invention. Herein, "photosensitive functional group" means a group capable of absorbing an energy ray.

A liquid crystal display according to a sixth mode of the invention for achieving the above-described first object includes:

a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") including a photosensitive functional group as a side chain and including, in a main chain, (a) a skeleton structure in which two or more planar structures are twisted around one another, or (b) a skeleton structure in which two or more eight or less-membered ring steric structures are twisted around one another, and the compound (compound-subjected-to-alignment-process) provides a pretilt to liquid crystal molecules. Moreover, a liquid crystal display element according to a sixth mode for achieving the above-described first object is configured of the liquid crystal display element in the liquid crystal display according to the sixth mode of the invention.

A liquid crystal display according to a seventh mode of the invention for achieving the above-described first object includes:

a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") including a photosensitive functional group as a side chain and including, in a main chain, (a) an adamantane homolog, (b) a spiro compound, or (c) a structure represented by an expression (21) in which two or more ring structures are included and two or more of the ring structures share two or more atoms, and the compound (compound-subjected-to-alignment-process) provides a pretilt to liquid crystal molecules. Moreover, a liquid crystal display element according to a seventh mode for achieving the above-described first object is configured of the liquid crystal display element in the liquid crystal display according to the seventh mode of the invention.

A liquid crystal display according to an eighth mode of the invention for achieving the above-described first object includes:

a liquid crystal display element including a pair of alignment films and a liquid crystal layer including liquid crystal molecules, the pair of alignment films arranged on facing surfaces of a pair of substrates, the liquid crystal layer arranged between the pair of alignment films, in which one or both of the pair of alignment films include a compound (for the sake of convenience, referred to as "compound-subjected-to-alignment-process") including a photosensitive functional group as a side chain and including a polyimide compound in a main chain, the polyimide compound being configured of one or both of compounds represented by expressions (31) and (32) as precursor diamines, and the compound (compound-subjected-to-alignment-process) provides a pretilt to liquid crystal molecules. Moreover, a liquid crystal display element according to an eighth mode for achieving the above-described first object is configured of the liquid crystal display element in the liquid crystal display according to the eighth mode of the invention.

A method of manufacturing a liquid crystal display (or method of manufacturing a liquid crystal display element) according to a first mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group as a side chain and including, in a main chain, one or more kinds of skeletons represented by expressions (1) to (11);

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of cross-linking a side chain of the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a second mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group as a side chain and including, in a main chain, (a) a skeleton structure in which two or more planar structures are twisted around one another, or (b) a skeleton structure in which two or more eight or less-membered ring steric structures are twisted around one another;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of cross-linking a side chain of the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a third mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group as a side chain and including, in a main chain, (a) an adamantane homolog, (b) a spiro compound, or (c) a structure represented by an expression (21) in which two or more ring structures are included and two or more of the ring structures share two or more atoms;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of cross-linking a side chain of the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a fourth mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group as a side chain and including a polyimide compound as a main chain, the polyimide compound being configured of one or both of compounds represented by expressions (31) and (32) as precursor diamines;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of cross-linking a side chain of the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a fifth mode of the invention for achieving the above-described second object includes:

a step of forming, on one of a pair of substrates, a first alignment film made of a polymer compound (for the sake of convenience, referred to as "compound-to-be-subjected-to-alignment-process") including a photosensitive functional group as a side chain and including, in a main chain, one or more kinds of skeletons represented by expressions (1) to (11);

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of deforming the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a sixth mode of the invention for achieving the above-described second object includes:

a step of forming, on one of a pair of substrates, a first alignment film made of a polymer compound (for the sake of convenience, referred to as "compound-to-be-subjected-to-alignment-process") including a photosensitive functional group as a side chain and including, in a main chain, (a) a skeleton structure in which two or more planar structures are twisted around one another, or (b) a skeleton structure in which two or more eight or less-membered ring steric structures are twisted around one another;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of deforming the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a seventh mode of the invention for achieving the above-described second object includes:

a step of forming, on one of a pair of substrates, a first alignment film made of a polymer compound (for the sake of convenience, referred to as "compound-to-be-subjected-to-alignment-process") including a photosensitive functional group as a side chain and including, in a main chain, (a) an adamantane homolog, (b) a spiro compound, or (c) a structure represented by an expression (21) in which two or more ring structures are included and two or more of the ring structures share two or more atoms;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of deforming the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to an eighth mode of the invention for achieving the above-described second object includes:

a step of forming, on one of a pair of substrates, a first alignment film made of a polymer compound (for the sake of convenience, referred to as "compound-to-be-subjected-to-alignment-process") including a photosensitive functional group as a side chain including a polyimide compound in a main chain, the polyimide compound being configured of one or both of compounds represented by expressions (31) and (32) as precursor diamines;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of deforming the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a ninth mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group or a photosensitive functional group as a side chain and including, in a main chain, one or more kinds of skeletons represented by expressions (1) to (11);

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of applying an energy ray to the polymer compound (compound-to-be-subjected-to-alignment-process) after sealing the liquid crystal layer, thereby providing a pretilt to liquid crystal molecules. Herein, as an energy ray, ultraviolet rays, X-rays, electron rays are applicable. The same applies to methods of manufacturing a liquid crystal display (or methods of manufacturing a liquid crystal display element) according to tenth to twelfth modes of the invention which will be described later.

A method of manufacturing a liquid crystal display (or method of manufacturing a liquid crystal display element) according to a tenth mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group or a photosensitive functional group as a side chain and including, in a main chain, (a) a skeleton structure in which two or more planar structures are twisted around one another, or (b) a skeleton structure in which two or more eight or less-membered ring steric structures are twisted around one another;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of applying an energy ray to the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to an eleventh mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group or a photosensitive functional group as a side chain and including, in a main chain, (a) an adamantane homolog, (b) a spiro compound, or (c) a structure represented by an expression (21) in which two or more ring structures are included and two or more of the ring structures share two or more atoms;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of applying an energy ray to the polymer compound (compound-to-be-subjected-to-alignment-process) after sealing the liquid crystal layer, thereby providing a pretilt to liquid crystal molecules.

A method of manufacturing a liquid crystal display (or method of manufacturing a liquid crystal display element) according to a twelfth mode of the invention for achieving the above-described second object includes:

a step of forming, on one of a pair of substrates, a first alignment film made of a polymer compound (for the sake of convenience, referred to as "compound-to-be-subjected-to-alignment-process") including a crosslinkable functional group or a photosensitive functional group as a side chain and including a polyimide compound in a main chain, the polyimide compound being configured of one or both of compounds represented by expressions (31) and (32) as precursor diamines;

a step of forming a second alignment film on the other of the pair of substrates;

a step of arranging the pair of substrates with the first alignment film and the second alignment film facing each other, and sealing a liquid crystal layer including liquid crystal molecules between the first alignment film and the second alignment film; and a step of applying an energy ray to the polymer compound (compound-to-be-subjected-to-alignment-process) after sealing the liquid crystal layer, thereby providing a pretilt to liquid crystal molecules.

In the liquid crystal displays (or the liquid crystal display elements) according to the first to fourth modes of the invention, a pair of alignment films may be configured to have the same composition. Moreover, in the methods of manufacturing a liquid crystal display (or the methods of manufacturing a liquid crystal display element) according to the first to twelfth modes of the invention including the above-described preferable structures, the second alignment film may be configured of a polymer compound (compound-to-be-subjected-to-alignment-process) forming the first alignment film. However, as long as the pair of alignment films are made of the polymer compounds (compounds-to-be-subjected-to-alignment-process) specified in the liquid crystal displays (or the liquid crystal display elements) according to the first to eighth modes of the invention and the methods of manufacturing a liquid crystal display (or the methods of manufacturing a liquid crystal display element) according to the first to twelfth modes of the invention process, the pair of alignment films may be configured to have different compositions, or the second alignment film may be configured of the polymer compound (compound-to-be-subjected-to-alignment-process) different from the polymer compound (compound-to-be-subjected-to-alignment-process) forming the first alignment film.

Moreover, in the liquid crystal displays (or the liquid crystal display elements) according to the first to third modes and the fifth to seventh modes of the invention including the above-described preferable structures and the methods of manufacturing a liquid crystal display (or the methods of manufacturing a liquid crystal display element) according to the first to third modes, the fifth to seventh modes and the ninth to eleventh modes of the invention, the main chain may include an imide bond in a repeating unit.

Further, in the liquid crystal displays (or the liquid crystal display elements) according to the first to eighth modes of the invention including the above-described preferable structures, the film density of one of the pair of alignment films may be $1.30 \text{ g/cm}^3$ or less, and in the methods of manufacturing a liquid crystal display (or the methods of manufacturing a liquid crystal display element) according to the first to twelfth modes of the invention including the above-described preferable structures, the film density of the first alignment film may be $1.30 \text{ g/cm}^3$ or less.

Moreover, in the liquid crystal displays (or the liquid crystal display elements) according to the first to eighth modes of the invention including the above-described preferable structures and configurations and the methods of manufacturing a liquid crystal display (or the methods of manufacturing a liquid crystal display element) according to the first to twelfth modes of the invention, the compound-subjected-to-alignment-process may include a structure aligning liquid crystal molecules in a predetermined direction with respect to a pair of substrates.

Further, in the liquid crystal displays (or the liquid crystal display elements) according to the first to eighth modes of the invention including the above-described preferable structures and configurations and the methods of manufacturing a liquid crystal display (or the methods of manufacturing a liquid crystal display element) according to the first to twelfth modes of the invention, the pair of substrates may be configured of a substrate including a pixel electrode and a substrate including a facing electrode, and liquid crystal molecules may have negative dielectric anisotropy.

Moreover, in the liquid crystal displays (or the liquid crystal display elements) according to the first to eighth modes of the invention including the above-described preferable structures and configurations and the methods of manufacturing a liquid crystal display (or the methods of manufacturing a liquid crystal display element) according to the first to twelfth modes of the invention, in one or both of the pair of substrates, an electrode having a slit or a projection (a pair of alignment films) may be provided on the liquid crystal layer side.

Further, in the methods of manufacturing a liquid crystal display (or the methods of manufacturing a liquid crystal display element) according to the first to fourth modes of the invention including the above-described preferable structures and configurations, while liquid crystal molecules are aligned by applying a predetermined electric field to the liquid crystal layer, the side chain of the polymer compound (compound-to-be-subjected-to-alignment-process) may be cross-linked by application of ultraviolet radiation. Moreover, in the methods of manufacturing a liquid crystal display (or the methods of manufacturing a liquid crystal display element) according to the fifth to eighth modes of the invention including the above-described preferable structures and configurations, while liquid crystal molecules are aligned by applying a predetermined electric field to the liquid crystal layer, the side chain of the polymer compound (compound-to-be-subjected-to-alignment-process) may be deformed by application of ultraviolet radiation. Further, in the methods of manufacturing a liquid crystal display (or the methods of manufacturing a liquid crystal display element) according to the ninth to twelfth modes of the invention including the above-described preferable structures and configurations, while liquid crystal molecules are aligned by applying a predetermined electric field to the liquid crystal layer, ultraviolet radiation may be applied to the polymer compound. Then, in these cases, while an electric field is applied to the liquid crystal layer to align liquid crystal molecules in an oblique direction with respect to one or both of the pair of substrates, ultraviolet radiation is preferably applied, and further, it is more preferable that the pair of substrates are configured of the substrate including the pixel electrode and the substrate including the facing electrode and ultraviolet radiation is applied from the substrate including the pixel electrode. Typically, a color filter is formed on the substrate including the facing electrode, and there is a possibility that the color filter absorbs ultraviolet radiation and reaction of the crosslinkable functional group of the alignment film material is less likely to occur; therefore, as described above, ultraviolet radiation is more preferably applied from the substrate including the pixel electrode where the color filter is not formed. In the case where the color filter is formed on the substrate including the pixel electrode, ultraviolet radiation is preferably applied from the substrate including the facing electrode. Note that basically, the azimuth angles (deviation angles) of the liquid crystal molecules to which a pretilt is provided are specified by the direction of the electric field, and the polar angles (zenith angles) thereof are specified by the strength of the electric field.

In the liquid crystal displays (or the liquid crystal display elements) according to the first to fourth modes of the invention, one or both of the pair of alignment films include a crosslinkable functional group as the side chain and a specific sterically bulky skeleton in a main chain, and a compound (compound-subjected-to-alignment-process) with a side chain cross-linked provides a pretilt to liquid crystal molecules. Therefore, by the cross-linked compound included in the alignment film, the response speed is improved, compared to the case where the compound (compound-subjected-to-alignment-process) including the polymer compound with the side chain cross-linked which is specified in any of the liquid crystal displays (or the liquid crystal display elements) according to the first to fourth modes of the invention is not included.

Moreover, in the liquid crystal displays (or the liquid crystal display elements) according to the fifth to eighth modes of the invention, one or both of the pair of alignment films include a photosensitive functional group as a side chain and a specific sterically bulky skeleton in a main chain, and a compound (compound-subjected-to-alignment-process) formed by deforming a polymer compound provides a pretilt to liquid crystal molecules. Therefore, by the compound included in the alignment film, the response speed is improved, compared to the case where the compound (compound-subjected-to-alignment-process) formed by deforming a polymer compound specified in any of the liquid crystal displays (or the liquid crystal display elements) according to the fifth to eighth modes of the invention is not included.

In the methods of manufacturing a liquid crystal display (or the methods of manufacturing a liquid crystal display element) according to the first to fourth modes of the invention, after the first alignment film including a crosslinkable functional group as a side chain and a specific polymer compound (compound-to-be-subjected-to-alignment-process) in a main chain is formed, the liquid crystal layer is sealed between the first alignment film and the second alignment film. In this case, liquid crystal molecules in the liquid crystal layer are aligned by the first alignment film and the second alignment film in a predetermined direction (for example, a horizontal direction, a perpendicular direction or an oblique direction) with respect to surfaces of both of the alignment films. Next, the crosslinkable functional group is reacted to cross-link the side chain of the polymer compound. Therefore, the pretilt is provided to liquid crystal molecules in proximity to the compound (compound-subjected-to-alignment-process) with the side chain cross-linked. In other words, when the side chain of the polymer compound (compound-to-be-subjected-to-alignment-process) is cross-linked in a state where the liquid crystal molecules are aligned, before sealing the liquid crystal layer, the pretilt is allowed to be provided to the liquid crystal molecules without application of linearly polarized light or light in an oblique direction to the alignment films; therefore, the response speed is improved easily. In addition, a sterically bulky skeleton is included in the main chain of the compound (compound-subjected-to-alignment-process) with the side chain cross-linked, so compared to the case where such a skeleton is not included, the response speed is improved.

Moreover, in the methods of manufacturing a liquid crystal display (or the methods of manufacturing a liquid crystal display element) according to the fifth to eighth modes of the invention, after the first alignment film including a photosensitive functional group as a side chain and a specific polymer compound (compound-to-be-subjected-to-alignment-process) in a main chain is formed, the liquid crystal layer is sealed between the first alignment film and the second alignment film. In this case, liquid crystal molecules in the liquid crystal layer are aligned by the first alignment film and the second alignment film in a predetermined direction (for example, a horizontal direction, a perpendicular direction or an oblique direction) with respect to surfaces of both of the alignment films. Next, the polymer compound is deformed. Therefore, the pretilt is provided to liquid crystal molecules in proximity to the compound (compound-subjected-to-alignment-process) formed by deforming the polymer compound. In other words, when the polymer compound (compound-to-be-subjected-to-alignment-process) is deformed in a state where the liquid crystal molecules are aligned, before sealing the liquid crystal layer, the pretilt is allowed to be provided to the liquid crystal molecules without application of linearly polarized light or light in an oblique direction to the alignment films; therefore, the response speed is improved easily. In addition, a sterically bulky skeleton is included in the main chain of the compound (compound-subjected-to-alignment-process) formed by deforming the polymer compound, so compared to the case where such a skeleton is not included, the response speed is improved.

Further, in the methods of manufacturing a liquid crystal display (or the methods of manufacturing a liquid crystal display element) according to the ninth to twelfth modes of the invention, after the first alignment film including a crosslinkable functional group or a photosensitive functional group as a side chain and a specific polymer compound (compound-to-be-subjected-to-alignment-process) in a main chain is formed, the liquid crystal layer is sealed between the first alignment film and the second alignment film. In this case, liquid crystal molecules in the liquid crystal layer are aligned by the first alignment film and the second alignment film in a predetermined direction (for example, a horizontal direction, a perpendicular direction or an oblique direction) with respect to surfaces of both of the alignment films. Next, an energy ray is applied to the polymer compound (compound-to-be-subjected-to-alignment-process). Therefore, the pretilt is provided to liquid crystal molecules in proximity to the compound (compound-subjected-to-alignment-process) with the cross-linked or deformed side chain. In other words, when an energy ray is applied to the polymer compound (compound-to-be-subjected-to-alignment-process) in a state where liquid crystal molecules are aligned before sealing the liquid crystal layer, the pretilt is allowed to be provided to liquid crystal molecules without application of linearly polarized light or light in an oblique direction with respect to the alignment films; therefore, the response speed is improved easily. In addition, a sterically bulky skeleton is included in the main chain of the compound (compound-subjected-to-alignment-process), so compared to the case where such a skeleton is not included, the response speed is improved.

BEST MODE(S) FOR CARRYING OUT THE INVENTION

The present invention will be described below based on embodiments and examples of the invention referring to the accompanying drawings; however, the invention is not limited to the embodiments and examples of the invention, and various values and materials in the embodiments and examples of the invention are intended to be illustrative. Note that descriptions will be given in the following order.
1. [Description of common structure and configuration in liquid crystal display of invention]
2. [Description of liquid crystal display of invention and method of manufacturing the same according to embodiments of invention]
3. [Description of liquid crystal display of invention and method of manufacturing the same according to examples, and others]

[Description of Common Structure and Configuration in Liquid Crystal Display (Liquid Crystal Display Element) of Invention]

Figure 1:
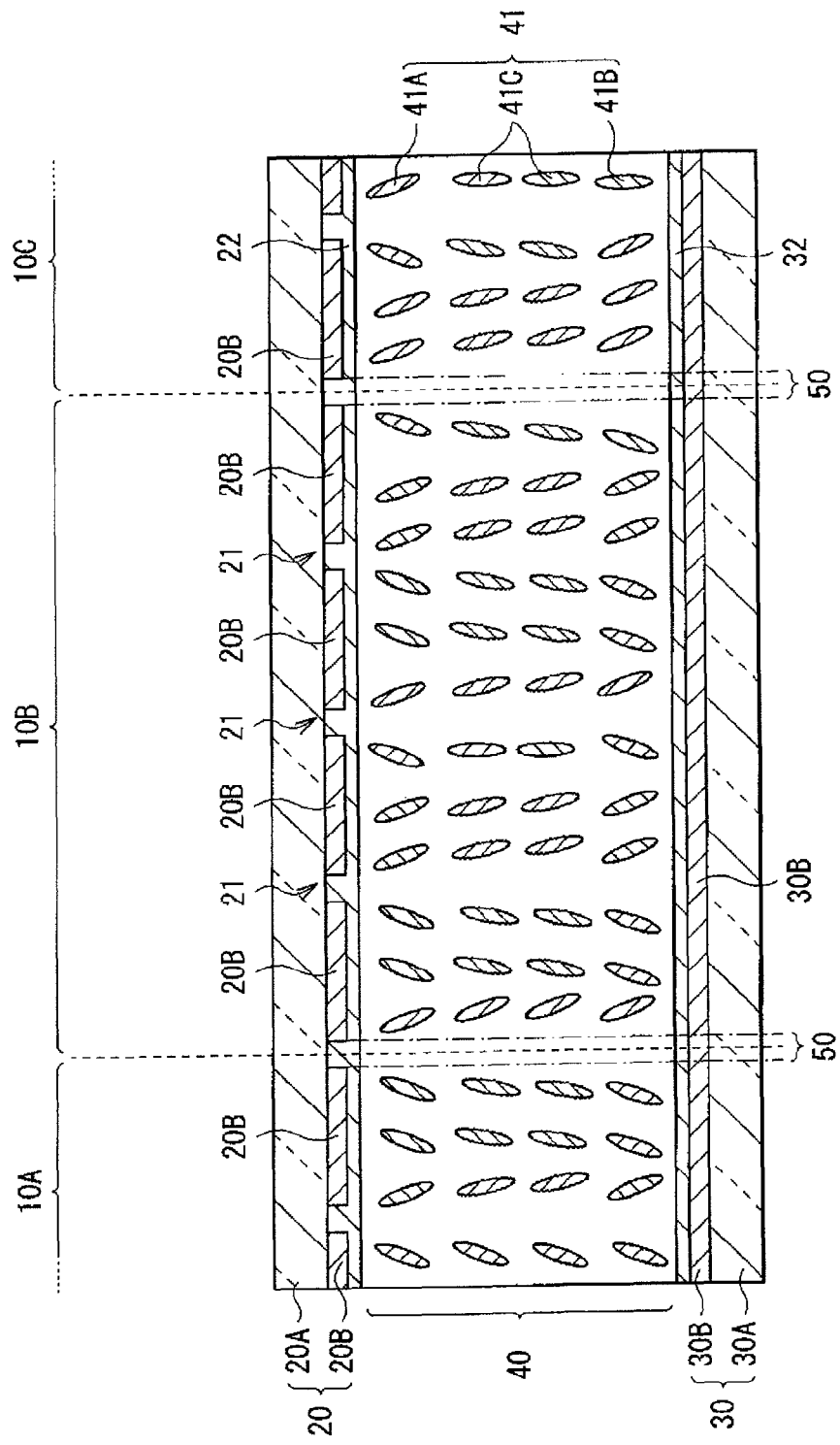
FIG. 1 is a partially schematic sectional view of a liquid crystal display of the invention.

A partially schematic sectional view of a liquid crystal display (or a liquid crystal display element) according to first to eighth modes of the invention is illustrated in FIG. 1. The liquid crystal display includes a plurality of pixels 10 (10A, 10B, 10C, . . . ). In the liquid crystal display (liquid crystal display element), a liquid crystal layer 40 including liquid crystal molecules 41 is arranged between a TFT (Thin Film Transistor) substrate 20 and a CF (Color Filter) substrate 30 with alignment films 22 and 32 in between. The liquid crystal display (liquid crystal display element) is of a so-called transmissive type, and a display mode thereof is a vertical alignment (VA) mode. In FIG. 1, a non-drive state where no drive voltage is applied is illustrated.

In the TFT substrate 20, for example, a plurality of pixel electrodes 20B are arranged in a matrix form on a surface facing the CF substrate 30 of a glass substrate 20A. Moreover, TFT switching elements which include a gate, a source, a drain and the like and drive a plurality of pixel electrodes 20B, respectively, and gate lines, source lines and the like (not illustrated) connected to the TFT switching elements are arranged. The pixel electrodes 20B are arranged for respective pixels electrically separated by a pixel separation section 50 on the glass substrate 20A, and is made of a material with transparency, for example, ITO (indium tin oxide). In the pixel electrode 20B in each pixel, for example, a slit section 21 (a section where an electrode is not formed) having a stripe-shaped or V-shaped pattern is arranged. Therefore, when a drive voltage is applied, an oblique electric field with respect to a long-axis direction of liquid crystal molecules 41 is generated, and regions with different alignment directions are formed in the pixel (multi-domain), thereby improving viewing angle characteristics. In other words, the slit section 21 is an alignment control section for controlling alignment of all liquid crystal molecules 41 in the liquid crystal layer 40 to secure favorable display characteristics, and in this case, the alignment directions of the liquid crystal molecules 41 during the application of the drive voltage are controlled by the slit section 21. As described above, basically, the azimuth angles of liquid crystal molecules to which a pretilt is provided is specified by the direction of an electric field, and the direction of the electric field is determined by the alignment control section.

In the CF substrate 30, a color filter (not illustrated) configured of, for example, stripe-shaped filters of red (R), green (G) and blue (B) and a facing electrode 30B are arranged on substantially the whole surface of an effective display region on a surface facing the TFT substrate 20 of the glass substrate 30A. As in the case of the pixel electrodes 20B, the facing electrode 30B is made of, for example, a material with transparency such as ITO.

The alignment film 22 is arranged on a surface on the liquid crystal layer 40 side of the TFT substrate 20 to cover the pixel electrodes 20B and the slit section 21 therewith. The alignment film 32 is arranged on a surface on the liquid crystal layer 40 side of the CF substrate 30 to cover the facing electrode 30B therewith. The alignment films 22 and 32 control the alignment of the liquid crystal molecules 41, and in this case, the alignment films 22 and 32 have a function of allowing the liquid crystal molecules 41 to be aligned in a direction perpendicular to a substrate surface, and a function of providing a pretilt to liquid crystal molecules 41 (41A and 41B) in proximity to the substrate. Note that in the liquid crystal display (liquid crystal display element) in FIG. 1, the slit section is not provided in the CF substrate 30.

Figure 8:
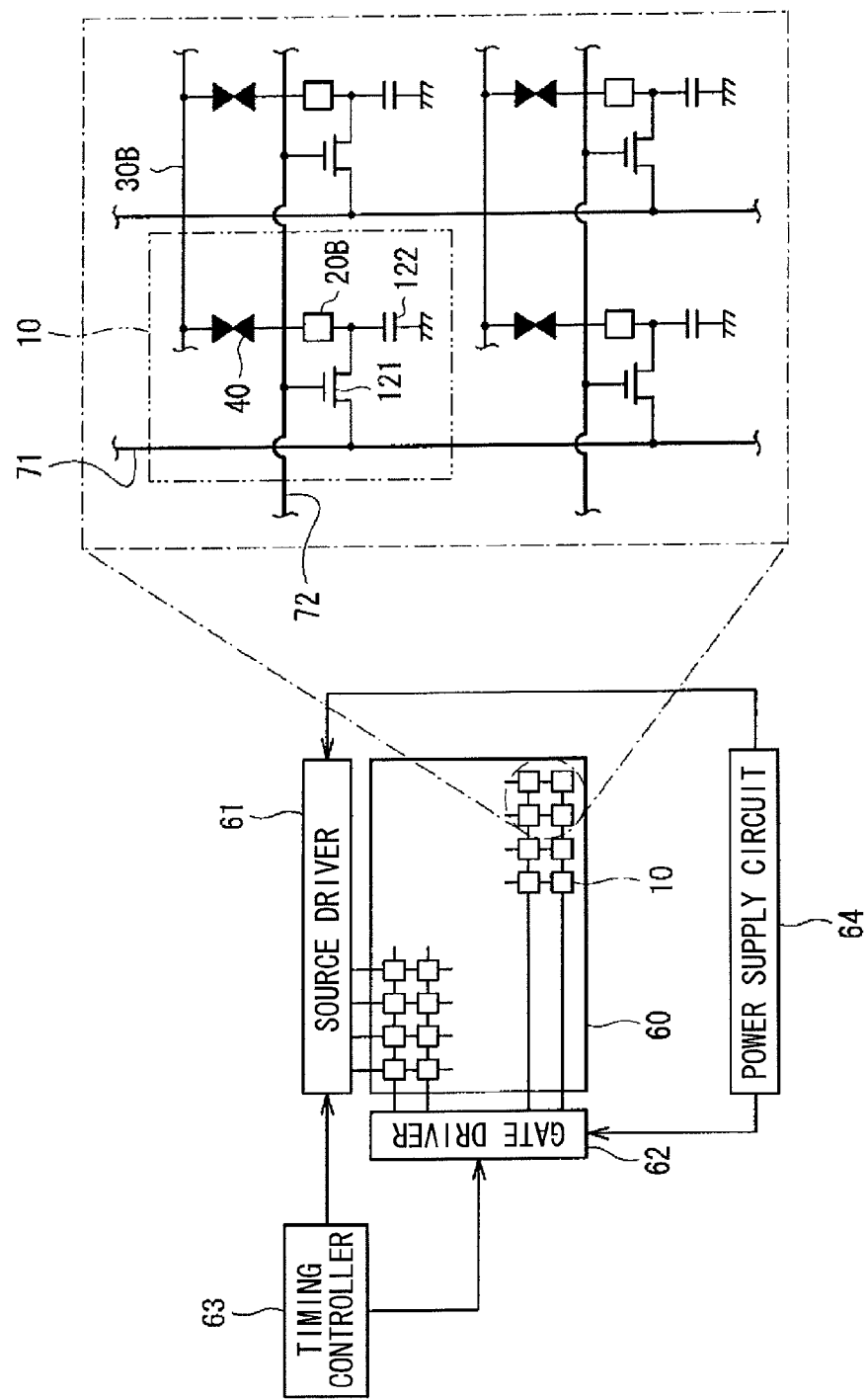
FIG. 8 is a circuit diagram of the liquid crystal display illustrated in FIG. 1.

FIG. 8 illustrates a circuit configuration of the liquid crystal display illustrated in FIG. 1.

As illustrated in FIG. 8, the liquid crystal display is configured by including a liquid crystal display element including a plurality of pixels 10 arranged in a display region 60. In the liquid crystal display, a source driver 61 and a gate driver 62, a timing controller 63 controlling the source driver 61 and the gate driver 62, and a power supply circuit 64 supplying power to the source driver 61 and the gate driver 62 are arranged around the display region 60.

The display region 60 is a region where a picture is displayed, and a region configured to be capable of displaying a picture by arranging a plurality of pixels 10 in a matrix form. Note that in FIG. 8, while the display region 60 including a plurality of pixels 10 is illustrated, an enlarged view of a region corresponding to four pixels 10 is separately illustrated.

In the display region 60, a plurality of source lines 71 are arranged in a row direction, and a plurality of gate lines 72 are arranged in a column direction, and pixels 10 are arranged in positions where the source lines 71 and the gate lines 72 intersect each other, respectively. Each of the pixels 10 is configured by including a transistor 121 and a capacitor 122 together with the pixel electrode 20B and the liquid crystal layer 40. In each transistor 121, a source electrode is connected to the source line 71, and a gate electrode is connected to the gate line 72, and a drain electrode is connected to the capacitor 122 and the pixel electrode 20B. Each of the source lines 71 is connected to the source driver 61 to receive a picture signal from the source driver 61. Each of the gate lines 72 is connected to the gate driver 62 to sequentially receive a scanning signal from the gate driver 62.

The source driver 61 and the gate driver 62 select a specific pixel 10 from the plurality of pixels 10.

The timing controller 63 transmits, to the source deriver 61, for example, a picture signal (for example, picture signals of RGB corresponding to red, green and blue) and a source driver control signal for controlling the operation of the source driver 61. Moreover, the timing controller 63 transmits, to the gate driver 62, a gate driver control signal for controlling the operation of the gate driver 62. Examples of the source driver control signal include a horizontal synchronization signal, a start pulse signal and a clock signal for source driver. Examples of the gate driver control signal include a vertical synchronization signal and a clock signal for gate driver.

In this liquid crystal display, when a drive voltage is applied between the pixel electrodes 20B and the facing electrode 30B in the following manner, a picture is displayed.

More specifically, the source driver 61 transmits a respective picture signal to a predetermined source line 71 based on a picture signal supplied from the timing controller 63 in response to an input of the source driver control signal from the timing controller 63. Concurrently, the gate driver 62 sequentially supplies a scanning signal to the gate lines 72 at predetermined timing in response to an input of the gate driver control signal from the timing controller 63. Therefore, a pixel 10 positioned at an intersection of the source line 71 to which the picture signal is supplied and the gate line 72 to which the scanning signal is supplied is selected, and a drive voltage is applied to the pixel 10.

Hereinafter the invention will be described based on embodiments of the invention (hereinafter referred to as "embodiments") and examples.

Embodiment 1

Embodiment 1 relates to VA mode liquid crystal displays (or liquid crystal display elements) according to first to fourth modes of the invention, methods of manufacturing a liquid crystal display (or a liquid crystal display element) according to first to fourth modes of the invention, and methods of manufacturing a liquid crystal display (or a liquid crystal display element) according to ninth to twelfth modes of the invention. Note that various descriptions in the following Embodiment 1 or various descriptions in Embodiments 2 to 4 which will be described later are applicable to VA mode liquid crystal displays (or liquid crystal display elements) according to fifth to eighth modes of the invention and methods of manufacturing a liquid crystal display (or a liquid crystal display element) according to fifth to eighth modes of the invention, except for a difference that a side chain is a photosensitive functional group.

In Embodiment 1, the alignment films 22 and 32 are configured by including one kind or two or more kinds of compounds with a side chain cross-linked (compounds-subjected-to-alignment-process). Then, a pretilt is provided to liquid crystal molecules by the cross-linked compound. In this case, the compound-subjected-to-alignment-process is formed by arranging the liquid crystal layer 40 after forming the alignment films 22 and 32 including one kind or two or more kinds of polymer compounds (compounds-to-be-subjected-to-alignment-process) with a main chain and a side chain, and then cross-linking the side chain or applying an energy ray to the polymer compound (compound-to-be-subjected-to-alignment-process), more specifically, reacting a crosslinkable functional group included in the side chain while applying an electric field or a magnetic field or applying an energy ray to the polymer compound (compound-to-be-subjected-to-alignment-process) while applying an electric field or a magnetic field. Then, the compound-subjected-to-alignment-process has a structure allowing liquid crystal molecules to be aligned in a predetermined direction (more specifically, an oblique direction) with respect to a pair of substrates (more specifically, the TFT substrate 20 and the CF substrate 30). Thus, when the compound-subjected-to-alignment-process is included in the alignment films 22 and 32 by cross-linking the polymer compound or by applying an energy ray to the polymer compound, a pretilt is allowed to be provided to liquid crystal molecules 41 in proximity to the alignment films 22 and 32; therefore, the response speed is increased, and display characteristics are improved.

The compound-to-be-subjected-to-alignment-process preferably includes a structure with high heat resistance as a main chain. Therefore, even though the liquid crystal display (liquid crystal display element) is exposed to a high-temperature environment, the compound-subjected-to-alignment-process in the alignment films 22 and 32 maintains alignment control capability for the liquid crystal molecules 41; therefore, display characteristics such as contrast are favorably maintained with response characteristics, and reliability is secured. In this case, the main chain preferably includes an imide bond in a repeating unit. Examples of a compound-to-be-subjected-to-alignment-process including an imide bond in a main chain include a polymer compound including a polyimide structure represented by an expression (41). The polymer compound including the polyimide structure represented by the expression (41) may be configured of one kind of polyimide structure represented by the expression (41), may include a plurality of kinds of polyimide structures represented by the expression (41) randomly connected to one another, or may include another structure in addition to the structure represented by the expression (41).

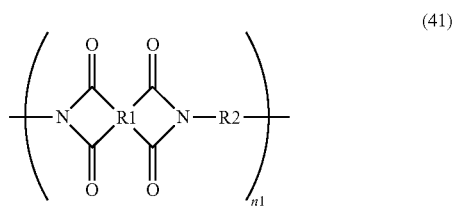

(41)

where R1 is a tetravalent organic group, R2 is a divalent organic group, and n1 is an integer of 1 or more.

R1 and R2 in the expression (41) are any tetravalent group configured by including carbon and any divalent group configured by including carbon, respectively; however, one of R1 and R2 preferably includes a crosslinkable functional group as a side chain. It is because in the compound-subjected-to-alignment-process, sufficient alignment control capability is easily obtained.

Moreover, in the compound-to-be-subjected-to-alignment-process, a plurality of side chains are bonded to the main chain, and it is only necessary for one or more of the plurality of side chains to include the crosslinkable functional group. In other words, the compound-to-be-subjected-to-alignment-process may include a side chain not exhibiting crosslinkability in addition to a side chain having crosslinkability. One kind or a plurality of kinds of side chains including the crosslinkable functional group may be included. The crosslinkable functional group may be any crosslinkable functional group, as long as the crosslinkable functional group is a functional group capable of undergoing cross-linking reaction after forming the liquid crystal layer 40, and may be a group forming a cross-linked structure by photoreaction or a group forming a cross-linked structure by thermal reaction, and in particular, a photoreactive crosslinkable functional group (a photosensitive group having photosensitivity) forming a cross-linked structure by photoreaction is preferable. It is because a liquid crystal display (liquid crystal display element) easily controlling the alignment of liquid crystal molecules 41 in a predetermined direction, improving response characteristics and having favorable display characteristics is easily manufactured.

Examples of photoreactive crosslinkable functional group (which is a photosensitive group having photosensitivity, for example, a photodimerized photosensitive group) include a group including one kind of structure selected from chalcone, cinnamate, cinnamoyl, coumarin, maleimide, benzophenone, norbornene, oryzanol and chitosan. Among them, examples of a group including a structure of chalcone, cinnamate or cinnamoyl include a group represented by an expression (51). When the compound-to-be-subjected-to-alignment-process with a side chain including the group represented by the expression (51) is cross-linked, for example, a structure represented by an expression (52) is formed. In other words, a compound-subjected-to-alignment-process formed from a polymer compound including the group represented by the expression (51) includes the structure which is represented by the expression (52) and has a cyclobutane skeleton. Note that, for example, a photoreactive crosslinkable functional group such as maleimide may exhibit not only photodimerization reaction but also a polymerization reaction in some cases. Therefore, the "crosslinkable functional group" includes not only a crosslinkable functional group exhibiting photodimerization reaction but also a crosslinkable functional group exhibiting polymerization reaction. In other words, in the invention, a concept of "cross-linking" includes not only photodimerization reaction but also polymerization reaction.

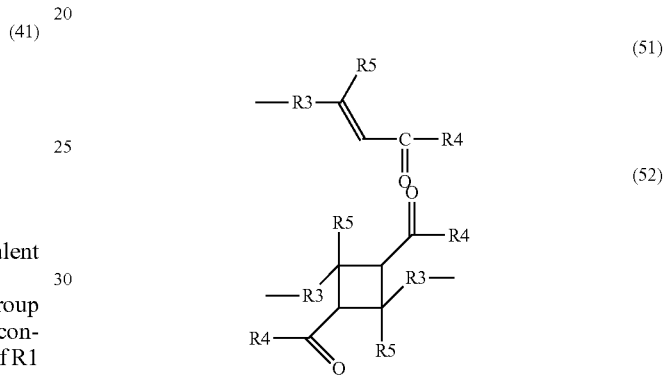

where R3 is a divalent group including an aromatic ring, R4 is a monovalent including one or two or more ring structures, R5 is a hydrogen atom, or an alkyl group or a derivative thereof.

R3 in the expression (51) is any divalent group including an aromatic ring such as a benzene ring, and may include, in addition to the aromatic ring, a carbonyl group, an ether bond, an ester bond or a hydrocarbon group. Moreover, R4 in the expression (51) is any monovalent group including one or two or more ring structures, and may include, in addition to the ring structure, a carbonyl group, an ether bond, an ester bond, a hydrocarbon group, a halogen atom, or the like. As the ring structure included in R4, any ring including carbon as an element forming a skeleton is included, and examples of the ring structure include an aromatic ring, heterocyclic ring and an aliphatic ring, or a ring structure formed by connecting or condensing them. R5 in the expression (51) is any of a hydrogen atom, or an alkyl group or a derivative thereof. In this case, "derivative" means a group in which some or all of hydrogen atoms included in an alkyl group are replaced with a substituent group such as a halogen atom. Moreover, the number of carbon atoms in the alkyl group introduced as R5 is any number. As R5, a hydrogen atom or a methyl group is preferable. It is because favorable crosslinkability is obtained.

R3 in the expression (52) may be the same as or different from one another. The same applies to R4 and R5 in the expression (51). Examples of R3, R4 and R5 in the expression (52) are the same as those of R3, R4 and R5 in the above-described expression (51).

Examples of the group represented by the expression (51) include groups represented by expressions (51-1) to (51-27). However, as long as the group has the structure represented by the expression (51), the group is not limited to the groups represented by the expressions (51-1) to (51-27).
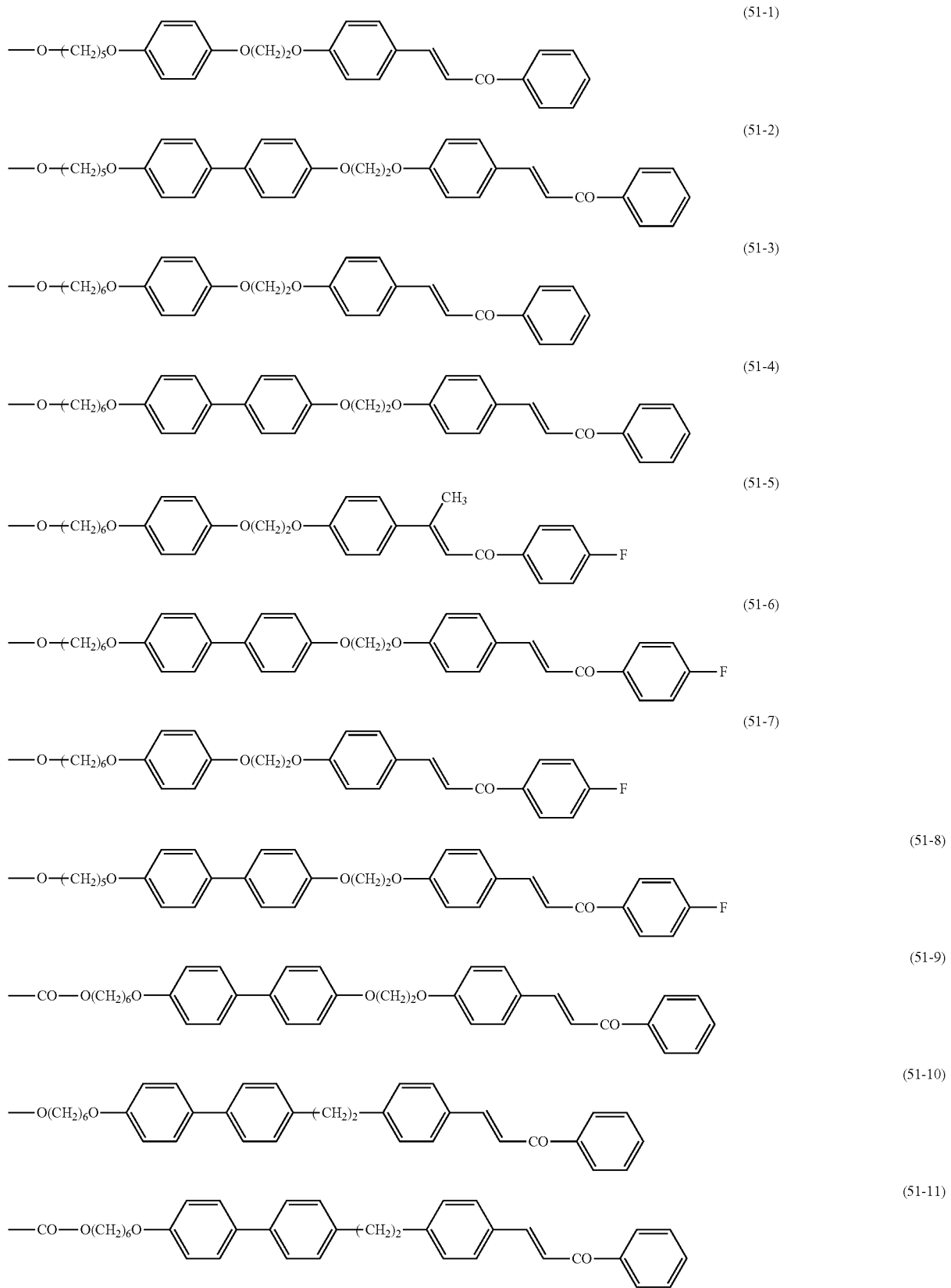

-continued
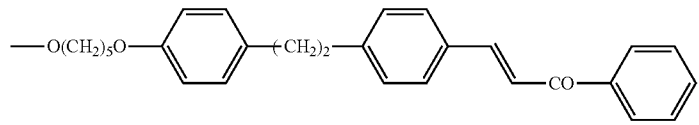
(51-12)
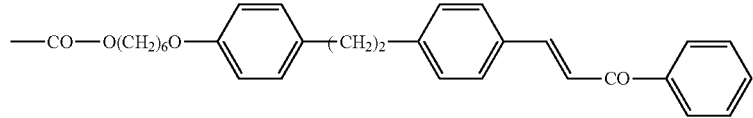
(51-13)
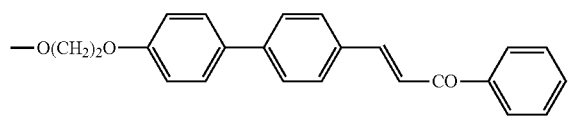
(51-14)
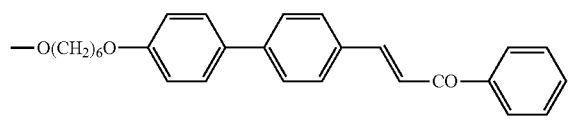
(51-15)
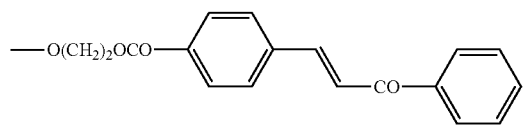
(51-16)
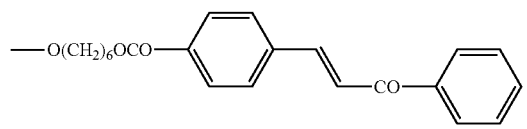
(51-17)
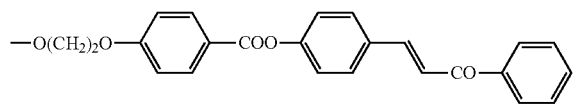
(51-18)
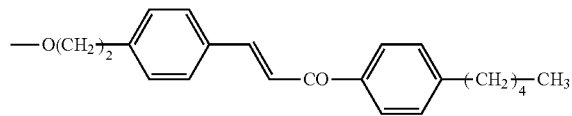
(51-19)
(51-20)
(51-21)
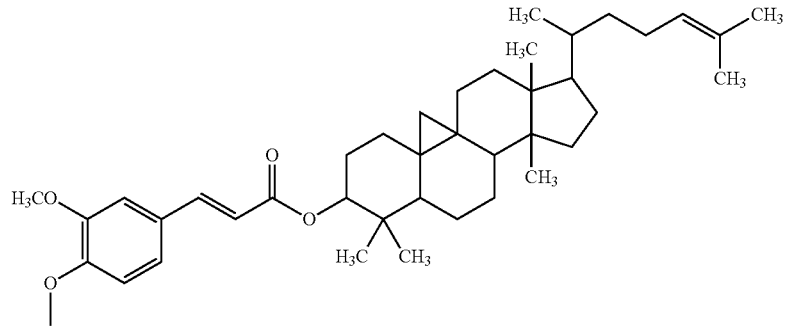
(51-22)
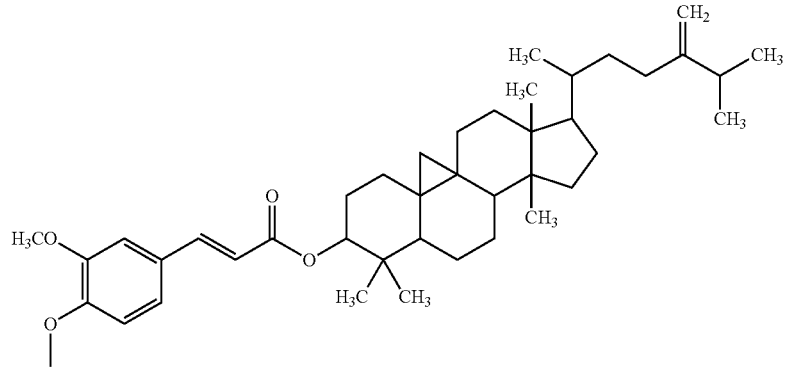

(51-23)
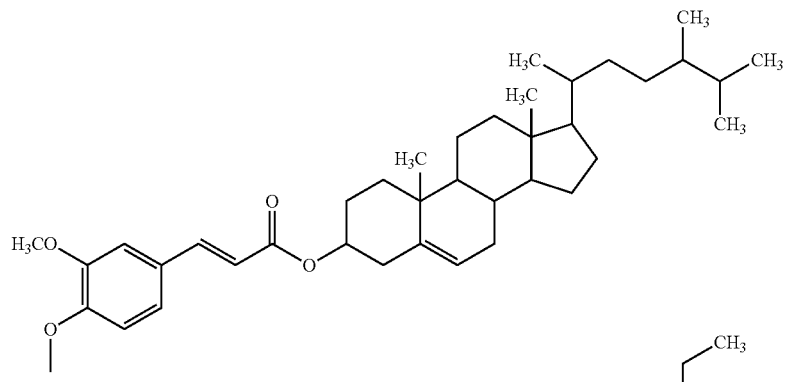
(51-24)
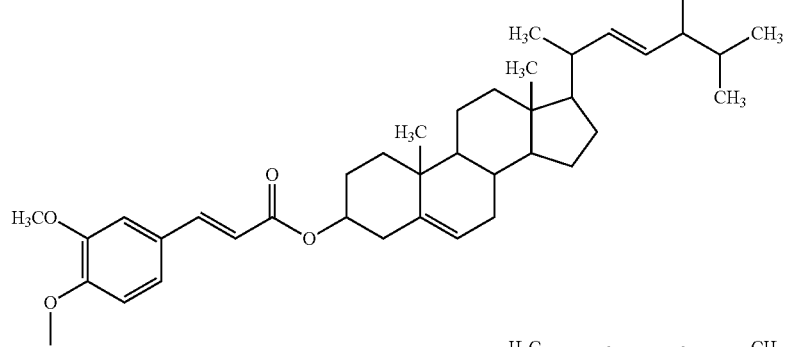
(51-25)
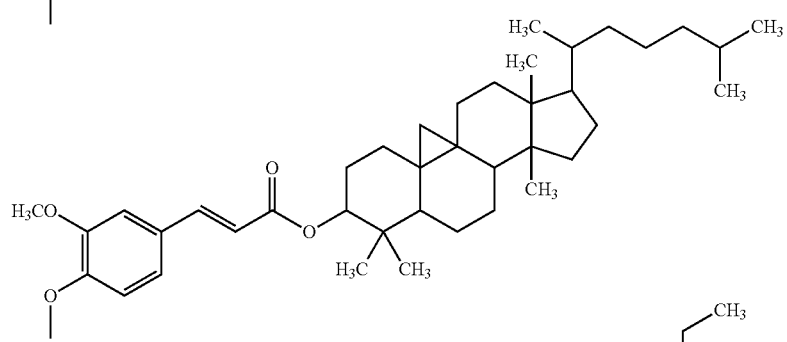
(51-26)
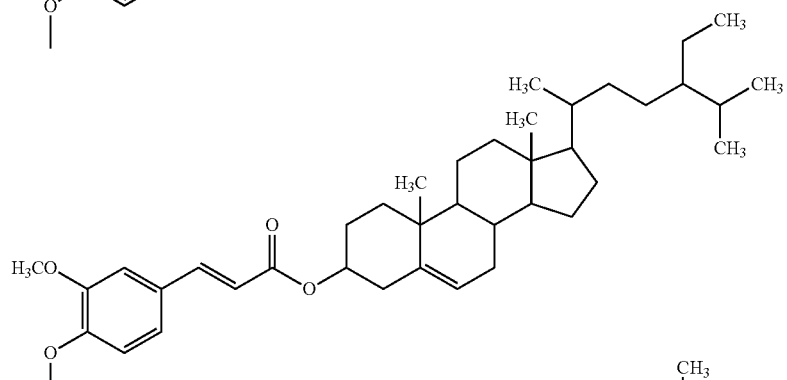
(51-27)
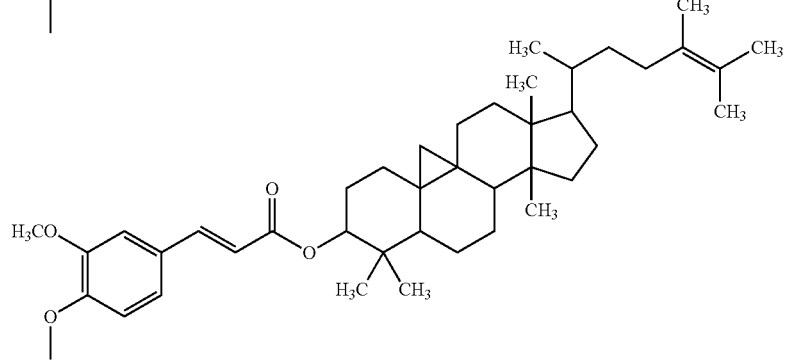

The compound-to-be-subjected-to-alignment-process preferably includes a structure for aligning the liquid crystal molecules 41 in a direction perpendicular to a substrate surface (hereinafter referred to as "vertical alignment inducing structure section"). It is because even though the alignment films 22 and 32 do not include a compound having a vertical alignment inducing structure section (that is, a typical vertical alignment agent) in addition to the compound-subjected-to-alignment-process, the alignment control of all liquid crystal molecules 41 is possible. Moreover, it is because compared to the case where the compound having the vertical alignment inducing structure section is additionally included, the alignment films 22 and 32 capable of exerting an alignment control function on the liquid crystal layer 40 more uniformly are easily formed. The vertical alignment inducing structure section may be included in one or both of the main chain and the side chain in the compound-to-be-subjected-to-alignment-process. Further, in the case where the compound-to-be-subjected-to-alignment-process includes the polyimide structure represented by the above-described expression (41), two kinds of structures, that is, a structure (a repeating unit) including the vertical alignment inducing structure section as R2 and a structure (a repeating unit) including a crosslinkable functional group as R2 are preferably included. It is because they are easily available. Note that when the vertical alignment inducing structure section is included in the compound-to-be-subjected-to-alignment-process, the vertical alignment inducing structure section is also included in the compound-subjected-to-alignment-process.

Examples of the vertical alignment inducing structure section include an alkyl group having 10 or more carbon atoms, a halogenated alkyl group having 10 or more carbon atoms, an alkoxy group having 10 or more carbon atoms, a halogenated alkoxy group having 10 or more carbon atoms, and an organic group including a ring structure. More specifically, examples of the structure including the vertical alignment inducing structure section include structures represented by expressions (61-1) to (61-6).

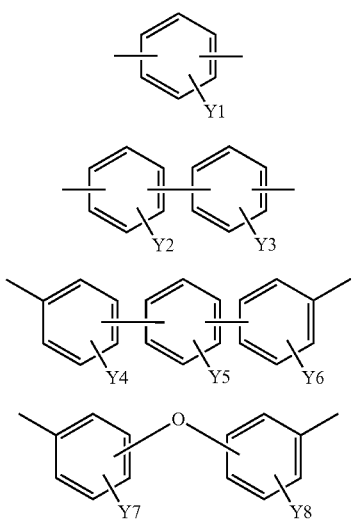

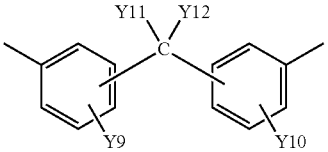

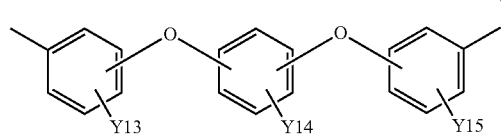

Herein, Y1 is a monovalent organic group including an alkyl group having 10 or more carbon atoms, an alkoxy group having 10 or more carbon atoms or a ring structure. Moreover, Y2 to Y15 each are a hydrogen atom, or a monovalnet organic group including an alkyl group having 10 or more carbon atoms, an alkoxy group having 10 or more carbon atoms or a ring structure, and one or both of Y2 and R3 and one or more of Y4 to Y6, one or both of Y7 and Y8, one or more of Y9 to Y12, one or more of Y13 to Y15 are monovalent organic groups including an alkyl group having 10 or more carbon atoms, an alkoxy group having 10 or more carbon atoms or a ring structure. However, Y11 and Y12 may be bonded to form a ring structure.

Moreover, examples of the monovalent organic group including a ring structure as the vertical alignment inducing structure section include groups represented by expressions (71-1) to (71-23), and the like. Examples of a divalent organic group including a ring structure as the vertical alignment inducing structure section include groups represented by expressions (72-1) to (72-7).

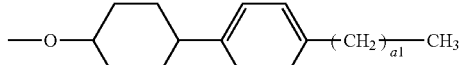

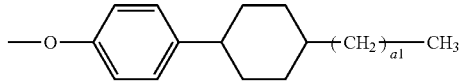

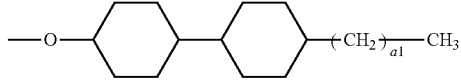

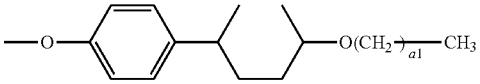

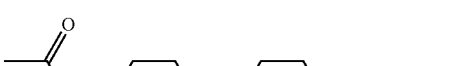

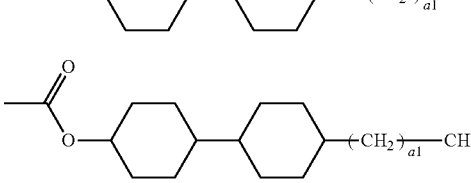

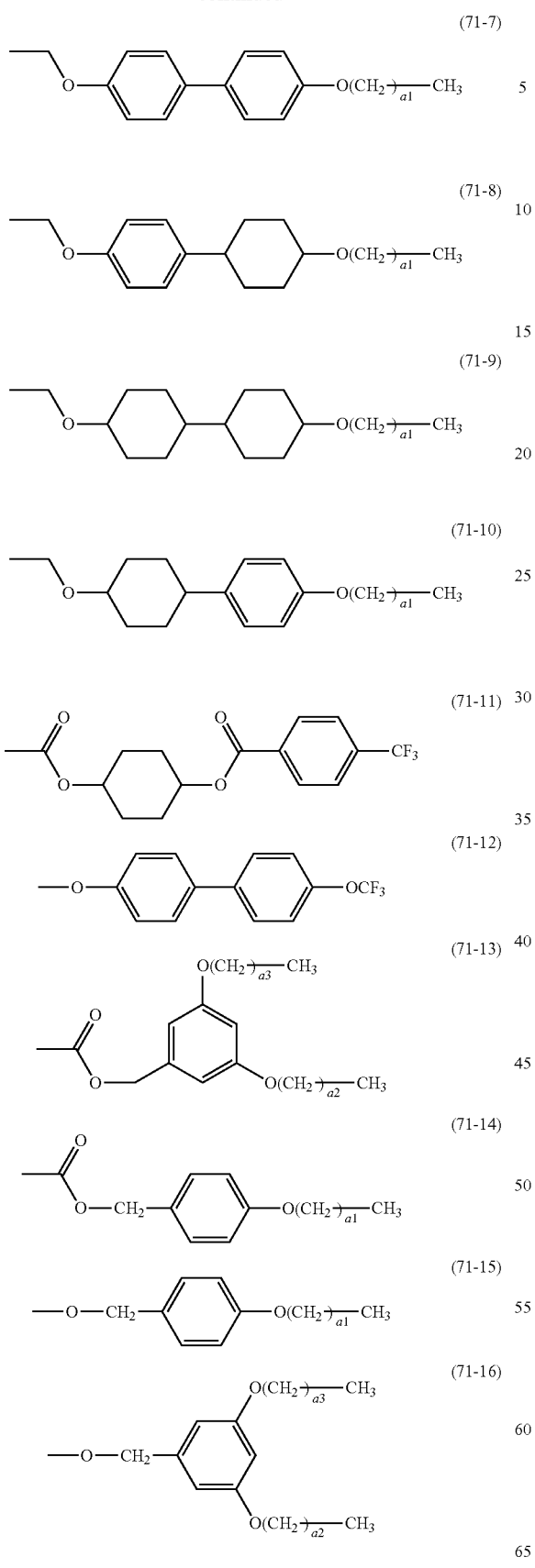
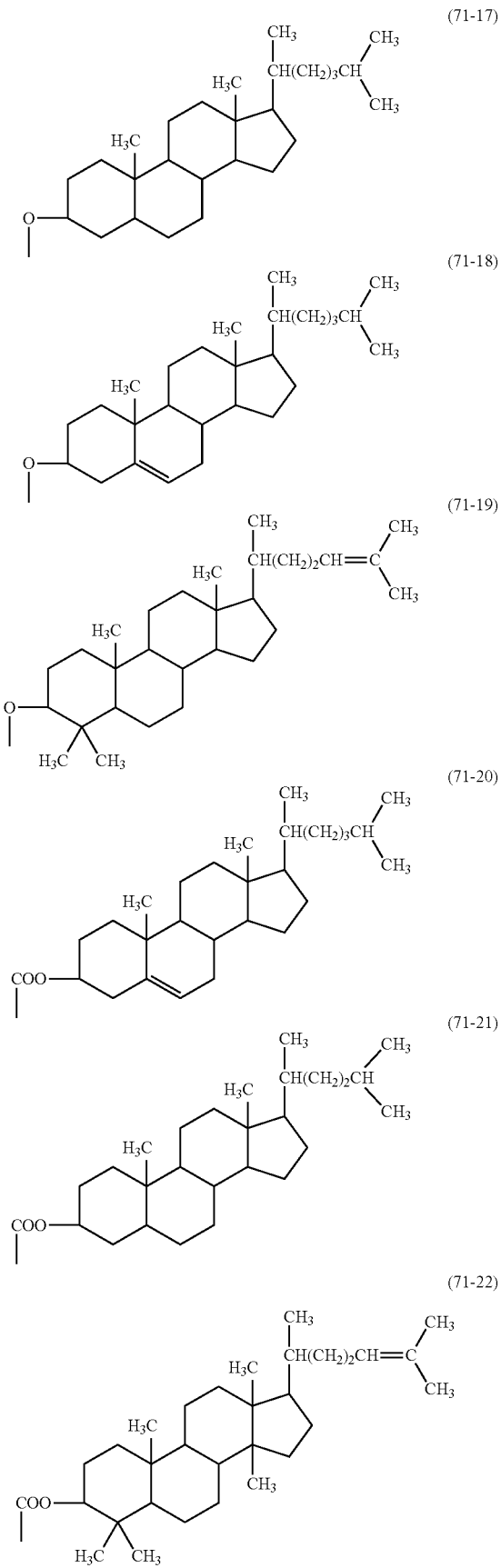
where a1 to a3 each are an integer of 0 to 21 both inclusive.

(71-23)

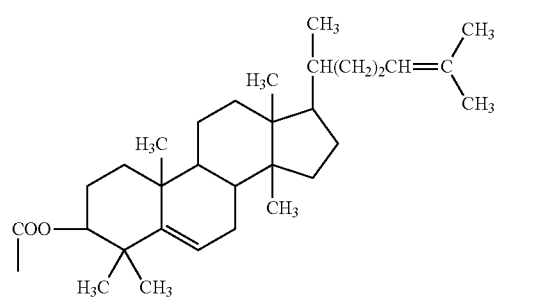

(72-1)

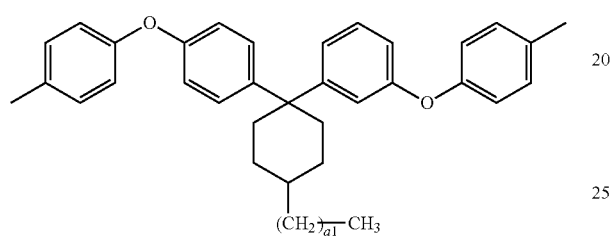

(72-2)

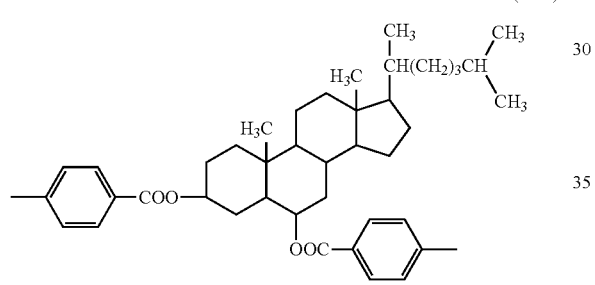

(72-3)

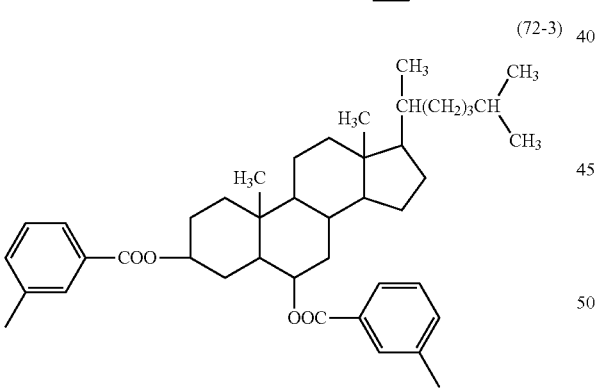

(72-4)

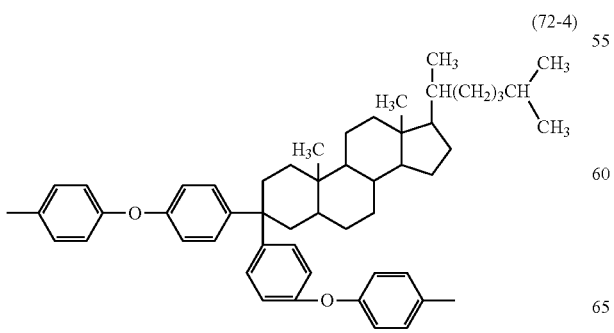

(72-5)

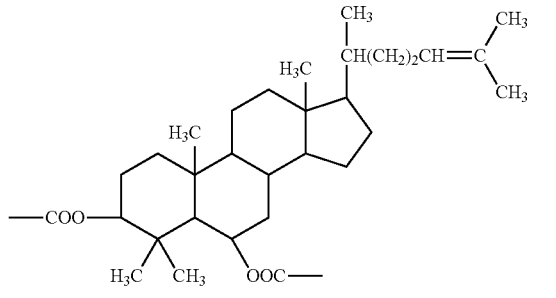

where a1 is an integer of 0 to 21 both inclusive.

(72-6)

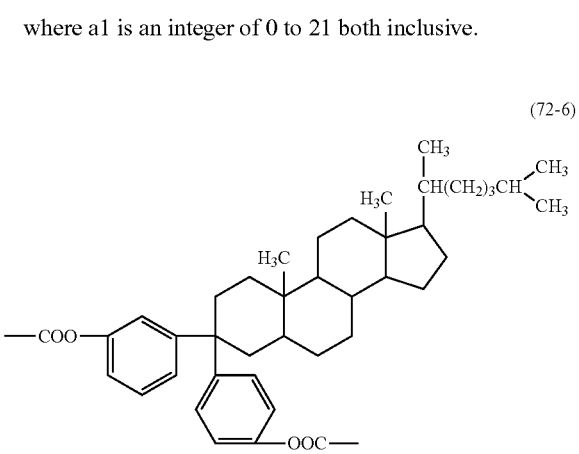

(72-7)

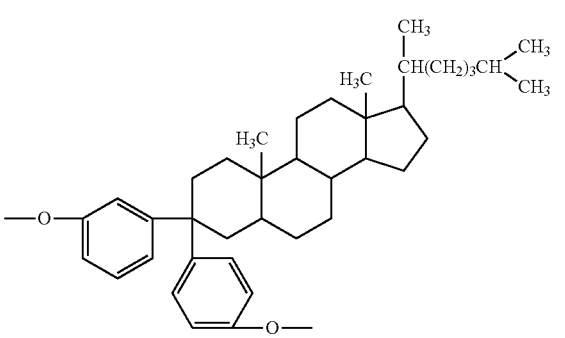

Note that the vertical alignment inducing structure section is not limited to the above-described groups, as long as the vertical alignment inducing structure section has a structure having a function of aligning the liquid crystal molecules 41 in a direction perpendicular to the substrate surface.

Moreover, the compound-subjected-to-alignment-process may include an unreacted crosslinkable functional group; however, when the crosslinkable functional group is reacted during driving, the liquid crystal molecules 41 may be misaligned; therefore, a smaller amount of the unreacted crosslinkable functional group is preferably included. Whether the compound-subjected-to-alignment-process includes the unreacted crosslinkable functional group is allowed to be confirmed, for example, by disassembling the liquid crystal display and analyzing the alignment films 22 and by a transmissive or reflective FT-IR (Fourier transform infrared spectrophotometer). More specifically, first, the liquid crystal display is disassembled, and surfaces of the alignment films 22 and 32 are cleaned with an organic solvent or the like. After that, when the alignment films 22 and 32 are analyzed by the FT-IR, for example, in the case where a double bond forming a cross-linked structure represented by the expression (51) remains in the alignment films 22 and 32, an absorption spectrum based on a double bond is allowed to be obtained and confirmed.

Moreover, the alignment films 22 and 32 may include another vertical alignment agent in addition to the above-described compound-subjected-to-alignment-process. As another vertical alignment agent, a polyimide having a vertical alignment inducing structure section, polysiloxane having a vertical alignment inducing structure section, and the like are used.

The liquid crystal layer 40 includes the liquid crystal molecules 41 having negative dielectric anisotropy. The liquid crystal molecules 41 have, for example, a rotationally symmetric shape around a long axis and a short axis which are orthogonal to each other as central axes, and have negative dielectric anisotropy.

Figure 2:
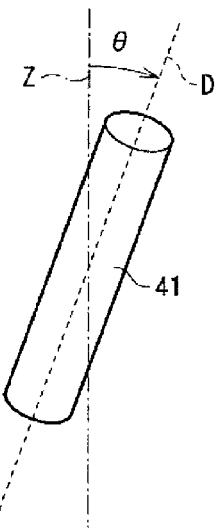
FIG. 2 is a schematic view for describing a pretilt of a liquid crystal molecule.

The liquid crystal molecules 41 are classified into liquid crystal molecules 41A supported by the alignment film 22 in proximity to a boundary of the alignment film 22, liquid crystal molecules 41B supported by the alignment film 32 in proximity to a boundary of the alignment film 32, and other liquid crystal molecules 41C. The liquid crystal molecules 41C are placed in an intermediate region in a thickness direction of the liquid crystal layer 40, and when a drive voltage is off, the long-axis directions (directors) of the liquid crystal molecules 41C are aligned substantially perpendicular to the glass substrates 20A and 30A. In this case, when the drive voltage is on, the directors of the liquid crystal molecules 41C are turned and aligned in parallel to the glass substrates 20A and 30A. Such a behavior arises from the liquid crystal molecules 41C having a property that the dielectric constant in the long axis is smaller than that in the short axis. The liquid crystal molecules 41A and 41B also have the same property; therefore, basically, the liquid crystal molecules 41A and 41B exhibit the same behavior as that of the liquid crystal molecules 41C in response to a change in an on/off state of the drive voltage. However, when the drive voltage is off, a pretilt $\theta 1$ is provided to the liquid crystal molecules 41A by the alignment film 22, and the directors of the liquid crystal molecules 41A are inclined from a direction normal to the glass substrate 20A and 30A. Likewise, a pretilt $\theta 2$ is provided to the liquid crystal molecules 41B by the alignment film 32, and the directors of the liquid crystal molecules 41B are inclined from a direction normal to the glass substrates 20A and 30A. Note that in this case, "supported" means that the alignment of the liquid crystal molecules 41 is controlled without adhering the alignment films 22 and 32 and the liquid crystal molecules 41A and 41C to each other. Moreover, "pretilt $\theta$ ($\theta 1$, $\theta 2$)" indicates, as illustrated in FIG. 2, an inclined angle of a director D of the liquid crystal molecule 41 (41A, 41B) with respect to a Z-direction in a state where the drive voltage is off in the case where a direction perpendicular (a direction normal) to the surfaces of the glass substrate 20A and 30A is Z.

In the liquid crystal layer 40, both of pretilts $\theta 1$ and $\theta 2$ have a larger value than 0°. In the liquid crystal layer 40, the pretilts $\theta 1$ and $\theta 2$ may be the same angles ($\theta 1 = \theta 2$) or different angles ($\theta 1 \neq \theta 2$); however, in particular, the pretilts $\theta 1$ and $\theta 2$ are preferably different angles. Therefore, compared to the case where both of the pretilts $\theta 1$ and $\theta 2$ are 0°, the response speed in response to the application of a drive voltage is improved, and substantially the same contrast as that in the case where both of the pretilts $\theta 1$ and $\theta 2$ are 0° is allowed to be obtained. Therefore, while response characteristics are improved, a light transmission amount in black display is allowed to be reduced, and contrast is allowed to be improved. In the case where the pretilts $\theta 1$ and $\theta 2$ are different angles, a larger pretilt $\theta$ of the pretilts $\theta 1$ and $\theta 2$ is desirably within a range of 1° to 4° both inclusive. When the larger pretilt $\theta$ is within the above-described range, a higher effect is specifically obtained.

Next, a method of manufacturing the above-described liquid crystal display (liquid crystal display element) will be described referring to a flow chart illustrated in FIG. 3, a schematic view for describing a state in the alignment films 22 and 32 illustrated in FIG. 4, and partially schematic sectional views of the liquid crystal display and the like illustrated in FIGS. 5, 6, and 7(A). Note that in FIGS. 5, 6 and 7(A), for the sake of simplification, a portion corresponding to only one pixel is illustrated.

First, the alignment film 22 is formed on a surface of the TFT substrate 20, and the alignment film 32 is formed on a surface of the CF substrate 30 (step S101).

More specifically, first, the pixel electrodes 20B having a predetermined slit section 21 are arranged in, for example, a matrix form on the surface of the glass substrate 20A to form the TFT substrate 20. Moreover, the facing electrode 30B is arranged on the color filter of the glass substrate 30A with the color filter formed thereon to form the CF substrate 30.

On the other hand, for example, the compound-to-be-subjected-to-alignment-process or a polymer compound precursor as the compound-to-be-subjected-to-alignment-process, and a solvent, and if necessary, a vertical alignment agent are mixed to prepare a liquid alignment film material.

For example, in the case where a polymer compound having a crosslinkable functional group as a side chain has the polyimide structure illustrated in the expression (41), as the polymer compound precursor which is the compound-to-be-subjected-to-alignment-process, a polyamic acid including a crosslinkable functional group is used. The polyamic acid as the polymer compound precursor is synthesized, for example, by reacting a diamine compound and a tetracarboxylic dianhydride. One or both of the diamine compound and the tetracarboxylic dianhydride used herein have a crosslinkable functional group. Examples of the diamine compound include compounds having crosslinkable functional groups represented by expressions (A-1) to (A-16), and examples of the tetracarboxylic dianhydride include compounds having crosslinkable functional groups represented by expressions (a-1) and (a-10). Moreover, in the case where the polyamic acid as the polymer compound precursor is synthesized to allow the compound-to-be-subjected-to-alignment-process to include the vertical alignment inducing structure section, in addition to the above-described compounds having the crosslinkable functional groups, compounds having vertical alignment inducing structure sections represented by expressions (B-1) to (B-36) as the diamine compound, compounds having vertical alignment inducing structure sections represented by expressions (b-1) to (b-3) as tetracarboxylic dianhydride may be used. Further, in the case where the polyamic acid as the polymer compound precursor is synthesized to allow that the compound-to-be-subjected-to-alignment-process include two kinds of structures, that is, a structure including a vertical alignment inducing structure section as R2 in the expression (51) and a structure including a crosslinkable functional group as R2 in the expression (51), the diamine compound and the tetracarboxylic dianhydride are selected in, for example, the following manner. More specifically, one or more kinds of compounds having crosslinkable functional groups represented by expressions (A-1) to (A-16), one or more kinds of compounds having vertical alignment inducing structure sections represented by expressions (B-1) to (B-36), and one or more kinds of tetracarboxylic dianhydrides represented by expressions (C-1) to (C-23) are used.
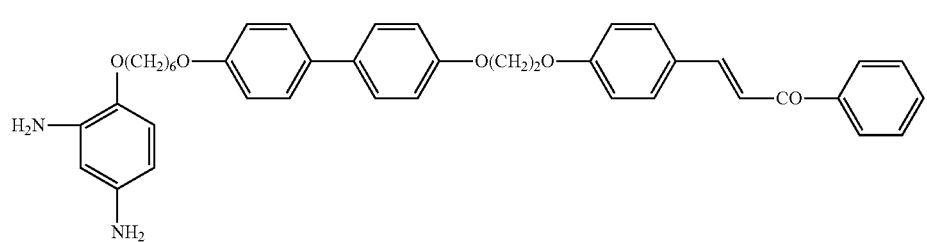
(A-1)
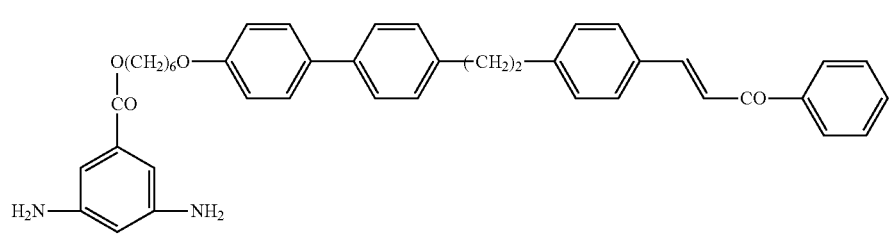
(A-2)
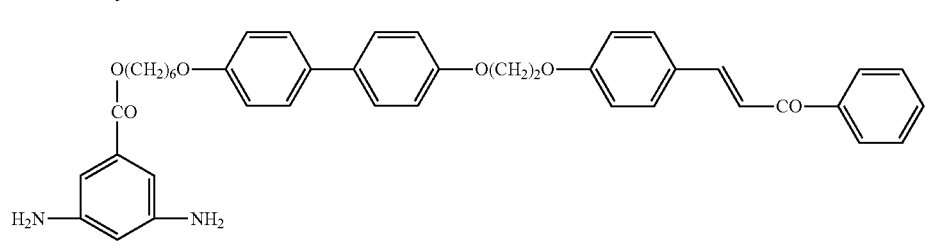
(A-3)
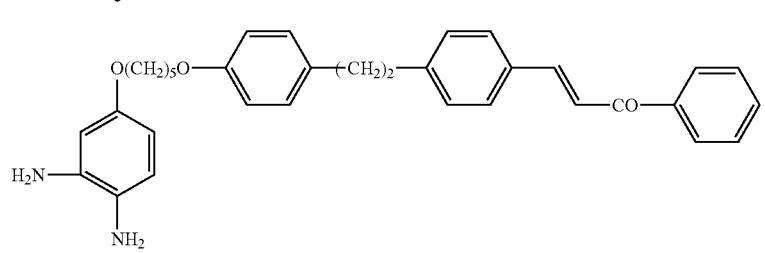
(A-4)
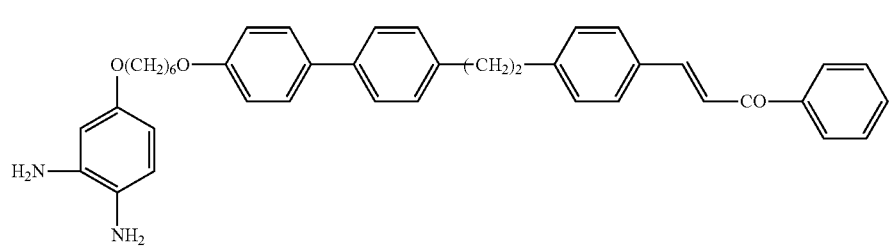
(A-5)
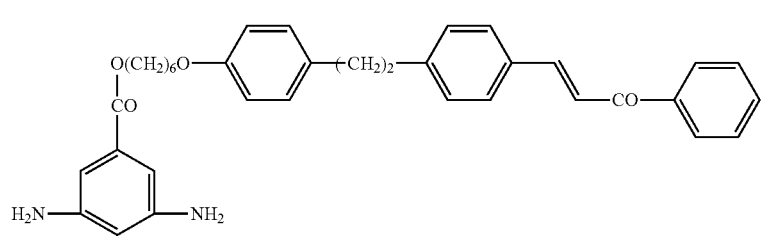
(A-6)
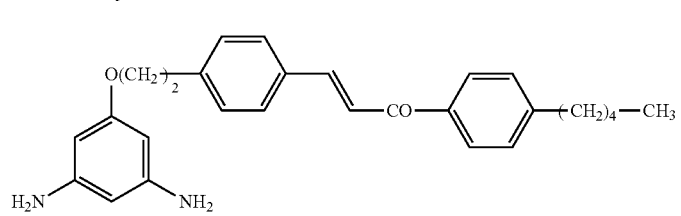
(A-7)

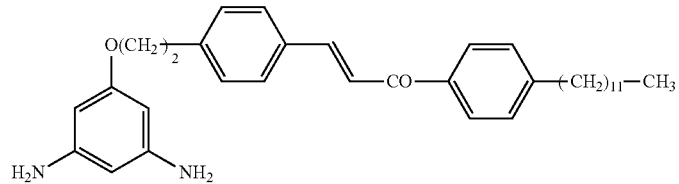
(A-8)
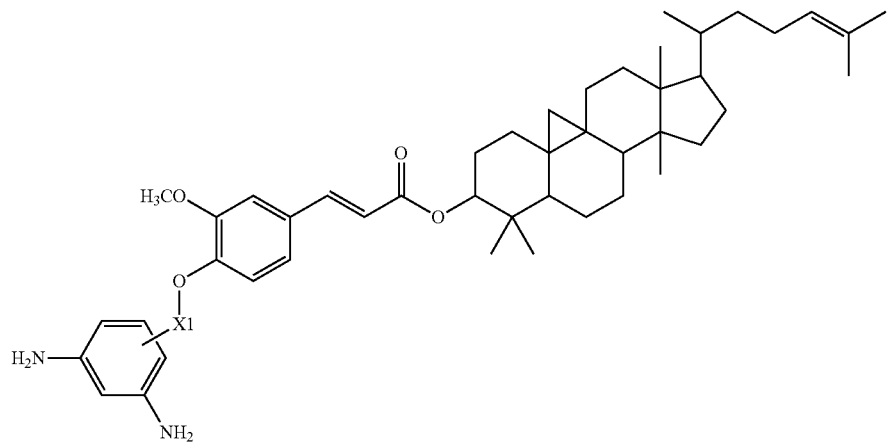
(A-9)
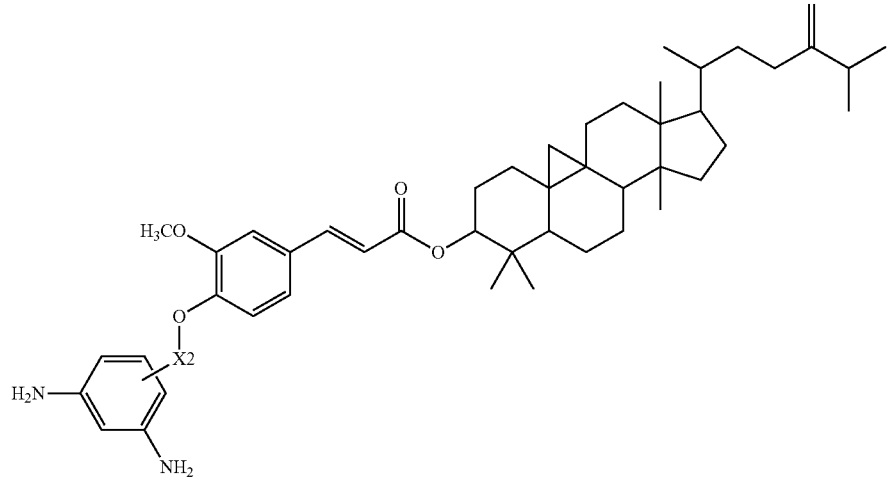
(A-10)
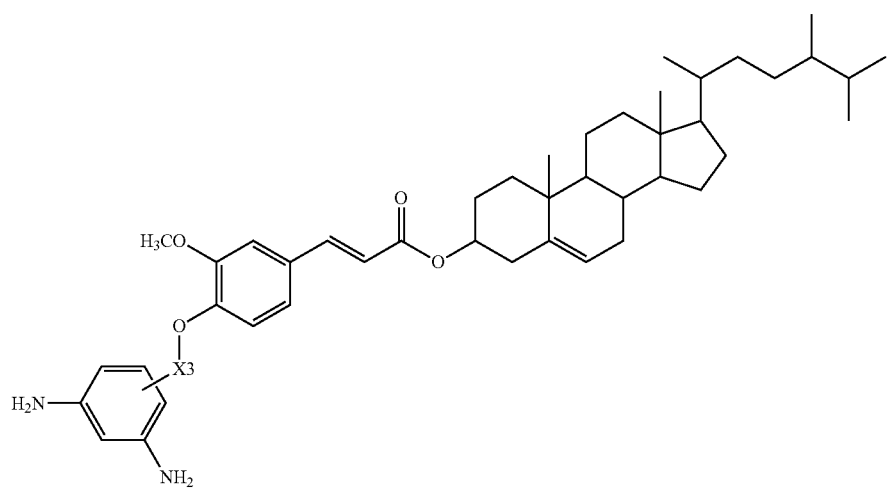
(A-11)

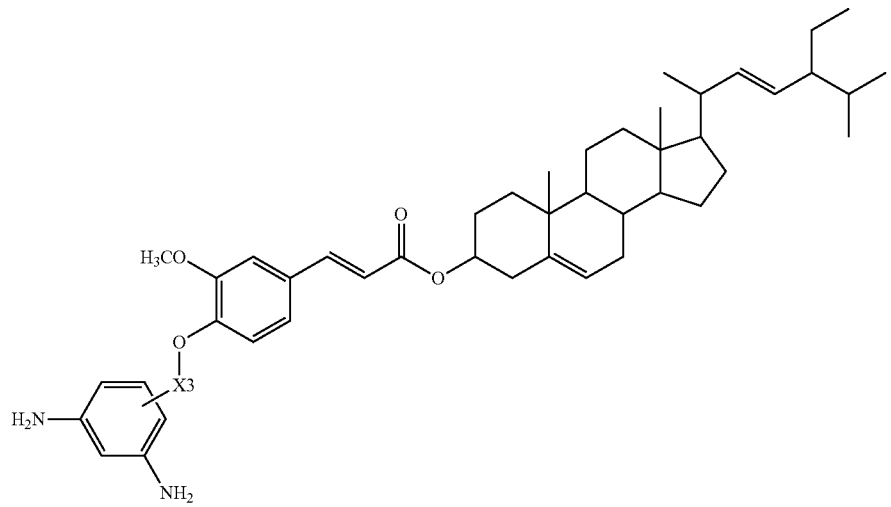
(A-12)
where X1 to X4 each are a single bond or a divalent organic group.
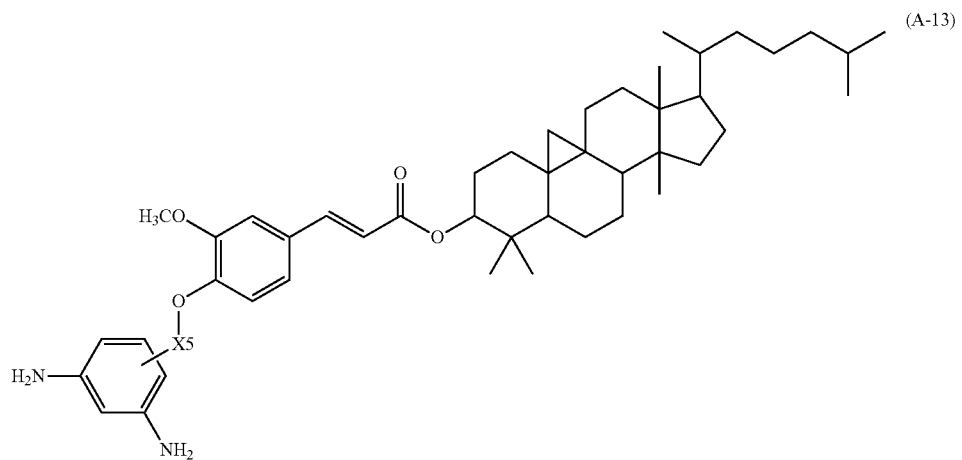
(A-13)
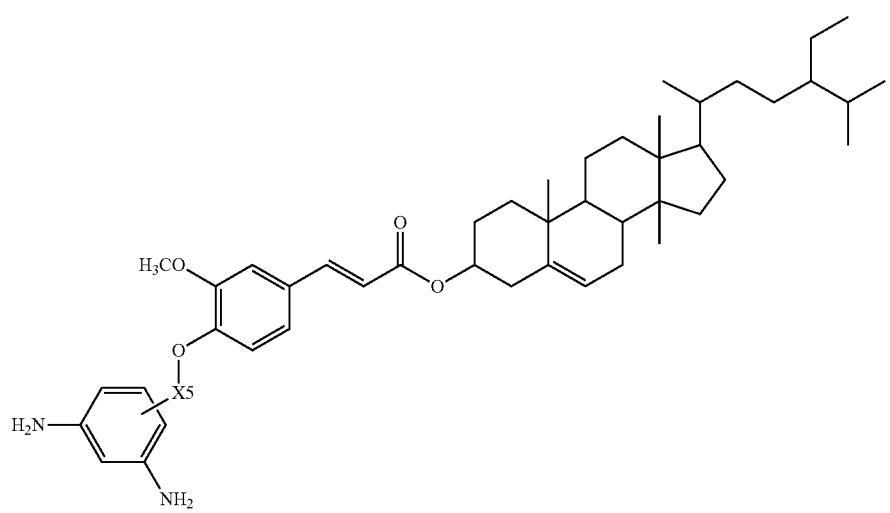
(A-14)

-continued
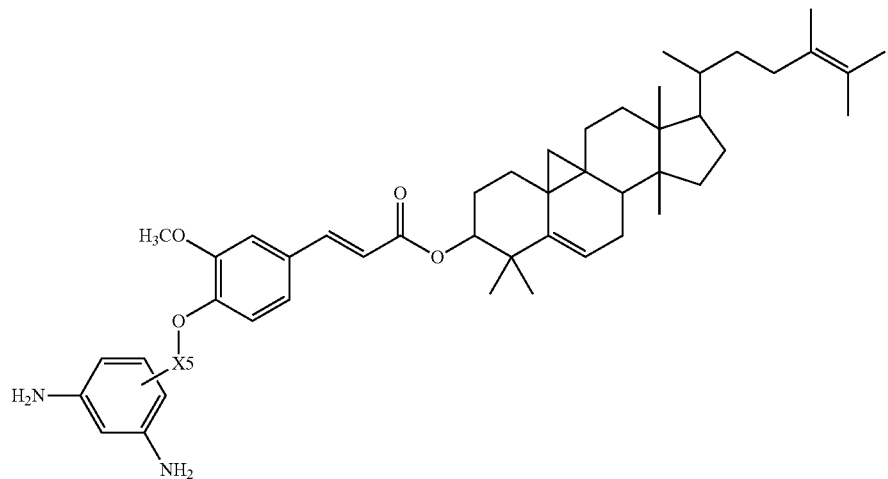
(A-15)
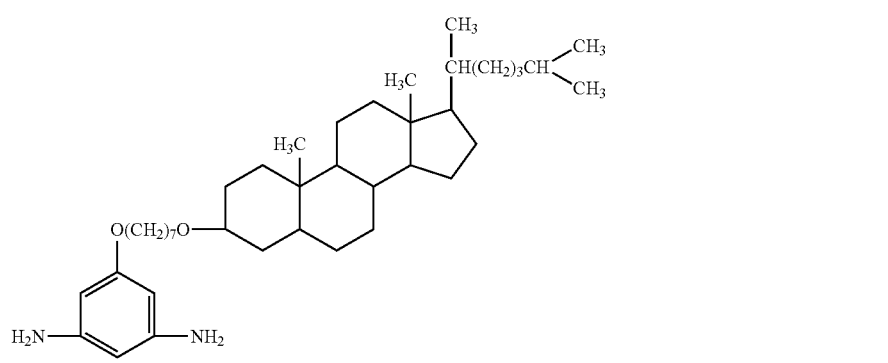
(A-16)
where X5 to X7 each are a single bond or a divalent organic group.
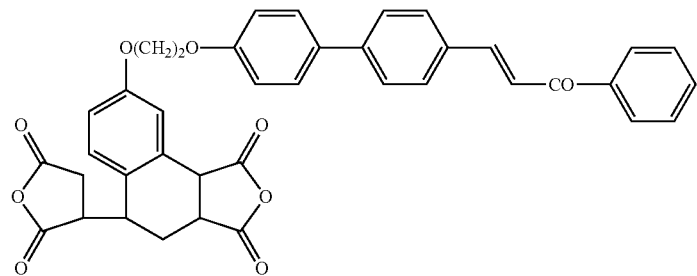
(a-1)
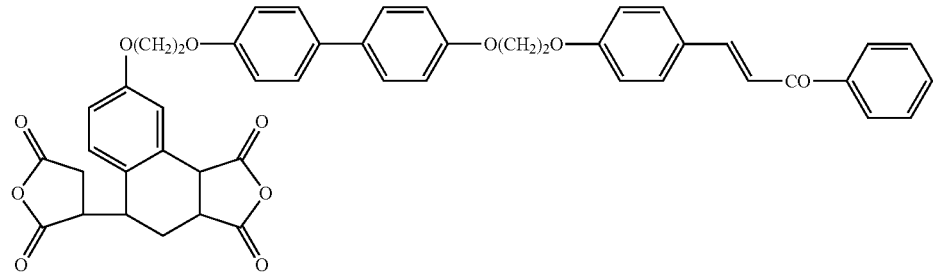
(a-2)

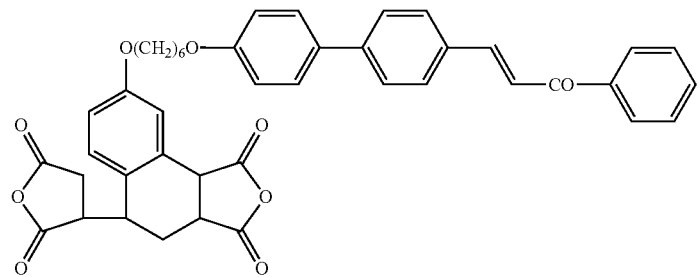
(a-3)
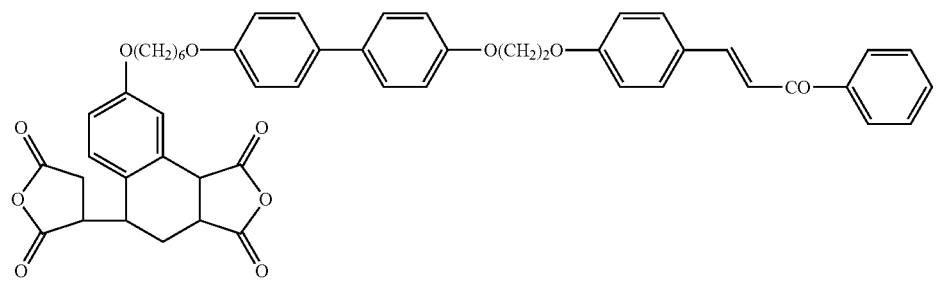
(a-4)
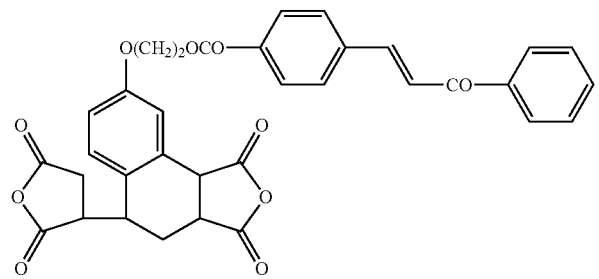
(a-5)
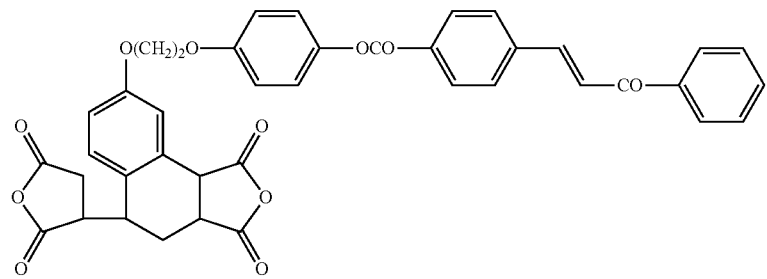
(a-6)
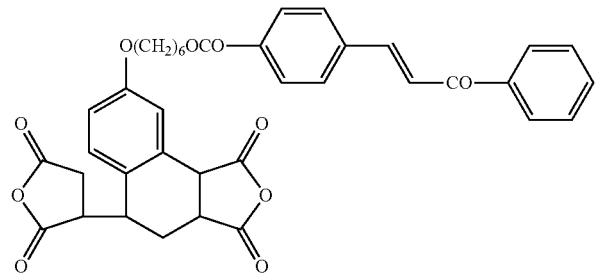
(a-7)

-continued
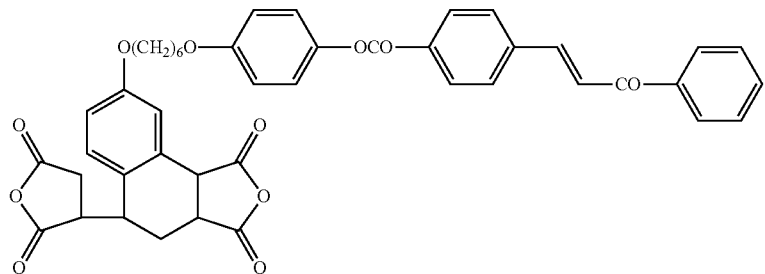
(a-8)
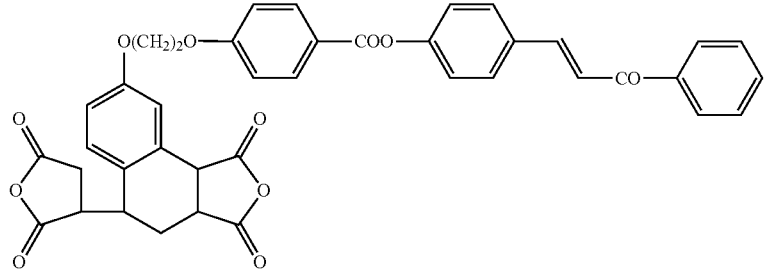
(a-9)
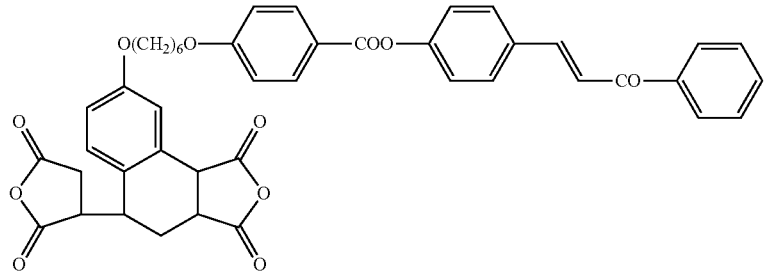
(a-10)
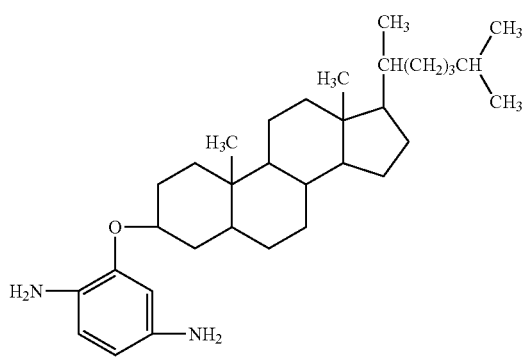
(B-1)
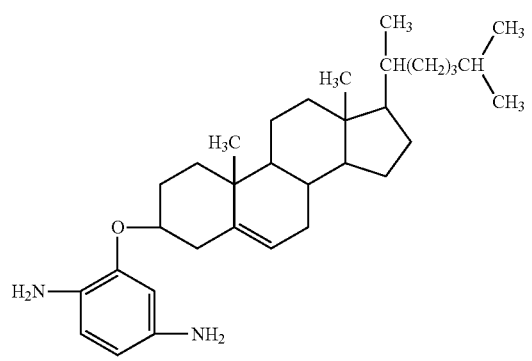
(B-2)
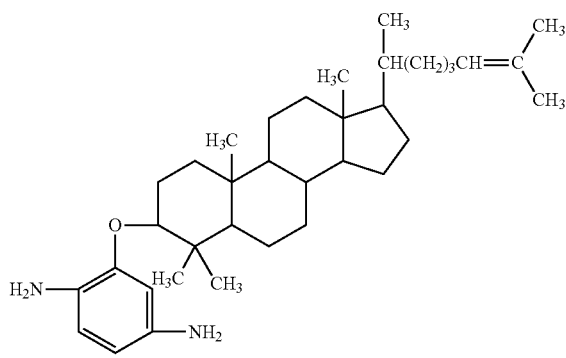
(B-3)
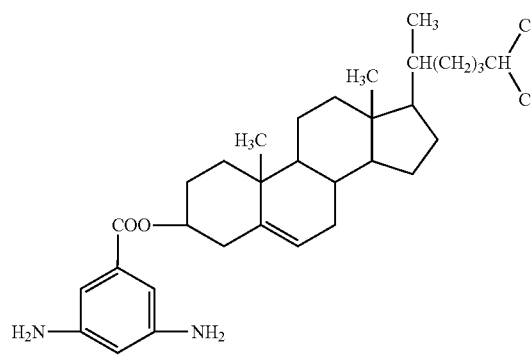
(B-4)

-continued
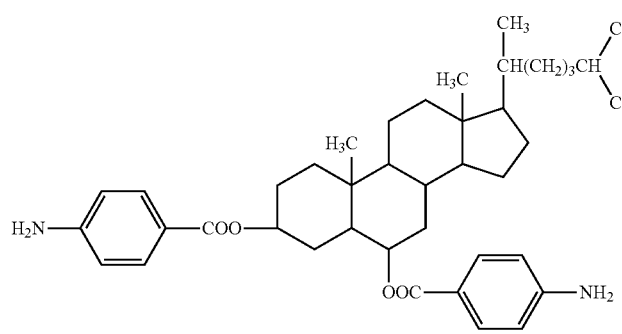
(B-5)
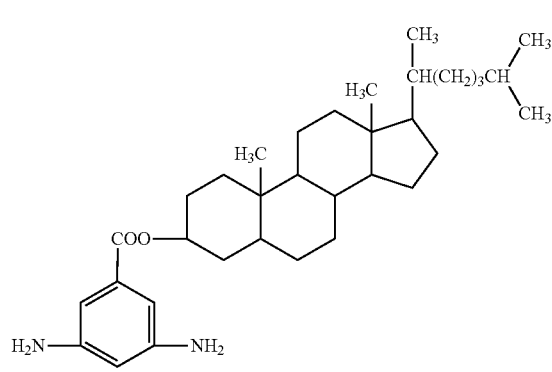
(B-6)
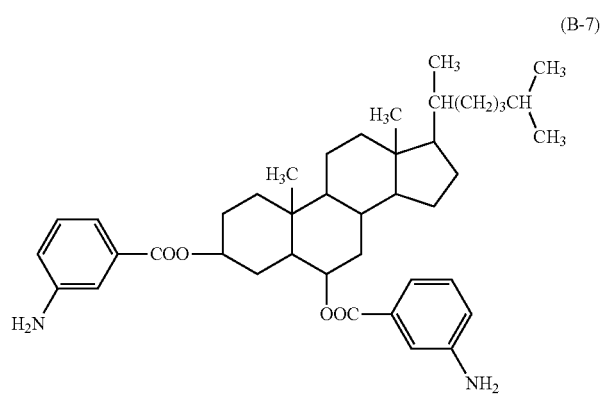
(B-7)
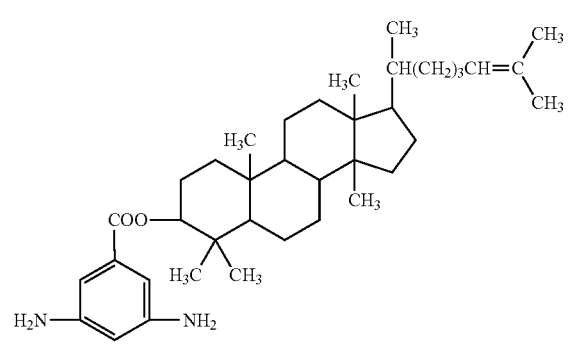
(B-8)
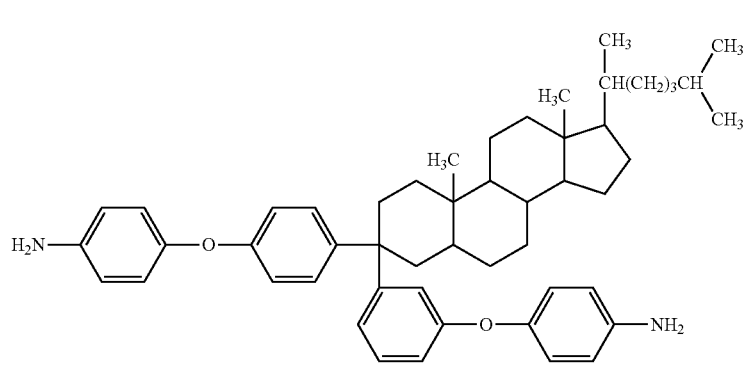
(B-9)

-continued
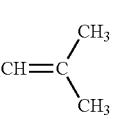
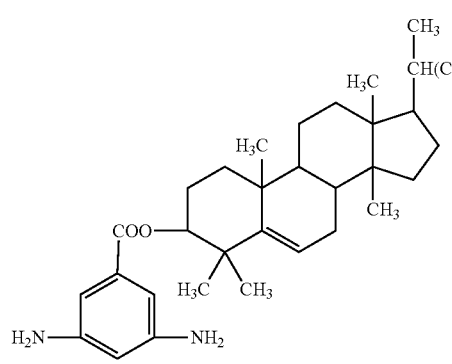
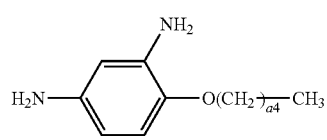
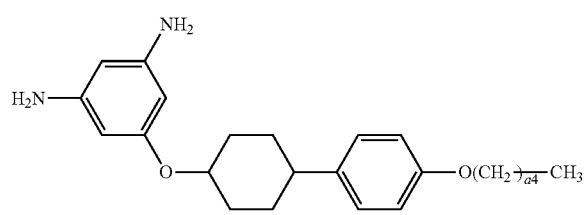
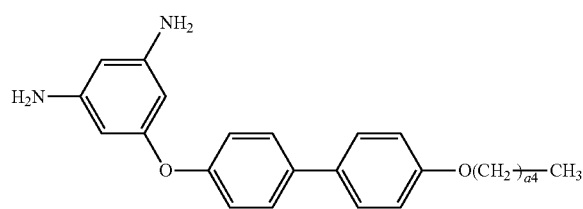
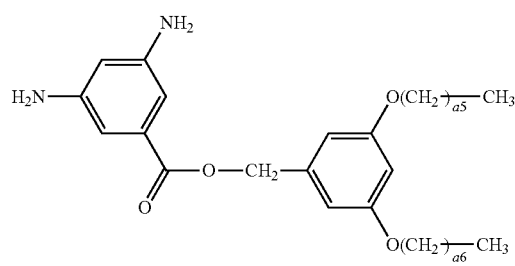
where a4 to a6 each are an integer of 0 to 21 both inclusive.
-continued
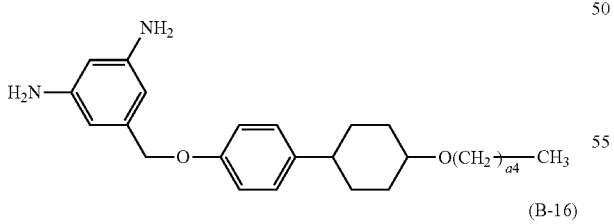
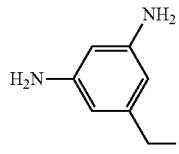
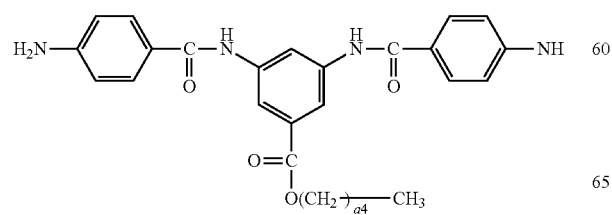
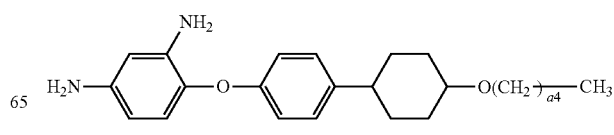

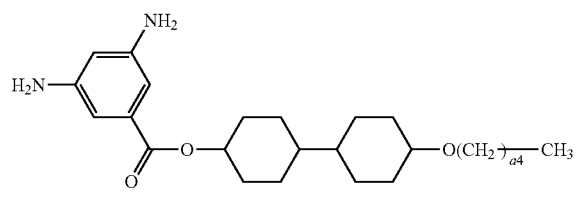
(B-19)
where a4 is an integer of 0 to 21 both inclusive.
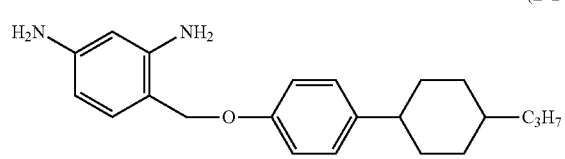
(B-24)
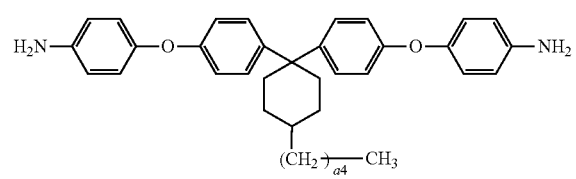
(B-20)
(B-25)
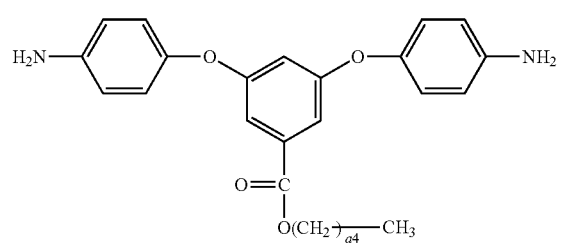
(B-21)
(B-26)
(B-27)
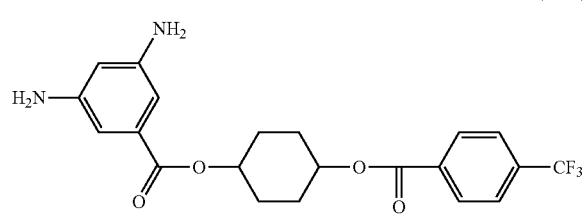
(B-22)
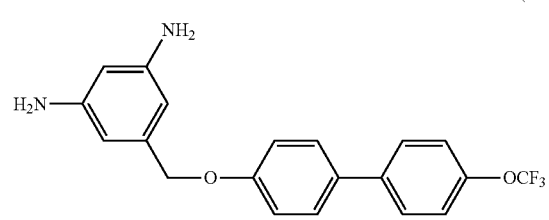
(B-23)
(B-28)
where a4 is an integer of 0 to 21 both inclusive.
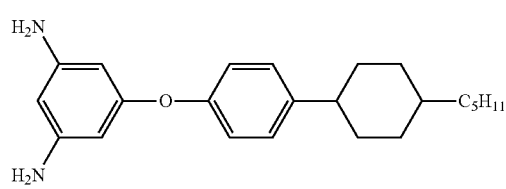
(B-29)
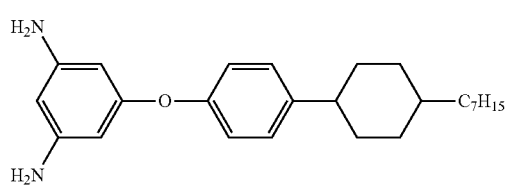
(B-30)

-continued
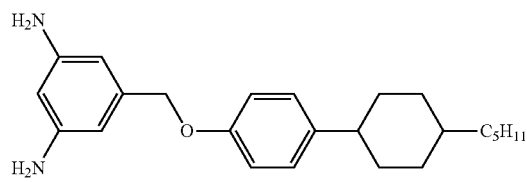
(B-31)
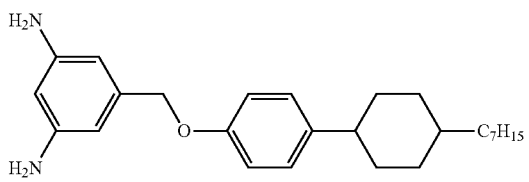
(B-32)
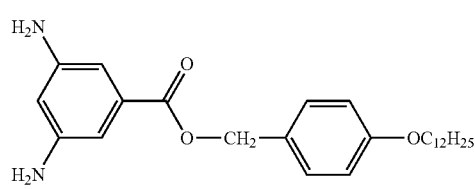
(B-33)
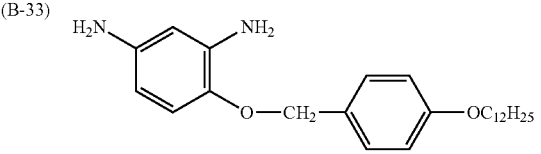
(B-34)
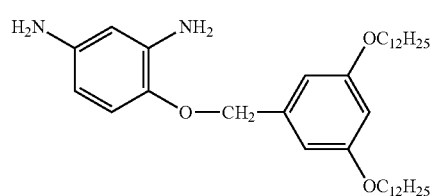
(B-35)
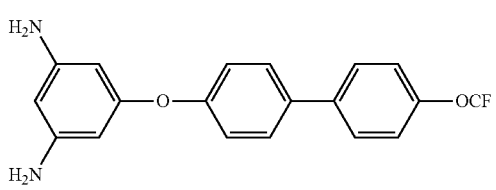
(B-36)
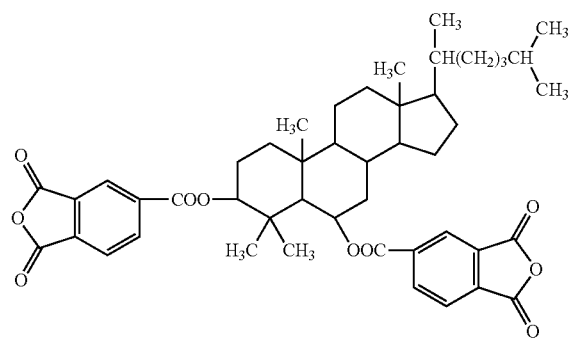
(b-1)
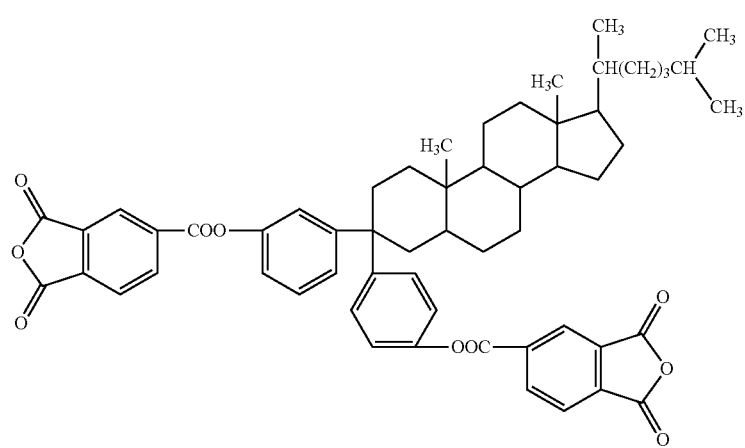
(b-2)

-continued
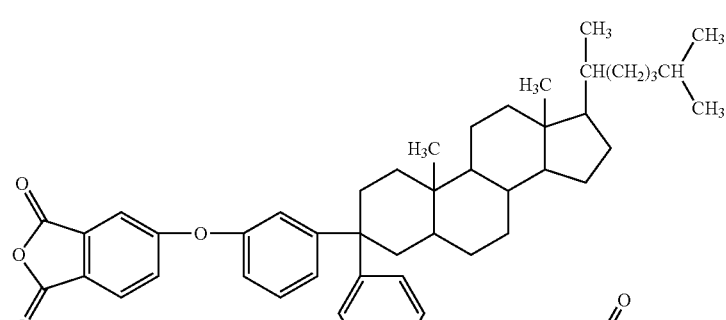 (b-3)
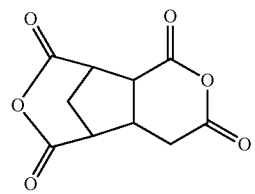 (C-1)
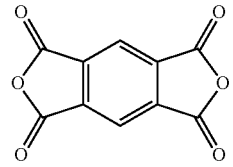 (C-3)
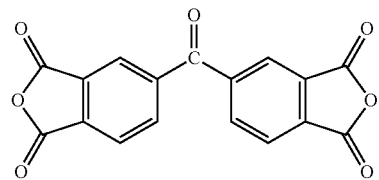 (C-5)
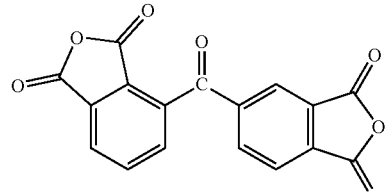 (C-7)
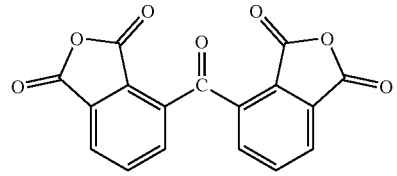 (C-9)
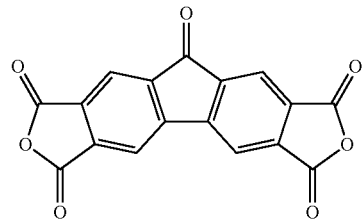 (C-11)
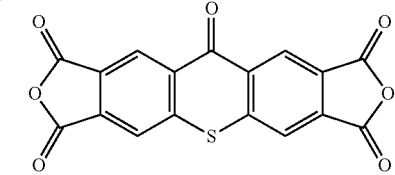 (C-12)

-continued

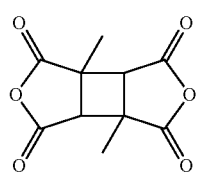
(C-13)

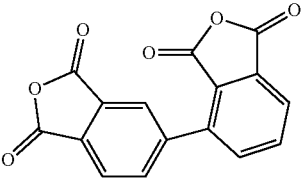
(C-14)

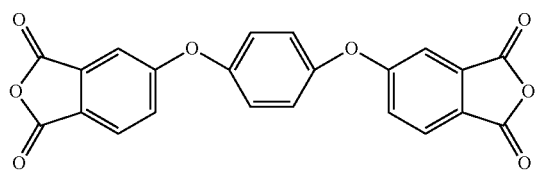
(C-15)

(C-16)

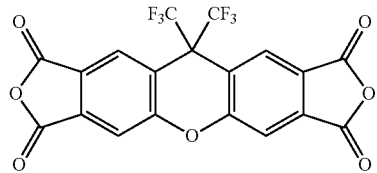
(C-17)

(C-18)

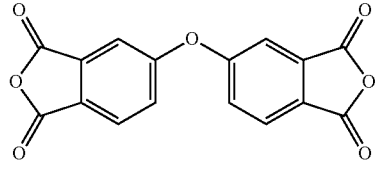
(C-19)

(C-20)

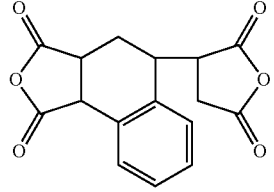
(C-21)

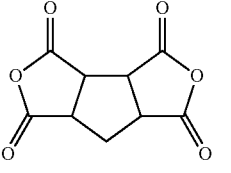
(C-22)

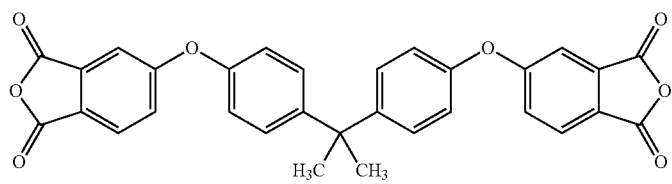
(C-23)

The content of the compound-to-be-subjected-to-alignment-process or a polymer compound precursor as the compound-to-be-subjected-to-alignment-process in the alignment film material is preferably within a range of 1 wt % to 30 wt % both inclusive, and more preferably within a range of 3 wt % to 10 wt % both inclusive. Moreover, if necessary, a photopolymerization initiator or the like may be mixed in the alignment film material.

Then, the prepared alignment film material is applied to or printed on the TFT substrate 20 and the CF substrate 30 to cover the pixel electrodes 20B and the slit sections 21 and the facing electrode 30B therewith, and then heat treatment is performed. The temperature of the heat treatment is preferably 80° C. or over, and more preferably within a range of 150° C. to 200° C. both inclusive. Moreover, the heat treatment may be performed by gradually changing the temperature. Therefore, a solvent included in the applied or printed alignment film material is evaporated to form the alignment films 22 and 32 including the polymer compound (the compound-to-be-subjected-to-alignment-process) having the crosslinkable functional group as the side chain. After that, if necessary, a process such as rubbing may be performed.

Figure 4:
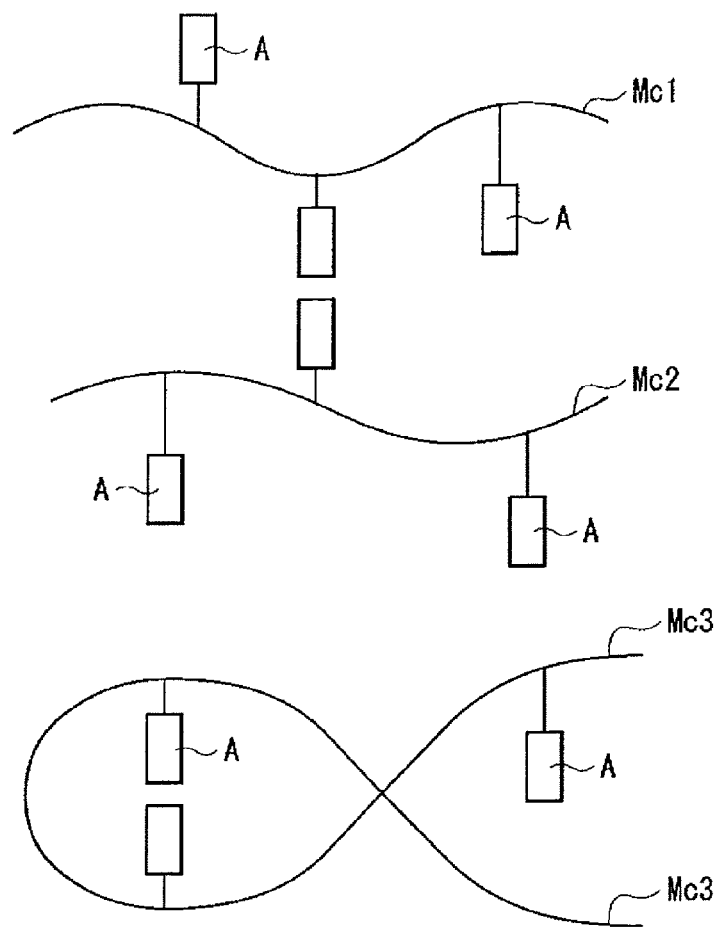
FIG. 4 is a schematic view illustrating a state of a polymer compound (compound-to-be-subjected-to-alignment-process) in an alignment film for describing the method of manufacturing the liquid crystal display illustrated in FIG. 1.
Figure 5:
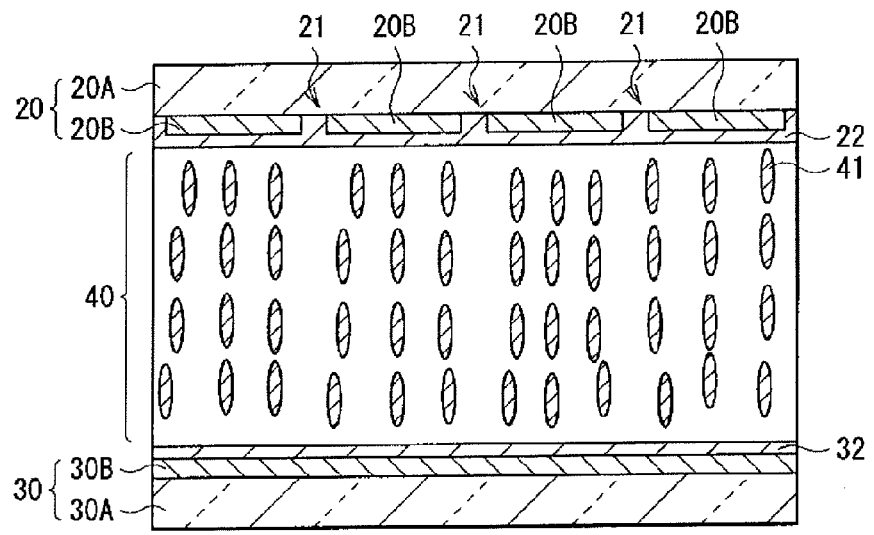
FIG. 5 is a partially schematic sectional view of a substrate and the like for describing the method of manufacturing the liquid crystal display illustrated in FIG. 1.

In this case, the compound-to-be-subjected-to-alignment-process in the alignment films 22 and 32 is considered to be in a state illustrated in FIG. 4. More specifically, the compound-to-be-subjected-to-alignment-process is formed by including main chains Mc (Mc1 to Mc3) and crosslinkable functional groups A introduced as side chains into the main chains Mc, and is present in a state where the main chains Mc1 to Mc3 are not connected to one another. The crosslinkable functional groups A in this state are aligned in a random direction by thermal motion.

Next, the TFT substrate 20 and the CF substrate 30 are arranged with the alignment film 22 and the alignment film 32 facing each other, and the liquid crystal layer 40 including the liquid crystal molecules 41 is sealed between the alignment film 22 and the alignment film 32 (step S102). More specifically, spacer projections for securing a cell gap, for example, plastic beads or the like are sprayed on a surface where the alignment film 22 or 32 is formed of one of the TFT substrate 20 and the CF substrate 30, and a seal section is printed by, for example, a screen printing method with use of an epoxy adhesive or the like. After that, as illustrated in FIG. 5, the TFT substrate 20 and the CF substrate 30 with the alignment films 22 and 32 facing each other are bonded together with the spacer projections and the seal section in between, and a liquid crystal material including the liquid crystal molecules 41 is injected. After that, the seal section is cured by heating or the like to seal the liquid crystal material between the TFT substrate 20 and the CF substrate 30. FIG. 5 illustrates a sectional configuration of the liquid crystal layer 40 sealed between the alignment film 22 and the alignment film 32.

Figure 6:
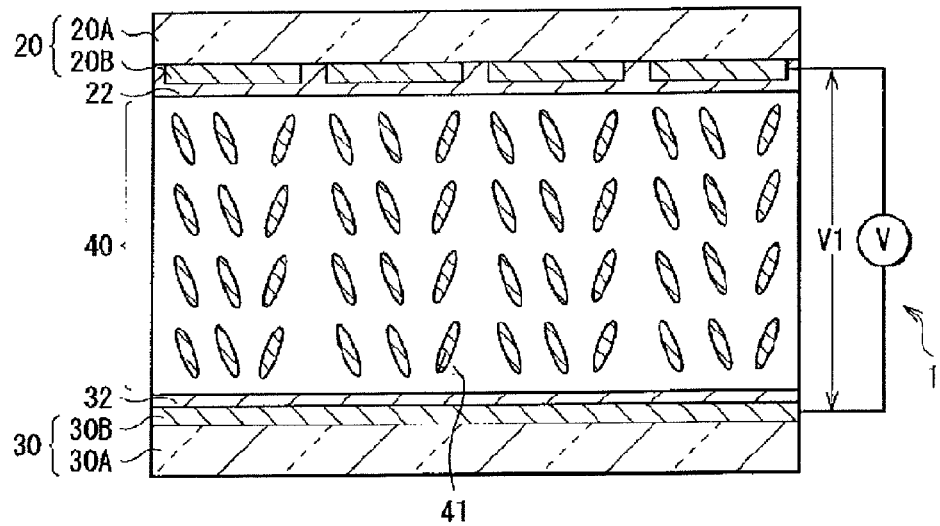
FIG. 6 is a partially schematic sectional view of the substrate and the like for describing a step following FIG. 5.

Next, as illustrated in FIG. 6, a voltage V1 is applied between the pixel electrodes 20B and the facing electrode 30B with use of a voltage application means 1 (step S103). The voltage V1 is, for example, 5 V to 30 V. Therefore, an electric field in a direction at a predetermined angle with respect to the surfaces of the glass substrates 20A and 30A is generated to incline and align the liquid crystal molecules 41 from a direction perpendicular to the glass substrates 20A and 30A to a predetermined direction. In other words, the azimuth angles (deviation angles) of the liquid crystal molecules 41 at this time are specified by the direction of the electric field, and the polar angles (the zenith angles) thereof are specified by the strength of the electric field. Then, the inclined angles of the liquid crystal molecules 41 and the pretilts θ1 and θ2 provided in a process which will be described later to the liquid crystal molecules 41A supported by the alignment film 22 in proximity to the boundary of the alignment film 22 and the liquid crystal molecules 41B supported by the alignment film 32 in proximity to the boundary of the alignment film 32 are substantially equal to each other. Therefore, when the value of the voltage V1 is appropriately adjusted, the values of the pretilts θ1 and θ2 of the liquid crystal molecules 41A and 41B are controllable.

Figure 7:
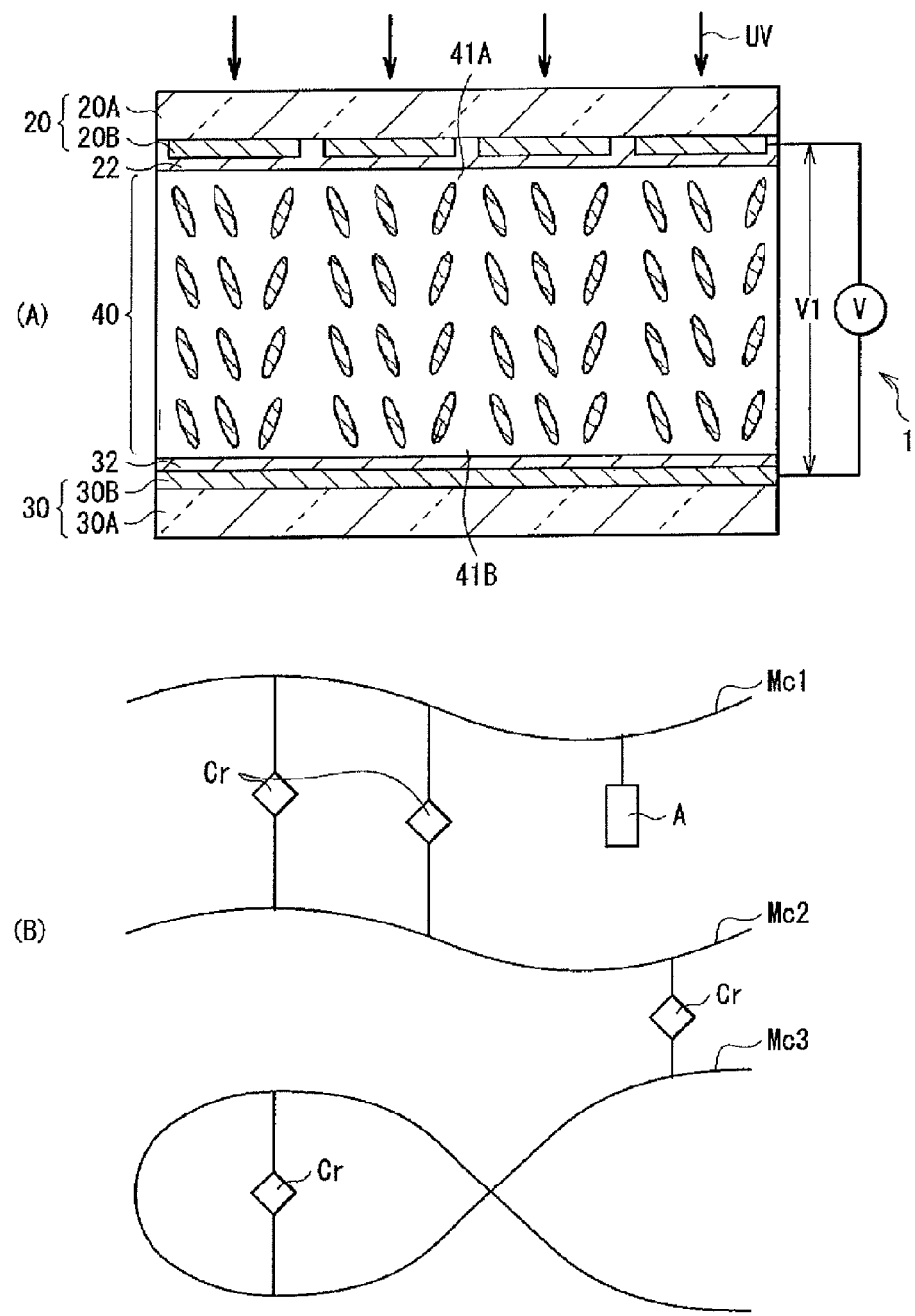
FIGS. 7(A) and 7(B) are a partially schematic sectional view of the substrate and the like for describing a step following FIG. 6 and a schematic view illustrating a state of a polymer compound (compound-subjected-to-alignment-process) in the alignment film.

Moreover, as illustrated in FIG. 7(A), in a state where the voltage V1 is applied, for example, an energy ray (more specifically, ultraviolet radiation UV) is applied to the alignment films 22 and 32 from outside of the TFT substrate 20. In other words, while an electric field or a magnetic field is applied to the liquid crystal layer, ultraviolet radiation is applied to align the liquid crystal molecules 41 in an oblique direction with respect to a pair of substrates 20 and 30. Therefore, the crosslinkable functional group included in the compound-to-be-subjected-to-alignment-process in the alignment films 22 and 32 is reacted to cross-link the compound-to-be-subjected-to-alignment-process (step S104). Thus, a direction where the liquid crystal molecules 41 are supposed to respond is memorized by the compound-subjected-to-alignment-process to provide the pretilt to the liquid crystal molecules 41 in proximity to the alignment films 22 and 32. Then, as a result, the compound-subjected-to-alignment-process is formed in the alignment films 22 and 32, and in a non-drive state, the pretilts θ1 and θ2 are provided to the liquid crystal molecules 41A and 41B in proximity to the boundaries of the alignment films 22 and 32 in the liquid crystal layer 40. As ultraviolet radiation UV, ultraviolet radiation including a large amount of an optical component with a wavelength of approximately 365 nm is preferable. It is because when ultraviolet radiation including a large amount of an optical component in a short wavelength region is used, the liquid crystal molecules 41 may be photolyzed to be deteriorated. Note that in this case, ultraviolet radiation UV is applied from outside of the TFT substrate 20; however, ultraviolet radiation UV may be applied from outside of the CF substrate 30, or from both of outside of the TFT substrate 20 and outside of the CF substrate 30. In this case, ultraviolet radiation UV is preferably applied from a side close to a substrate with higher transmittance. Moreover, in the case where ultraviolet radiation UV is applied from outside of the CF substrate 30, depending on the wavelength region of ultraviolet radiation UV, ultraviolet radiation UV may be absorbed by the color filter to cause a difficulty in cross-linking reaction. Therefore, ultraviolet radiation UV is preferably applied from outside of the TFT substrate 20 (a side close to a substrate having pixel electrodes).

In this case, the compound-subjected-to-alignment-process in the alignment films 22 and 32 is in a state illustrated in FIG. 7(B). More specifically, the directions of the crosslinkable functional groups A introduced into the main chains Mc of the compound-to-be-subjected-to-alignment-process are changed according to the alignment direction of the liquid crystal molecules 41, and the crosslinkable functional groups A which are in a close physical distance from each other react with each other to form a connection section Cr. It is considered that by the compound-subjected-to-alignment-process formed in such a manner, the alignment films 22 and 32 provide the pretilts θ1 and θ2 to the liquid crystal molecules 41A and 41B. Note that the connection section Cr may be formed between the compounds-to-be-subjected-to-alignment-process, or in the compound-to-be-subjected-to-alignment-process. More specifically, as illustrated in FIG. 7(B), the connection section Cr may be formed by reaction between, for example, the crosslinkable functional group A of the compound-to-be-subjected-to-alignment-process having the main chain Mc1 and the crosslinkable functional group A of the compound-to-be-subjected-to-alignment-process having the main chain Mc2. Moreover, for example, as in the case of a polymer compound having the main chain Mc3, the connection section Cr may be formed by reaction between the crosslinkable functional groups A introduced into the same main chain Mc3.

The liquid crystal display (liquid crystal display element) illustrated in FIG. 1 is allowed to be completed by the above steps.

In the operation of the liquid crystal display (liquid crystal display element), when a drive voltage is applied, in a selected pixel 10, the alignment state of the liquid crystal molecules 41 included in the liquid crystal layer 40 is changed in response to a potential difference between the pixel electrode 20B and the facing electrode 30B. More specifically, in the liquid crystal layer 40, when a drive voltage is applied, the liquid crystal molecules 41A and 41B placed in proximity to the alignment films 22 and 32 are inclined in their inclined directions from a state before the drive voltage is applied illustrated in FIG. 1, and such a behavior propagates to other liquid crystal molecules 41C. As a result, the liquid crystal molecules 41 respond to be aligned in a substantially horizontal (in parallel) to the TFT substrate 20 and the CF substrate 30. Therefore, optical characteristics of the liquid crystal layer 40 are changed, and incident light to the liquid crystal display element is changed to modulated emission light, and gradation is expressed based on the emission light to display a picture.

In this case, a liquid crystal display element which is not subjected to a pretilt process and a liquid crystal display including the liquid crystal display element will be described below. In the liquid crystal display element which is not subjected to the pretilt process, when a drive voltage is applied, liquid crystal molecules aligned in a direction perpendicular to a substrate is inclined to align directors thereof in an arbitrary direction in an in-plane direction of the substrate. In the liquid crystal molecules responding the drive voltage in such a manner, the directors of the liquid crystal molecules are in an unsteady state to cause misalignment as a whole. Therefore, the misalignment causes issues that the response speed is slowed and display characteristics are deteriorated. Moreover, in the case where an initial drive voltage is set to be higher than a drive voltage in a display state to perform drive (overdrive), when the initial drive voltage is applied, liquid crystal molecules which respond to the application of the initial drive voltage and liquid crystal molecules which hardly respond to the application of the initial drive voltage are present, and there is a large difference between director inclinations of the liquid crystal molecules. When the drive voltage in the display state is applied after that, the liquid crystal molecules which respond when the initial drive voltage is applied have a director inclination in response to the drive voltage in the display state before the behavior thereof hardly propagates to other liquid crystal molecules, and the inclination propagates to the other liquid crystal molecules. As a result, the whole pixel reaches luminance in the display state when the initial drive voltage is applied; however, after that, luminance is reduced, and then reaches the luminance in the display state again. In other words, there is an issue that when overdrive is performed, apparent response speed is increased, compared to the case where overdrive is not performed, but it is difficult to obtain sufficient display quality. Note that these issues are less likely to occur in an IPS mode or FFS mode liquid crystal display element, and it is considered that these issues occur specifically in the VA mode liquid crystal display element.

On the other hand, in the liquid crystal display (liquid crystal display element) of Embodiment 1 and the method of manufacturing the same, the above-described alignment films 22 and 32 provide the predetermined pretilts $\theta 1$ and $\theta 2$ to the liquid crystal molecules 41A and 41B. Therefore, the issues in the case where the pretilt process is not performed are less likely to occur, and the response speed in response to the drive voltage is highly improved, and display quality when overdrive is performed is improved. In addition, in one or both of the TFT substrate 20 and the CF substrate 30, the slit section 21 or the like is arranged as an alignment control section for controlling alignment of the liquid crystal molecules 41; therefore, display characteristics such as viewing angle characteristics are secured, and response characteristics are improved while favorable display characteristics are maintained.

Moreover, in a method of manufacturing a liquid crystal display in related art (a photo-alignment film technique), the alignment film is formed by applying linearly polarized light or light in an oblique direction with respect to a substrate surface (hereinafter referred to as "oblique light") to a precursor film including a predetermined polymer material arranged on the substrate surface, thereby performing the pretilt process. Therefore, when the alignment film is formed, there is an issue that a large light irradiation apparatus such as an apparatus of applying linearly-polarized light or an apparatus of applying oblique light is necessary. Further, there are issues that to form pixels including multi-domains for achieving a wider viewing angle, a larger apparatus is necessary, and manufacturing steps are complicated. In particular, in the case where the alignment film is formed with use of oblique light, when a structure such as a spacer or asperities are present on a substrate, a region where the oblique light does not reach because the structure or the like blocks the oblique light is formed, and in this region, it is difficult to perform desired alignment control for the liquid crystal molecules. In this case, for example, to apply oblique light with use of a photomask to arrange multi-domains in the pixel, it is necessary to design pixels in consideration of reflection of light. In other words, there is an issue that when the alignment film is formed with use of oblique light, it is difficult to form pixels with high definition.

Further, in the photo-alignment film technique in related art, in the case where a crosslinkable polymer compound is used as a polymer material, crosslinkable functional groups included in the crosslinkable polymer compound in a precursor film are aligned in a random direction by thermal motion; therefore, the probability of reducing a physical distance between crosslinkable functional groups is reduced. In addition, when random light (non-polarized light) is applied, reaction occurs when the physical distance between crosslinkable functional groups is reduced; however, in the crosslinkable functional groups reacted in response to the application of linearly polarized light, it is necessary for the polarization direction and the direction of a reaction part to be aligned in a predetermined direction. Moreover, compared to vertical light, the amount of applied oblique light per unit area is reduced with an increase in an applied area. In other words, the ratio of the crosslinkable functional group reacted by linearly polarized light or oblique light is lower than that in the case where random light (non-polarized light) is applied in a direction perpendicular to the substrates surface. Therefore, crosslink density (crosslink degree) in the formed alignment film is easily reduced.

On the other hand, in Embodiment 1, after the alignment films 22 and 32 including the compound-to-be-subjected-to-alignment-process are formed, the liquid crystal layer 40 is sealed between the alignment film 22 and the alignment film 32. Next, when a voltage is applied to the liquid crystal layer 40, the liquid crystal molecules 41 are aligned in a predetermined direction, and while the direction of the crosslinkable functional groups are aligned by the liquid crystal molecules 41 (that is, while the directions of end structure sections of the side chains with respect to the substrate or the electrode are specified by the liquid crystal molecules 41), the compound-to-be-subjected-to-alignment-process in the alignment films 22 and 32 is cross-linked. Therefore, the alignment films 22 and 32 providing the pretilt $\theta$ to the liquid crystal molecules 41A and 41B are allowed to be formed. In other words, in the liquid crystal display (liquid crystal display element) of Embodiment 1 and the method of manufacturing the same, response characteristics are allowed to be improved easily without using a large apparatus. Moreover, when the compound-to-be-subjected-to-alignment-process is cross-linked, the pretilt $\theta$ is allowed to be provided to the liquid crystal molecules 41 independent of the direction of ultraviolet radiation; therefore, pixels are allowed to be formed with high definition. Further, in the compound-to-be-subjected-to-alignment-process, the compound-subjected-to-alignment-process is produced in a state where the directions of the crosslinkable functional groups are aligned; therefore, it is considered that the crosslink degree of the compound-subjected-to-alignment-process is higher than that of the alignment film formed by the above-described manufacturing method in related art. Therefore, even if the liquid crystal display is driven for a long time, a cross-linked structure is less likely to be newly formed while the liquid crystal display is driven, and accordingly, the pretilts $\theta 1$ and $\theta 2$ of the liquid crystal molecules 41A and 41B are allowed to be maintained in a state when the liquid crystal display is manufactured, and reliability is allowed to be improved.

Moreover, in another method of manufacturing the liquid crystal display element in related art, after the liquid crystal layer is formed with use of a liquid crystal material including a monomer having photopolymerization, or the like, in a state where the liquid crystal layer includes the monomer, while predetermined alignment is performed on liquid crystal molecules in the liquid crystal layer, light is applied to the liquid crystal layer to polymerize the monomer. A polymer formed in such a manner provides a pretilt to the liquid crystal molecules. However, in the manufactured liquid crystal display element, an unreacted photopolymerization monomer remains in the liquid crystal layer to cause an issue of a decline in reliability. Moreover, there is an issue that it is necessary to increase light application time to reduce the unreacted monomer, thereby increasing time necessary to manufacture (takt time).

On the other hand, in Embodiment 1, without forming the liquid crystal layer with use of a liquid crystal material to which a monomer is added as described above, the pretilts θ1 and θ2 are provided to the liquid crystal molecules 41A and 41B in the liquid crystal layer 40 by the alignment films 22 and 32; therefore, reliability is allowed to be improved. Moreover, an increase in takt time is preventable. Further, without using a rubbing process as a technique of providing a pretilt to liquid crystal molecules in related art, the pretilt θ is allowed to be favorably provided to the liquid crystal molecules 41A and 41B. Therefore, issues in the rubbing process such as a decline in contrast due to a scratch on an alignment film by rubbing, a break in a wire due to static electricity generated during rubbing and a decline in reliability or the like due to a foreign matter do not occur.

In Embodiment 1, the case where the alignment films 22 and 32 which include the compound-to-be-subjected-to-alignment-process with a main chain mainly including a polyimide structure are used is described; however, the main chain included in the compound-to-be-subjected-to-alignment-process is not limited to the main chain including the polyimide structure. For example, the main chain may include a polysiloxane structure, a polyacrylate structure, a polymethacrylate structure, a maleinimide polymer structure, a styrene polymer structure, a styrene/maleinimide polymer structure, a polysaccharide structure, a polyvinyl alcohol structure, or the like, and in particular, a compound-to-be-subjected-to-alignment-process with a main chain including a polysiloxane structure is preferable. Moreover, it is desirable for a glass-transition temperature Tg of a compound forming the main chain is 200° C. or higher. It is because the same effects as those in the above-described polymer compound including the polyimide structure are obtained. Examples of the compound-to-be-subjected-to-alignment-process with a main chain including a polysiloxane structure include a polymer compound including a polysilane structure represented by an expression (81). R10 and R11 in the expression (81) each are any monovalent group configured by including carbon; however, one of R10 and R11 preferably includes a crosslinkable functional group as a side chain. It is because sufficient alignment control capability is easily obtainable in the compound-subjected-to-alignment-process. As the crosslinkable functional group in this case, a group represented by the above-described expression (51), or the like is used.

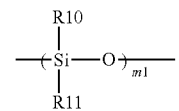

(81)

where R10 and R11 each are a monovalent organic group, and m1 is an integer of 1 or more.

Moreover, in Embodiment 1, a direction where the liquid crystal molecules 41 are inclined is specified by arranging the slit section 21 in the pixel electrodes 20B, and viewing angle characteristics are improved by multi-domain alignment; however, the invention is not limited thereto. For example, instead of the slit section 21, a projection may be arranged between the pixel electrodes 20B and the alignment film 22. When a projection is arranged in such a manner, the same effects as those in the case where the slit section 21 is arranged are obtainable. Further, a projection may be also arranged between the facing electrode 30B of the CF substrate 30 and the alignment film 32. In this case, the projection on the TFT substrate 20 and the projection on the CF substrate 30 are arranged not to face each other between the substrates. Also in this case, the same effects as the above-described effects are obtainable.

Next, other embodiments will be described below, and like components are denoted by like numerals as of Embodiment 1 and will not be further described. Moreover, the same functions and effects as those in Embodiment 1 will not be further described. Further, various technical matters described in Embodiment 1 are applied to other embodiments as appropriate.

Embodiment 2

Embodiment 2 is a modification of Embodiment 1. In Embodiment 1, the liquid crystal display (liquid crystal display element) formed to allow the pretilts θ1 and θ2 of the liquid crystal molecules 41A and 41B placed in proximity to the alignment films 22 and 32 to be substantially equal to each other is described; however, in Embodiment 2, the pretilt θ1 and the pretilt θ2 are different from each other.

More specifically, in Embodiment 2, first, as in the case of the above-described step S101, the TFT substrate 20 including the alignment film 22 and the CF substrate 30 including the alignment film 32 are formed. Next, for example, an ultraviolet absorbing agent is included and sealed in the liquid crystal layer 40. Then, when a predetermined voltage is applied between the pixel electrodes 20B and the facing electrode 30B, and ultraviolet radiation is applied from the TFT substrate 20 side, the compound-to-be-subjected-to-alignment-process in the alignment films 22 is cross-linked. At this time, as the ultraviolet absorbing agent is included in the liquid crystal layer 40, ultraviolet radiation entering from the TFT substrate 20 side is absorbed by the ultraviolet absorbing agent in the liquid crystal layer 40, and hardly reach the CF substrate 30 side. Therefore, in the alignment film 22, the compound-subjected-to-alignment-process is produced. Next, when a voltage different from the above-described predetermined voltage is applied between the pixel electrodes 20B and the facing electrode 30B, and ultraviolet radiation is applied from the CF substrate 30 side, the compound-to-be-subjected-to-alignment-process in the alignment film 32 is reacted to form the compound-subjected-to-alignment-process. Therefore, the pretilts θ1 and θ2 of the liquid crystal molecules 41A and 41B placed in proximity to the alignment films 22 and 32 are allowed to be set based on the voltage applied in the case where ultraviolet radiation is applied from the TFT substrate 20 side and the voltage applied in the case where ultraviolet radiation is applied from the CF substrate 30 side. Therefore, the pretilt θ1 and the pretilt θ2 are allowed to be different from each other. However, in the TFT substrate 20, TFT switching elements or various bus lines are arranged, and various transverse electric fields are generated during driving. Therefore, it is desirable that the alignment film 22 on the TFT substrate 20 side is formed to allow the pretilt θ1 of the liquid crystal molecules 41A placed in proximity to the alignment film 22 to be larger than the pretilt θ2 of the liquid crystal molecules 41B placed in proximity to the alignment film 32. Therefore, misalignment of the liquid crystal molecules 41A due to the transverse electric fields is allowed to be reduced effectively.

Embodiment 3

Embodiment 3 is a modification of Embodiments 1 and 2. When description is given based on the liquid crystal display (liquid crystal display element) according to the first mode of the invention, in Embodiment 3, the alignment films 22 and 32 include a compound-to-be-subjected-to-alignment-process which includes a crosslinkable functional group as a side chain and one or more kinds of skeletons represented by expressions (1) to (11) in a main chain or a side chain, and the compound-subjected-to-alignment-process provides the pretilts θ1 and θ2 to the liquid crystal molecules 41A and 41B. Moreover, when description is given based on Embodiment 7 [the liquid crystal display (liquid crystal display element) according to the fifth mode of the invention] which will be described later, the alignment films 22 and 32 include a compound-to-be-subjected-to-alignment-process including a photosensitive functional group as a side chain and one or more kinds of skeletons represented by the expressions (1) to (11) in a main chain, and the compound-subjected-to-alignment-process provides the pretilts θ1 and θ2 to the liquid crystal molecules 41A and 41B. The skeletons represented by the expressions (1) to (11) may be included in only one or both of the main chain and the side chain. In the case where the skeletons represented by the expressions (1) to (11) are included in the side chain, the side chain is preferably bonded to the main chain through an ether bond or an ester bond.

(1)

(2)

(3)

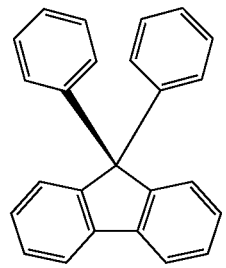

(4)

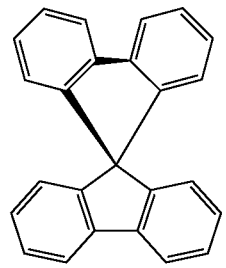

(5)

(6)

(7)

(8)

(9)

(10)

(11)

Alternatively, when description is given based on the liquid crystal display (liquid crystal display element) according to the second mode of the invention, the alignment films 22 and 32 include a compound (compound-subjected-to-alignment-process) including a polymer compound with a side chain cross-linked, the polymer compound including a crosslinkable functional group as a side chain and including, in a main chain or the side chain, (a) a skeleton structure in which two or more planar structures are twisted around one another, or (b) a skeleton structure in which two or more eight or less-membered ring steric structure are twisted around one another (that is, rings in ring structures (steric structures) are twisted around one another, and are not present on one and the same plane), and the compound-subjected-to-alignment-process provides the pretilts θ1 and θ2 to the liquid crystal molecules 41A and 41B. Moreover, when description is given based on Embodiment 7 [the liquid crystal display (liquid crystal display element) according to the sixth mode of the invention] which will be described later, the alignment films 22 and 32 include a compound (compound-subjected-to-alignment-process) including a photosensitive functional group as a side chain and including, in a main chain, (a) a skeleton structure in which two or more planar structures are twisted around one another, or (b) a skeleton structure in which two or more eight or less-membered ring steric structure are twisted around one another (that is, rings in ring structures (steric structures) are twisted around one another, and are not present on one and the same plane), and the compound-subjected-to-alignment-process provides the pretilts θ1 and θ2 to the liquid crystal molecules 41A and 41B. In this case, the skeleton structure in which two or more planar structures are twisted around one another is allowed to be exemplified by the above-described expressions (4) and (5), and the skeleton structure in which two or more eight or less-membered ring steric structure are twisted around one another is allowed to be exemplified by the above-described expressions (6) to (9), and these polymer compounds are sterically bulky. Note that an expression (21) is a generalized expression of the compounds represented by the expressions (1) to (3) and the expressions (10) to (11). Moreover, compounds having structures represented by expressions (31) and (32) may be cited, and the expression (31) is a generalized expression of the compound represented by the expression (4).

The skeletons represented by the expressions (1) to (11) are included in the compound-subjected-to-alignment-process, because compared to the case where these skeletons are not included, the response speed is improved. More specifically, the following reason is considered. When the main chain or the side chain of the compound-to-be-subjected-to-alignment-process includes these skeletons, the skeletons represented by the expressions (1) to (11) are sterically bulky, so in the alignment films 22 and 32, gaps are formed between the twisted main chains of the compound-to-be-subjected-to-alignment-process, and the alignment films 22 and 32 are formed in a state where the density thereof is sparse. Next, after the liquid crystal layer 40 is sealed, when a predetermined electric field is applied to the liquid crystal layer 40, some of the liquid crystal molecules 41 in proximity to the alignment films 22 and 32 are embedded in the gaps in the compound-to-be-subjected-to-alignment-process of the alignment films 22 and 32, and are aligned to have predetermined inclination with respect to the substrate surface together with the other liquid crystal molecules 41. As in the case of Embodiment 1, the pretilt θ is provided to the liquid crystal molecules 41A and 41B in proximity to the alignment films 22 and 32 by cross-linking the compound-to-be-subjected-to-alignment-process in this state. In addition, the liquid crystal molecules 41 embedded in the gaps of the compound-to-be-subjected-to-alignment-process are fixed to be supported by the compound-subjected-to-alignment-process; therefore, by the liquid crystal molecules 41A and 41B fixed to the alignment films 22 and 32, the pretilt θ is provided to the liquid crystal molecules 41A and 41B in proximity thereto. Therefore, the ratio of the liquid crystal molecules 41A and 41B having the pretilt θ in the liquid crystal layer 40 is increased to improve the response speed.

As long as the skeletons represented by the expressions (1) to (11) are included in the main chain or the side chain in the compound-to-be-subjected-to-alignment-process, one kind or a plurality of kinds selected from the skeletons may be included, and the number included in the polymer compound and a connected structure and the like are arbitrarily set. In the case where the compound-to-be-subjected-to-alignment-process is a polymer compound including the polyimide structure represented by the above-described expression (41), the skeletons represented by the above-described expressions (1) to (11) are included in R1 or R2 in the expression (41). In this case, the skeletons represented by the expressions (1) to (11) may be included in one or both of R1 and R2. Moreover, the side chain may be bonded to the skeletons represented by the expressions (1) and (11) included in the main chain, and examples of the side chain include a side chain including the above-described crosslinkable functional group and a side chain including a vertical alignment inducing structure section, and among them, in the case where the compound-to-be-subjected-to-alignment-process includes the polyimide structure represented by the above-described expression (41), the compound-to-be-subjected-to-alignment-process preferably includes three kinds of structures, that is, a repeating unit including the skeletons represented by the expressions (1) to (11) as R2, a repeating unit including a vertical alignment inducing structure section as R2 and a repeating unit including a crosslinkable functional group as R2. It is because they are easily available, and the ratio of the skeletons represented by the expressions (1) to (11) included in the compound-to-be-subjected-to-alignment-process is easily adjusted, and the film density which will be described later of the alignment films 22 and 32 easily has a desired value.

Alternatively, when description is given based on the liquid crystal display (liquid crystal display element) according to the third mode of the invention, the alignment films 22 and 32 include a compound (polymer compound) including a polymer compound (for example, in the case where the number of ring structures is two, two ring structures are bonded by two shared atoms) with a side chain cross-linked, the polymer compound including a crosslinkable functional group as a side chain, and including, in a main chain, (a) an adamantane homolog, (b) a spiro compound, or (c) a structure represented by the expression (21) in which two or more ring structures are included and two or more of the ring structures share two or more atoms, and the polymer compound (compound-subjected-to-alignment-process) with the side chain cross-linked provides the pretilts θ1 and θ2 to the liquid crystal molecules 41A and 41B. Moreover, when description is given based on Embodiment 7 [the liquid crystal display (liquid crystal display element) according to the seventh mode of the invention] which will be described later, the alignment films 22 and 32 include a compound (for example, in the case where the number of ring structures is two, two ring structures are bonded by two shared atoms) including a photosensitive functional group as a side chain and including, a main chain, (a) an adamantane homolog, (b) a spiro compound, or (c) a structure represented by the expression (21) in which two or more ring structures are included and two or more of the ring structures share two or more atoms, and the compound-subjected-to-alignment-process provides the pretilts θ1 and θ2 to the liquid crystal molecules 41A and 41B. Note that as one specific example of the polymer compound including the structure represented by the expression (21), a polymer compound including a structure represented by an expression (22) may be cited. More specifically, as the adamantane homolog, compounds represented by the expressions (1) to (3) may be cited, and as the spiro compound, compounds represented by the expressions (6) to (9) may be cited, and as the structure represented by the expression (21) in which two or more ring structures are included and two or more of the ring structures share two or more atoms, compounds represented by the expressions (1) to (3) and the expressions (10) and (11) may be cited.

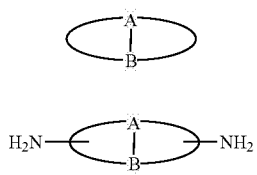

(21)

(22)

where A and B are trivalent or higher valent organic groups, for example, trivalent or tetravalent organic groups which are the same as or different from each other.

In the expression (21), A and B may be the same groups or different groups. As long as the organic groups each include a carbon atom, the organic groups each may include one kind or two or more kinds of other atoms such as hydrogen atom or oxygen atom. Specific examples of the structure represented by the expression (21) include the structures represented by the above-described expressions (1) to (3) and the above-described expressions (10) and (11), but the structure represented by the expression (21) is not limited thereto.

Alternatively, when description is given based on the liquid crystal display (liquid crystal display element) according to the fourth mode of the invention, the alignment films 22 and 32 include a compound (polymer compound) with a side chain cross-linked which includes a crosslinkable functional group as a side chain and a polyimide compound in a main chain, the polyimide compound being configured of one or both of compounds (compounds-to-be-subjected-to-alignment-process) represented by expressions (31) and (32) as precursor diamines, and the compound (compound-subjected-to-alignment-process) with the side chain cross-linked provides the pretilts θ1 and θ2 to the liquid crystal molecules 41A and 41B. Moreover, when description is given based on Embodiment 7 [the liquid crystal display (liquid crystal display element) according to the eighth mode of the invention] which will be described later, the alignment films 22 and 32 include a compound (polymer compound) including a photosensitive functional group as a side chain and including a polyimide compound in a main chain, the polyimide compound being configured of one or both of compounds (compounds-to-be-subjected-to-alignment-process) represented by expressions (31) and (32) as precursor diamines, and a compound-subjected-to-alignment-process provides the pretilts θ1 and θ2 to the liquid crystal molecules 41A and 41B.

(31)

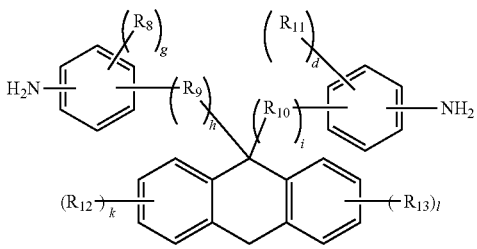

(32)

where R2, R5, R6 and R7 are alkyl groups, alkoxy groups or halogen atoms which are the same as or different from one another, R3 and R4 are divalent organic groups which are the same as or different from each other, a, d, e and f each are an integer of 0 to 4 both inclusive, b and c each are 0 or 1, R8, R11, R12 and R13 are alkyl groups, alkoxy groups or halogen atoms which are the same as or different from one another, R9 and R10 are divalent organic groups which are the same as or different from each other, g, j, k and l each are an integer of 0 to 4 both inclusive, and h and i each are 0 or 1.

R2 and R5 to R7 in the expression (31) may be the same groups or different groups. The same applies to R3 and R4. Moreover, in the case where a plurality of R2 groups are present, the plurality of R2 groups may be the same groups or different groups. The same applies to R3 to R7. In the case where a plurality of R2, R5, R6 or R7 groups are present, they may be the same as or different from one another. The number of carbon atoms in the alkyl group and the alkoxy group and the kind of halogen atom are arbitrarily set. As long as the organic group includes a carbon atom, the organic group may include one kind or two or more kinds of other atoms such as hydrogen atom or oxygen atom. Moreover, R8 and R11 to R13 in the expression (32) may be the same groups or different groups. The same applies to R9 and R10. In the case where a plurality of R8, R11, R12 or R13 groups are present, they may be the same as or different from one another. The same applies to R9 to R13. Note that specific descriptions of the alkyl group, the alkoxy group, the halogen atom and the organic group are the same as those in the case where the expression (31) is described.

As described above, the compound-to-be-subjected-to-alignment-process (for example, a polyamic acid or a polyimide) is allowed to be obtained by reacting a tetracarboxylic dianhydride represented by the following expression (42), and the compound represented by the above-described expression (22) (including the adamantane homolog) and/or the diamine compound(s) represented by the above-described expression (31) and/or (32). Note that to adjust vertical alignment, diamines represented by expressions (51-1) to (51-27) may be used.

(42)

As the tetracarboxylic dianhydride used to synthesize a polyamic acid, tetracarboxylic dianhydrides represented by expressions (C-1) to (C-23) and expressions (d-1) to (d-6) which will be described later are cited, or examples of the tetracarboxylic dianhydride include aliphatic group or alicyclic tetracarboxylic dianhydrides such as butanetetracarboxylic dianhydride, 1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexyltetracarboxylic dianhydride, 2,3,5-tricarboxycyclopentyl acetic dianhydride, 3,5,6-tricarboxynorbornane-2-acetic dianhydride, 2,3,4,5-tetrahydrofurantetracarboxylic dianhydride, 5-(2,5-dioxotetrahydrofural)-3-methyl-3-cyclohexene-1,2-dicarboxylic dianhydride and bicyclo[2,2,2]-oct-7-ene-2,3,5,6-tetracarboxylic dianhydride; aliphatic group tetracarboxylic dianhydrides including a benzene ring such as 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, 1,3,3a,4,5,9b-hexahydro-5-ethyl-5-(tetrahydro-2,5-dioxo-3-furanyl)-naphtho[1,2-c]furan-1,3-dione, 1,3,3a,4,5,9b-hexahydro-7-methyl-5-(tetrahydro-2,5-dioxo-3-furanyl)-naphtho[1,2-c]furan-1,3-dione, 1,3,3a,4,5,9b-hexahydro-7-ethyl-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-8-ethyl-5-(tetrahydro-2,5-dioxo-3-furanyl)-naphtho[1,2-c]furan-1,3-dione, 1,3,3a,4,5,9b-hexahydro-5,8-dimethyl-5-(tetrahydro-2,5-dioxo-3-furanyl)-naphtho[1,2-c]furan-1,3-dione; and aromatic tetracarboxylic dianhydrides such as pyromellitic dianhydride, 3,3',4,4'-benzophenonetetracarboxylic dianhydride, 3,3',4,4'-biphenylsulfonetetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidene diphthalic dianhydride, 3,3',4,4'-biphenyl tetracarboxylic dianhydride, bis(phthalic acid)phenylphosphineoxide dianhydride, p-phenylene-bis(triphenylphthalic acid)dianhydride, m-phenylene-bis(triphenylphthalic acid)dianhydride, bis(triphenylphthalic acid)-4,4'-diphenyl ether dianhydride and bis(triphenylphthalic acid)-4,4'-diphenylmethane dianhydride. Only one kind or a combination of two or more kinds selected from these tetracarboxylic dianhydrides may be used. Note that butanetetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,4-dicarboxy-1,2,3,4-tetrahydro-1-naphthalene succinic anhydride, 3,4-dicarboxy-6-methyl-1,2,3,4-tetrahydro-1-naphthalene succinic anhydride, 3,4-dicarboxy-7-methyl-1,2,3,4-tetrahydro-1-naphthalene succinic anhydride, 5-(2,5-dioxotetrahydrofural)-3-methyl-3-cyclohexene-1,2-dicarboxylic dianhydride; 1,3,3a,4,5,9b-hexahydro-8-methyl-5-(tetrahydro-2,5-dioxo-3-furanyl)-naphtho[1,2-c]furan-1,3-dione, bicyclo[2,2,2]-octo-7-ene-2,3,5,6-tetracarboxylic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-5,8-dimethyl-5-(tetrahydro-2,5-dioxo-3-furanyl)-naphtho[1,2-c]furan-1,3-dione; pyromellitic dianhydride, 3,3',4,4'-benzophenonetetracarboxylic dianhydride, 3,3',4,4'-biphenylsulfonetetracarboxylic dianhydride and 1,4,5,8-naphthalene tetracarboxylic dianhydride are preferable because the alignment film formed of an alignment film material including them has favorable liquid crystal alignment for a long time, and 1,2,3,4-cyclobutane tetracarboxylic dianhydride, 1,3-dimethyl-1,2,3,4-cyclobutane tetracarboxylic dianhydride, and 2,3,5-tricarboxycyclopentyl acetic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-5,8-dimethyl-5-(tetrahydro-2,5-dioxo-3-furanyl)-naphtho[1,2-c]furan-1,3-dione and pyromellitic dianhydride are specifically preferable.

Specific examples of the above-described expression (31) may include compounds represented by the following expressions (E-1) to (E-3), and the compounds represented by the expression (E-1) and the expression (E-3) are specifically preferable because an alignment film formed of an alignment film material including them has favorable liquid crystal alignment for a long time. Moreover, specific examples of the above-described expression (32) include compounds represented by the following expressions (E-4) to (E-6), and the compound represented by the expression (E-4) is specifically preferable because an alignment film formed of an alignment film material including the compound has favorable liquid crystal alignment for a long time.

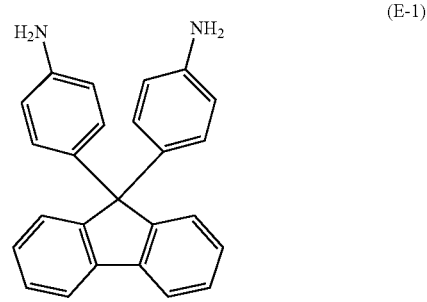

(E-1)

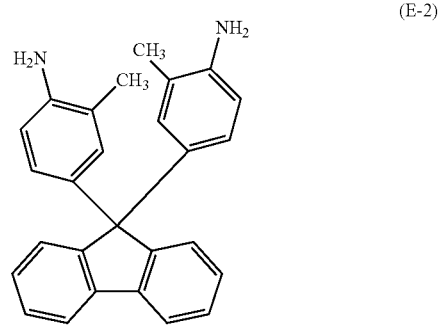

(E-2)

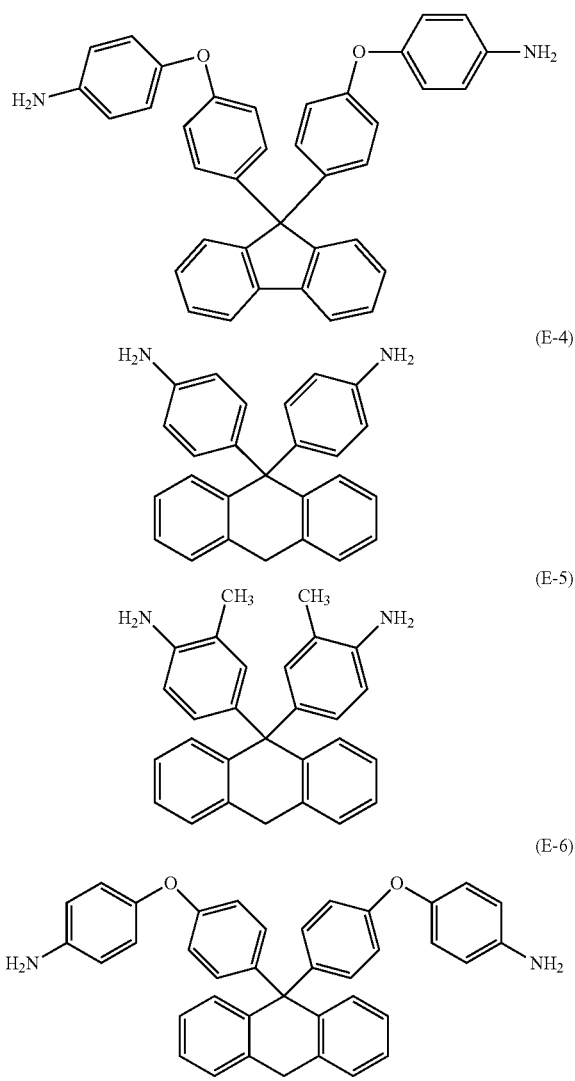

(E-3)
(E-4)
(E-5)
(E-6)

To exert effects of the invention reliably, the ratio of specific diamine compounds represented by the expressions (E-1) to (E-6) in the diamine compounds provided to react with the tetracarboxylic dianhydride is preferably within a range of 50 mol % to 100 mol %, more preferably within a range of 70 mol % to 100 mol %. The use ratio of the tetracarboxylic dianhydride and the diamine compound provided for polyamic acid synthesis reaction is preferably a ratio where the equivalent of an acid anhydride group of the tetracarboxylic dianhydride is 0.2 to 2 with respect to 1 as an equivalent of an amino group included in the diamine compound (the above-described specific diamine compound or another diamine compound), more preferably a ratio where the equivalent of an acid anhydride group of the tetracarboxylic dianhydride is 0.3 to 1.2. The polyamic acid synthesis reaction by the tetracarboxylic dianhydride and the diamine compound is performed in an organic solvent for 1 to 48 hours under a temperature condition of typically 0° C. to 150° C., preferably 0° to 100° C. Note that depending on reaction conditions, a part of the polyamic acid may be imidized; however, there is no issue in using the polyamic acid as a resin forming the alignment film. The organic solvent used for this reaction is not specifically limited as long as the organic solvent is allowed to dissolve the polyamic acid which is a reaction product, and examples of the organic solvent include aprotic polar solvents such as N-methyl-2-pyrrolidone, N,N-dimethylacetamide, N,N-dimethylformamide, dimethyl sulfoxide, γ-butyrolactone and tetramethylurea, hexamethylphosphortriamide; phenol-based solvents such as m-cresol, xylenol, phenol and halogenated phenol. As the use amount of the organic solvent, typically, the total amount of the tetracarboxylic dianhydride and the diamine compound is preferably within a range of 0.1 wt % to 30 wt % with respect to the total amount of a reaction solution.

The polyimide used as a resin forming the alignment film is allowed to be prepared in the following method. Namely, the above-described polyamic acid is heated. The reaction temperature in this method is typically 60° C. to 250° C., and preferably 100° C. to 170° C. When the reaction temperature is lower than 60° C., imidization reaction does not proceed sufficiently, and when the reaction temperature exceeds 250° C., the molecular weight of an obtained imidized polymer may be reduced.

As described above, the film density of the alignment films 22 and 32 is preferably 1.30 g/cm$^3$ or less. It is because as the pretilt θ is allowed to be more smoothly provided to the liquid crystal molecules 41A and 41B, the response speed is further improved. Specifically, the film density of the alignment films 22 and 32 is preferably within a range of 1.20 g/cm$^3$ to 1.29 g/cm$^3$ both inclusive. Within the range, a preferable pretilt θ is provided.

Note that the film density of the alignment films 22 and 32 is allowed to be determined by, for example, an X-ray reflectivity method. More specifically, first, the film structures of the alignment films 22 and 32 are assumed, and a theoretical X-ray reflectivity curve is determined. Next, the X-ray reflectivity of the alignment films 22 and 32 is measured, and fitting of the theoretical X-ray reflectivity curve with respect to the measurement result is performed with use of physical amounts (film thickness, film density, surface roughness and the like) for determining reflectivity as parameters. Therefore, the film density is determined as a value providing an optimum fitting result.

Figure 3:
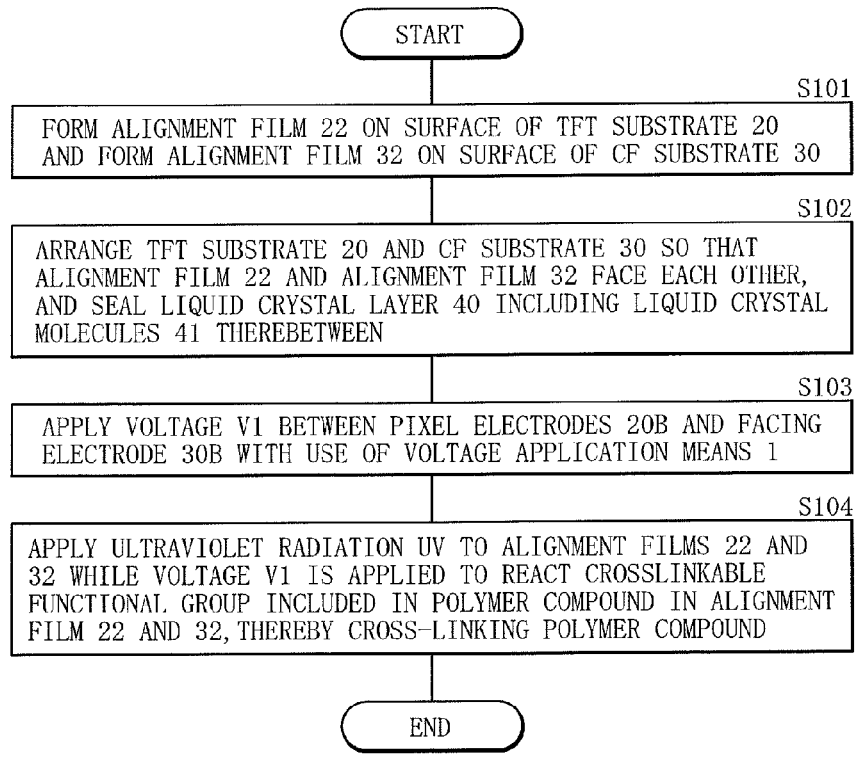
FIG. 3 is a flow chart for describing a method of manufacturing the liquid crystal display illustrated in FIG. 1.

The liquid crystal display (liquid crystal display element) of Embodiment 3 is allowed to be manufactured in the same manner as the liquid crystal display (liquid crystal display element) of Embodiment 1, except that, for example, in the step S101 illustrated in FIG. 3, the composition of the alignment film material used to form the alignment films 22 and 32 is changed.

The alignment film material is prepared, for example, by mixing the above-described compound-to-be-subjected-to-alignment-process or a polymer compound precursor as the above-described compound-to-be-subjected-to-alignment-process and a solvent, and if necessary, a vertical alignment agent. For example, in the case where the compound-to-be-subjected-to-alignment-process includes the polyamide structure represented by the expression (41), as the polymer compound precursor, a polyamic acid including a crosslinkable functional group and one or more kinds of skeletons represented by the expressions (1) to (11) is cited. One or both of a diamine compound and a tetracarboxylic dianyhydride for synthesizing the polyamic acid include a crosslinkable functional group, and include the skeletons represented by the expressions (1) to (11). Examples of the diamine compound including a crosslinkable functional group include the compounds represented by the above-described expressions (A-1) to (A-16), and examples of the tetracarboxylic dianhydride include the compounds represented by the expressions (a-1) to (a-10). Examples of the diamine compound including the skeletons represented by the expressions (1) to (11) include compounds represented by expressions (D-1) to (D-9), and examples of the tetracarboxylic dianhydride include compound represented by expressions (d-1) to (d-6).

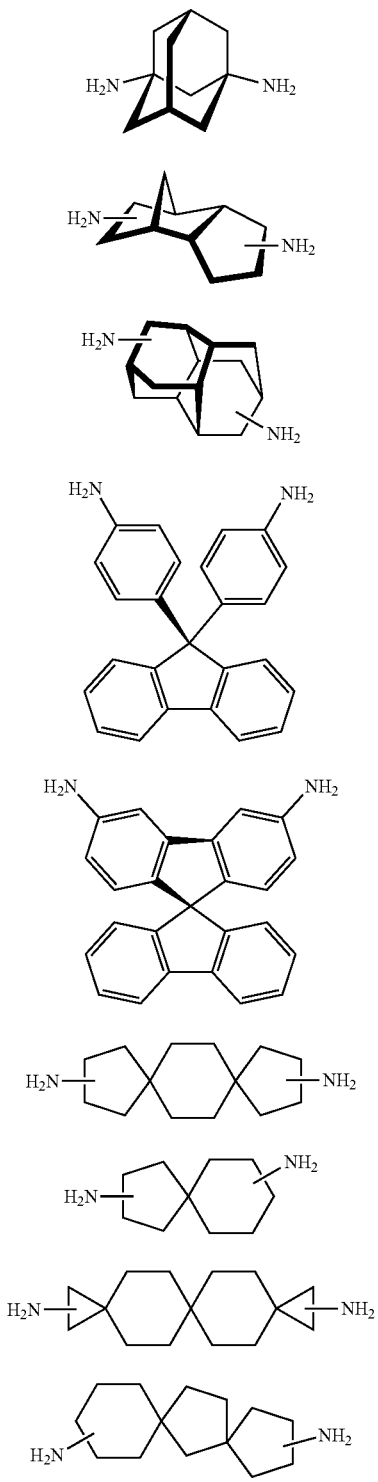

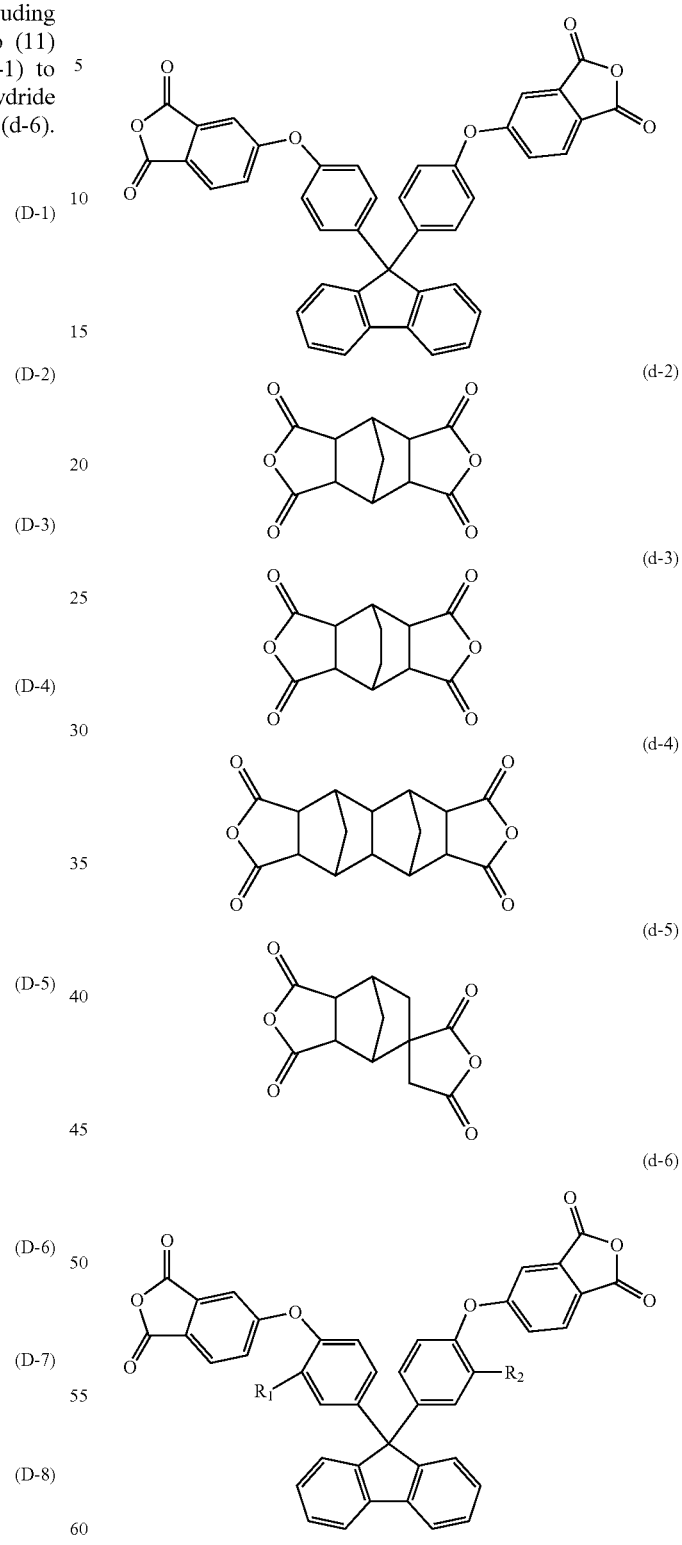

where R1 and R2 are alkyl groups, alkoxy groups or halogen atoms which are the same as or different from each other.

Moreover, in the case where the polyamic acid which is the polymer compound precursor as the compound-to-be-subjected-to-alignment-process is synthesized to allow the compound-to-be-subjected-to-alignment-process to include a vertical alignment inducing structure section, in addition to the compound including the above-described crosslinkable functional group and the compound including the skeletons represented by the expressions (1) to (11), compounds represented by expressions (B-1) to (B-36) as the diamine compound including the vertical alignment inducing structure section or compounds represented by expressions (b-1) to (b-3) as the tetracarboxylic dianhydride may be used.

Moreover, in the case where the polyamic acid is synthesized to allow the compound-to-be-subjected-to-alignment-process to includes three kinds of structures, that is, a structure including a vertical alignment inducing structure section as R2 in the expression (41), a structure including a crosslinkable functional group as R2 in the expression (41) and a structure including the skeletons (hereinafter referred to as "bulky skeletons") represented by the expressions (1) to (11) as R2 in the expression (41), for example, the diamine compound and the tetracarboxylic dianhydride are selected in the following manner. Namely, one or more kinds of the compounds including a crosslinkable functional group represented by, for example, the expressions (A-1) to (A-16), one or more kinds of the compound including a vertical alignment inducing structure section represented by, for example, the expressions (B-1) to (B-36), one or more kinds of the compounds including sterically bulky skeletons represented by, for example, expressions (D-1) to (D-9), and one or more kinds of tetracarboxylic dianhydride represented by, for example, expressions (C-1) to (C-23) are used.

In the liquid crystal display (liquid crystal display element) of Embodiment 3 and the method of manufacturing the same, the above-described alignment films 22 and 32 provide predetermined pretilts θ1 and θ2 to the liquid crystal molecules 41A and 41B. Therefore, an issue in the case where a pretilt process is not performed is less likely to occur, and the response speed with respect to a drive voltage is highly improved, and display quality is improved. In addition, when the compound-subjected-to-alignment-process included in the alignment films 22 and 32 includes the skeletons represented by the expressions (1) to (11), compared to the case where these skeletons are not included, the liquid crystal molecules 41A and 41B supported with the pretilts θ1 and θ2 by the alignment films 22 and 32 are increased. Moreover, the inclination of the liquid crystal molecules 41A and 41B supported by the alignment films 22 and 32 propagates liquid crystal molecules 41A and 41B in proximity thereto, so the ratio of the liquid crystal molecules 41A and 41B provided with the pretilt θ in the whole liquid crystal layer 40 is increased. Therefore, compared to the case where the compound-subjected-to-alignment-process included in the alignment films 22 and 32 does not include the skeletons represented by the expressions (1) to (11), the response speed is further improved.

Other functions and effects in Embodiment 3 are the same as those in the above-described Embodiment 1.

Note that also in Embodiment 3, the case where the alignment films 22 and 32 including the compound-to-be-subjected-to-alignment-process with a main chain mainly including the polyimide structure are used is described; however, the main chain included in the compound-to-be-subjected-to-alignment-process is not limited to the main chain including the polyimide structure. For example, the main chain may include a polysiloxane structure, a polyacrylate structure, a polymethacrylate structure, a maleinimide polymer structure, a styrene polymer structure, a styrene/maleinimide polymer structure, a polysaccharide structure, a polyvinyl alcohol structure or the like, and in particular, a compound-to-be-subjected-to-alignment-process with a main chain including a polysiloxane structure is preferable. It is because the same effects as those in the polymer compound including the above-described polyimide structure are obtained. Examples of the compound-to-be-subjected-to-alignment-process with a main chain including a polysilane structure include a compound-to-be-subjected-to-alignment-process including the polysilane structure represented by the above-described expression (81) and one or more kinds of the skeletons represented by the expressions (1) to (11) as one repeating unit forming the main chain.

Embodiment 4

Figure 9:
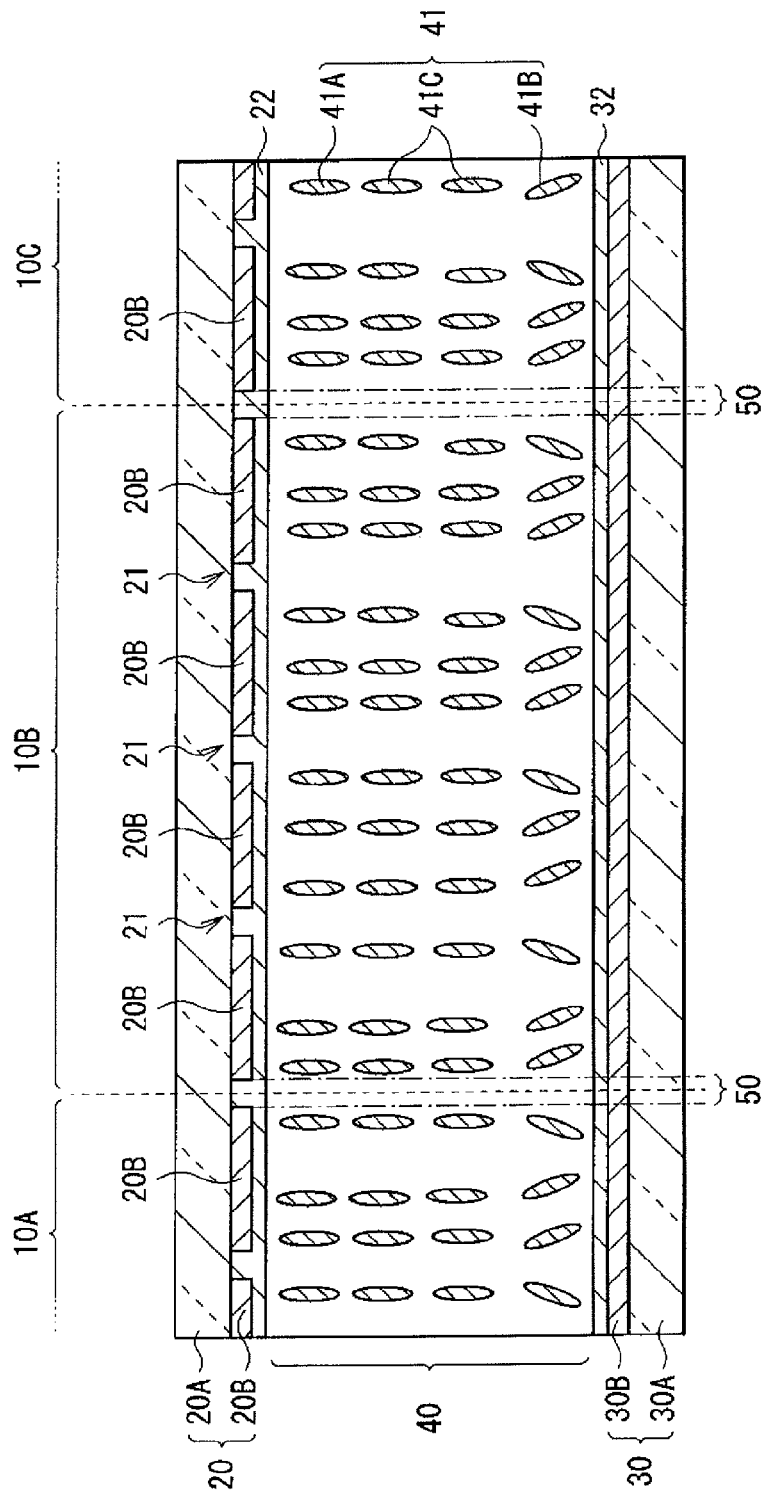
FIG. 9 is a partially schematic sectional view of a modification example of the liquid crystal display of the invention.

Embodiment 4 is a modification of Embodiments 1 to 3. FIG. 9 illustrates a partially schematic sectional view of a liquid crystal display (liquid crystal display element) according to Embodiment 4. In Embodiment 4, unlike Embodiment 1, the alignment film 22 is configured without including the compound-subjected-to-alignment-process. In other words, in Embodiment 4, the liquid crystal display (the liquid crystal display element) is configured to allow the pretilt θ2 of the liquid crystal molecules 41B placed in proximity to the alignment film 32 to be larger than 0° and to allow the pretilt θ1 of the liquid crystal molecules 41A placed in proximity to the alignment film 22 to be 0°.

In this case, the alignment film 22 is made of, for example, the above-described other vertical alignment agent.

The liquid crystal display (liquid crystal display element) of Embodiment 4 is allowed to be manufactured by using the above-described other vertical alignment agent instead of the compound-to-be-subjected-to-alignment-process or the polymer compound precursor as the compound-to-be-subjected-to-alignment-process in the case where the alignment film 22 is formed on the TFT substrate 20 (step S101 in FIG. 3).

In the liquid crystal display (liquid crystal display element) of Embodiment 4, in the liquid crystal layer 40, the pretilt θ1 of the liquid crystal molecules 41A is 0°, and the pretilt θ2 of the liquid crystal molecules 41B is larger than 0°. Therefore, compared to a liquid crystal display element on which a pretilt process is not performed, the response speed with respect to a drive voltage is allowed to be highly improved. Moreover, the liquid crystal molecules 41A are aligned in a direction substantially normal to the glass substrates 20A and 30A, so light transmission amount in black display is allowed to be reduced, and compared to the liquid crystal displays (liquid crystal display elements) in Embodiments 1 to 3, contrast is allowed to be improved. In other words, in the liquid crystal display (liquid crystal display element), for example, while contrast is improved by allowing the liquid crystal molecules 41A placed close to the TFT substrate 20 to have a pretilt θ1 of 0°, an improvement in response speed is achieved by allowing the liquid crystal molecules 41B placed close to the CF substrate 30 to have a pretilt θ2 of larger than 0°. Therefore, the response speed with respect to a drive voltage and contrast are allowed to be improved in a balanced manner.

Moreover, in the liquid crystal display (liquid crystal display element) of Embodiment 4 and the method of manufacturing the same, the alignment film 22 not including the compound-to-be-subjected-to-alignment-process is formed on the TFT substrate 20, and the alignment film 32 including the compound-to-be-subjected-to-alignment-process is formed on the CF substrate 30. Next, after the liquid crystal layer 40 is sealed between the TFT substrate 20 and the CF substrate 30, the compound-to-be-subjected-to-alignmentprocess in the alignment film 32 is reacted to produce the compound-subjected-to-alignment-process. Therefore, without using a large light irradiation apparatus, the alignment film 32 providing the pretilt θ to the liquid crystal molecule 41B is allowed to be formed; therefore, response characteristics are allowed to be improved easily. Further, for example, compared to the case where the liquid crystal layer is sealed with use of a liquid crystal material including a photopolymerization monomer, and then the photopolymerization monomer is polymerized, high reliability is allowed to be secured.

Other effects in Embodiment 4 are the same as those in Embodiment 1.

Figure 10:
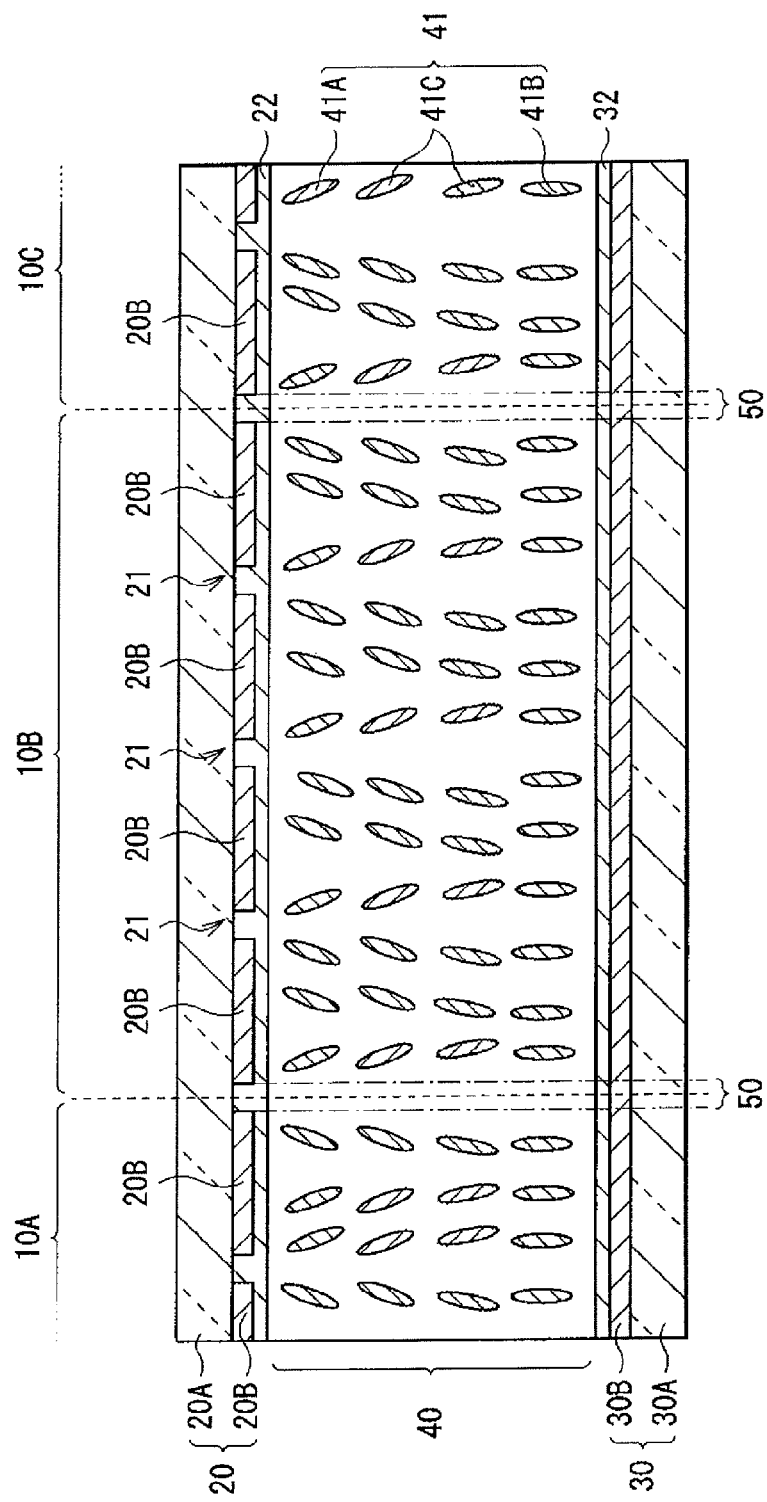
FIG. 10 is a partially schematic sectional view of the modification example of the liquid crystal display illustrated in FIG. 9.

Note that as illustrated in FIG. 9, Embodiment 4 has a configuration in which the alignment film 32 covering the CF substrate 30 therewith includes the compound-subjected-to-alignment-process, and provides the pretilt θ2 to the liquid crystal molecules 41B placed close to the CF substrate 30 in the liquid crystal layer 40; however, the invention is not limited thereto. More specifically, as illustrated in FIG. 10, a configuration in which the alignment film 32 does not include the compound-subjected-to-alignment-process, and the alignment film 22 covering the TFT substrate 20 therewith includes the compound-subjected-to-alignment-process, and provides the pretilt θ1 to the liquid crystal molecules 41A placed close to the TFT substrate 20 in the liquid crystal layer 40 may be used. Also in this case, the configuration functions in the same manner as that in Embodiment 4, and the same effects as those in Embodiment 4 are obtainable. However, as described above, in the TFT substrate 20, various transverse electric fields are generated during driving, so it is desirable to form the alignment film 22 on the TFT substrate 20 side to provide the pretilt θ1 to the liquid crystal molecules 41A placed in proximity thereto. Therefore, misalignment of the liquid crystal molecules 41 caused by the transverse electric fields is allowed to be reduced effectively.

Embodiment 5

Figure 11:
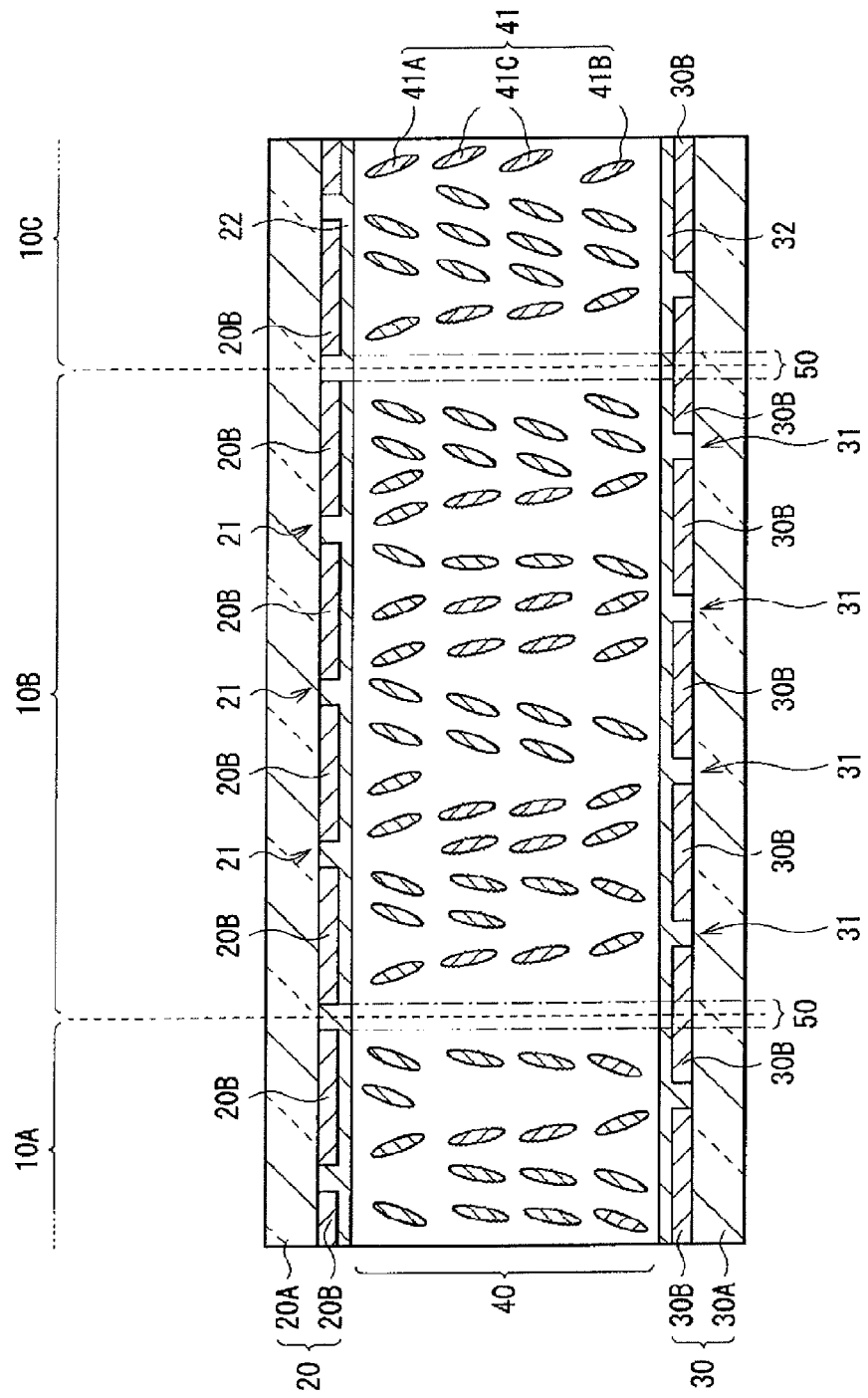
FIG. 11 is a partially schematic sectional view of another modification example of the liquid crystal display of the invention.

Embodiment 5 is also a modification of Embodiments 1 to 3. FIG. 11 illustrates a partially schematic sectional view of a liquid crystal display (liquid crystal display element) according to Embodiment 5. In Embodiment 5, the liquid crystal display (liquid crystal display element) has the same configuration as that of the liquid crystal display (liquid crystal display element) of Embodiments 1 to 3, except that the configuration of the facing electrode 30B included in the CF substrate 30 is different.

More specifically, in the facing electrode 30B, a slit section 31 is arranged in each pixel in the same pattern as that of the pixel electrode 20B. The slit section 31 is arranged not to face the slit section 21 between the substrates. Therefore, when a drive voltage is applied, an oblique electric field is provided to directors of the liquid crystal molecules 41, thereby improving the response speed with respect to a voltage, and regions with different alignment directions are formed in the pixel (multi-domain), thereby improving viewing angle characteristics.

The liquid crystal display (liquid crystal display element) of Embodiment 5 is allowed to be manufactured by using, as the CF substrate 30, a substrate formed by arranging the facing electrode 30B including a predetermined slit section 31 on a color filter of the glass substrate 30A in the step S101 in FIG. 3.

Functions and effects of the liquid crystal display (liquid crystal display element) of Embodiment 5 and the method of manufacturing the same are the same as those in the above-described Embodiments 1 to 3.

Note that in Embodiment 5, the alignment films 22 and 32 are formed to provide the pretilts θ1 and θ2 to the liquid crystal molecules 41A and 41B placed in proximity thereto; however, with use of the same method as the manufacturing method described in Embodiment 4, the pretilt θ may be provided to the liquid crystal molecules 41 placed in proximity to one of the alignment films 22 and 32. Also in this case, the same functions and effects as those in Embodiment 4 are obtained.

Embodiment 6

In Embodiments 1 to 5, in a state where the liquid crystal layer 40 is arranged, the compound-to-be-subjected-to-alignment-process is reacted in one or both of the alignment films 22 and 32 to produce the compound-subjected-to-alignment-process, thereby providing the pretilt to the liquid crystal molecules 41 in proximity thereto. On the other hand, in Embodiment 6, in a state where the liquid crystal layer 40 is arranged, the structure of a polymer compound in one or both of the alignment films 22 and 32 is decomposed to provide the pretilt to the liquid crystal molecules 41 in proximity thereto. In other words, a liquid crystal display (liquid crystal display element) of Embodiment 6 has the same configuration as that in the above-described Embodiments 1 to 5, except that a method of forming the alignment films 22 and 32 is different.

In the case where the liquid crystal molecules 41A and 41B have predetermined pretilts θ1 and θ2, the liquid crystal display (liquid crystal display element) of Embodiment 6 is manufactured by, for example, the following manner. First, for example, the alignment films 22 and 32 including a polymer compound such as the above-described other vertical alignment agent are formed on the TFT substrate 20 and the CF substrate 30. Next, the TFT substrate 20 and the CF substrate 30 with the alignment film 22 and the alignment film 32 facing each other are arranged, and the liquid crystal layer 40 is sealed between the alignment films 22 and 32. Next, a voltage is applied between the pixel electrode 20B and the facing electrode 30B, and while the voltage is applied, ultraviolet radiation UV including an optical component in a shorter wavelength region than the above-described ultraviolet radiation UV, that is, with a wavelength of approximately 250 nm is applied to the alignment films 22 and 32. At this time, the polymer compound in the alignment films 22 and 32 is decomposed by the ultraviolet radiation UV in a short wavelength region to change its structure. Therefore, predetermined pretilts θ1 and θ2 are allowed to be provided to the liquid crystal molecules 41A placed in proximity to the alignment film 22 and the liquid crystal molecules 41B placed in proximity to the alignment film 32.

Examples of the polymer compound included in the alignment films 22 and 32 before sealing the liquid crystal layer 40 include a polymer compound including a polyimide structure represented by an expression (91). When a cyclobutane structure in the expression (91) is cleaved by the application of ultraviolet radiation UV, as illustrated in a chemical equation (I), the polyimide structure represented by the expression (91) is changed to a structure represented by an expression (92).

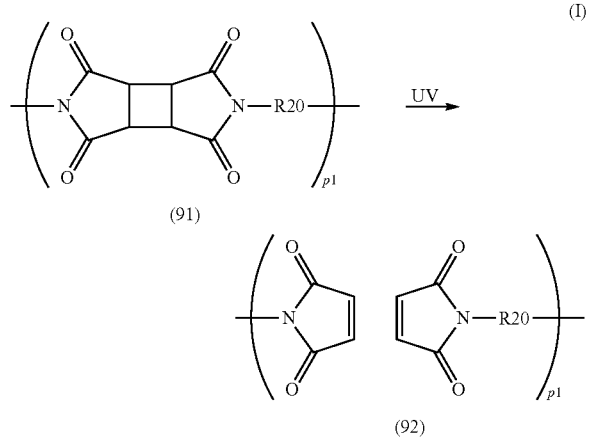

where R20 is a divalent organic group, and p1 is an integer of 1 or more.

In Embodiment 6, the liquid crystal molecules 41A placed in proximity to the alignment film 22 and the liquid crystal molecules 41B placed in proximity to the alignment film 32 have predetermined pretilts θ1 and θ2; therefore, compared to a liquid crystal display element on which a pretilt process is not performed, the response speed is allowed to be highly improved. Moreover, without using a large apparatus, one or both of the alignment films 22 and 32 capable of providing the pretilt θ to the liquid crystal molecules 41 are allowed to be formed. Therefore, response characteristics are allowed to be improved easily. However, as the decomposition or the like of the liquid crystal molecules 41 caused by ultraviolet radiation applied to the alignment films 22 and 32 may occur, the above-described Embodiments 1 to 5 easily secure higher reliability.

Embodiment 7

Embodiment 7 relates to liquid crystal displays (liquid crystal display elements) according to the fifth to eighth modes of the invention and methods of manufacturing a liquid crystal display (liquid crystal display element) according to the fifth to twelfth modes of the invention.

In Embodiments 1 to 5, the compound-subjected-to-alignment-process is obtained by cross-linking a crosslinkable functional group in the compound-to-be-subjected-to-alignment-process including a crosslinkable functional group as a side chain. On the other hand, in Embodiment 7, the compound-subjected-to-alignment-process is obtained based on the compound-to-be-subjected-to-alignment-process including, as a side chain, a photosensitive functional group which is deformed by the application of an energy ray.

Figure 14:
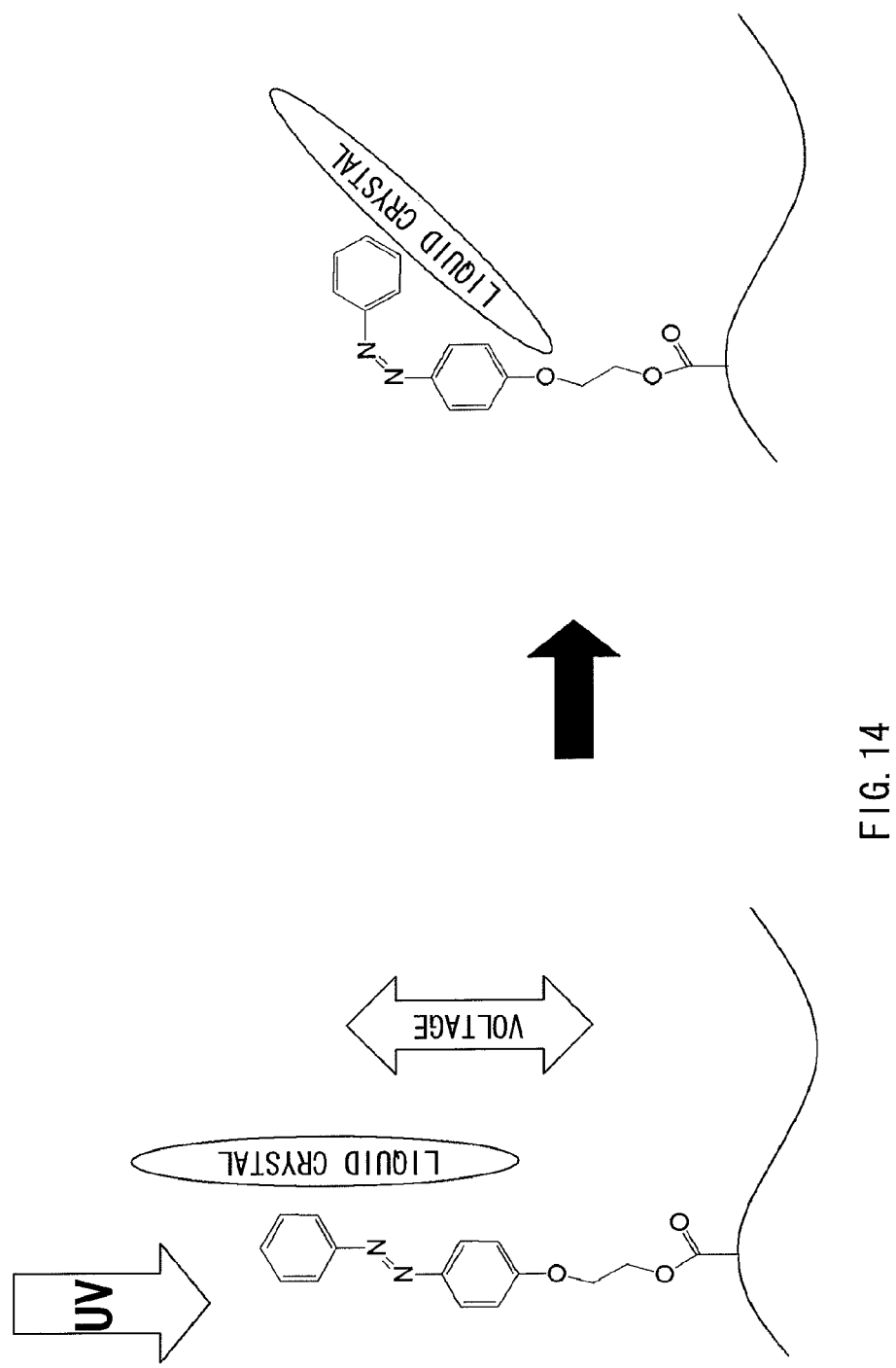
FIG. 14 is a conceptual diagram describing a relationship between a deformed polymer compound and a liquid crystal molecule.

In this case, also in Embodiment 7, the alignment films 22 and 32 are configured by including one kind or two or more kinds of polymer compounds (compounds-subjected-to-alignment-process). Then, a deformed compound (compound-subjected-to-alignment-process) provides a pretilt to liquid crystal molecules. In this case, the compound-subjected-to-alignment-process is produced by arranging the liquid crystal layer 40 after forming the alignment films 22 and 32 including one kind or two or more kinds of polymer compounds (compounds-to-be-subjected-to-alignment-process) with a main chain and a side chain, and then deforming the polymer compounds or applying an energy ray to the polymer compounds, more specifically, deforming a photosensitive functional group included in the side chain while applying an electric field or a magnetic field. Note that such a state is illustrated in a conceptual view in FIG. 14. Note that in FIG. 14, a direction of an arrow with "UV" and a direction of an arrow with "voltage" do not indicate a direction where ultraviolet radiation is applied and a direction of an applied electric field. Then, the compound-subjected-to-alignment-process includes a structure allowing liquid crystal molecules to be aligned in a predetermined direction (more specifically, an oblique direction) with respect to a pair of substrates (more specifically, the TFT substrate 20 and the CF substrate 30). Thus, when the polymer compounds are deformed or when an energy ray is applied to the polymer compounds, the compound-subjected-to-alignment-process is included in the alignment films 22 and 32, thereby allowing the pretilt to be provided to the liquid crystal molecules 41 in proximity to the alignment films 22 and 32; therefore, the response speed is increased, and display characteristics are improved.

As the photosensitive functional group, an azobenzene-based compound including an azo group, a compound in which an imine and an aldimine are included in a skeleton (for the sake of convenience, referred to as "aldimine benzene") and a compound including a styrene skeleton (for the sake of convenience, referred to as "stilbene") are allowed to be exemplified. These compounds are deformed in response to an energy ray (for example, ultraviolet radiation), that is, these compounds transit from a trans state to a cis state, and as a result, these compounds are capable of providing a pretilt to liquid crystal molecules.

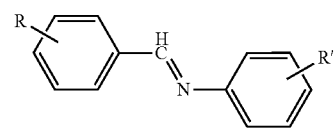

aldimine benzene

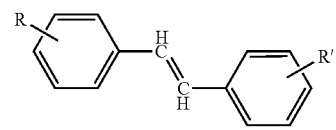

stilbene

As "X" in the azobenzene-based compound represented by an expression (AZ-0), more specifically, for example, the following expressions (AZ-1) to (AZ-9) are allowed to be exemplified.

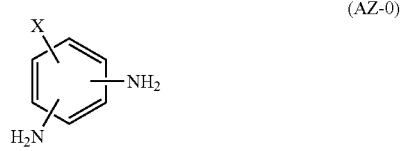

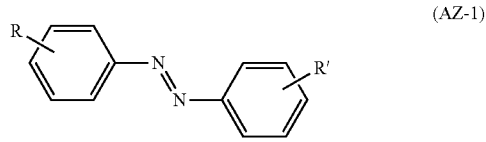

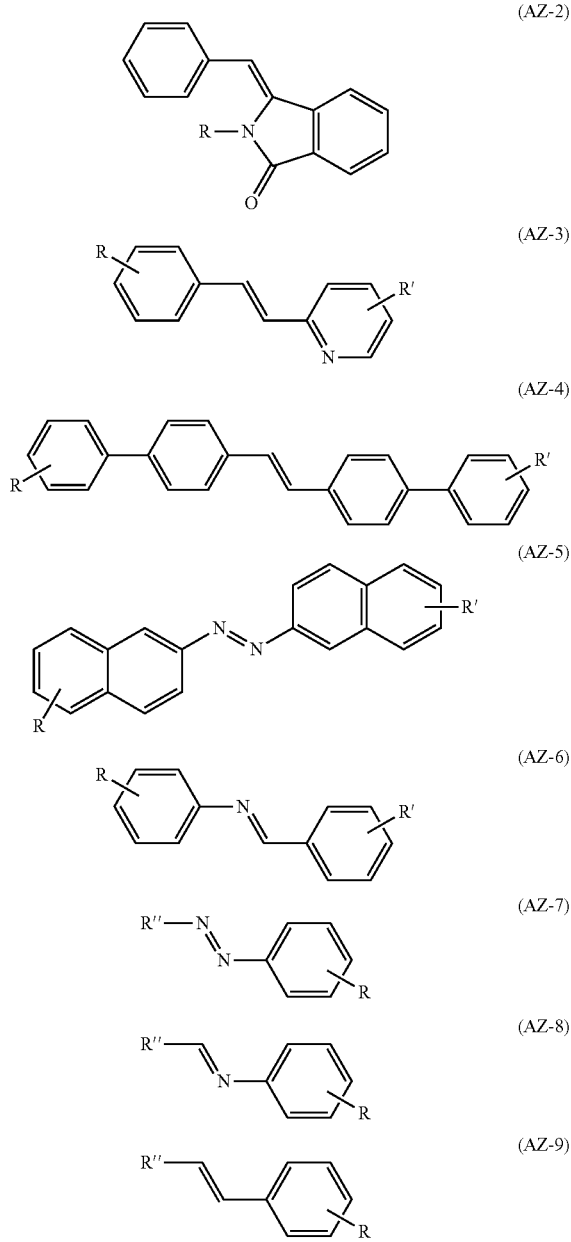

where one of R and R" is bonded to a benzene ring including a diamine and the other is an end group, R, R' and R" each are a monovalent group including a hydrogen atom, a halogen atom, an alkyl group, an alkoxy group or a carbonate group, or a derivative thereof, and R" is directly bonded to a benzene ring including a diamine The liquid crystal display of Embodiment 7 and the method of manufacturing the same can be basically and substantially considered the same as the liquid crystal displays and the methods of manufacturing the same described in Embodiments 1 to 5 except that the compound-to-be-subjected-to-alignment-process including a photosensitive functional group deformed by application of an energy ray (more specifically, ultraviolet radiation) was used, and will not be further described.

Example 1

In Example 1, various liquid crystal displays (liquid crystal display elements) were formed, and their response speeds were measured.

Example 1A

In Example 1A, a liquid crystal display (liquid crystal display element) illustrated in FIG. 11 was formed in the following steps.

First, the TFT substrate 20 and the CF substrate 30 were prepared. As the TFT substrate 20, a substrate in which the pixel electrodes 20B made of ITO with a slit pattern (with a line width of 60 μm and a space of 10 μm: the slit section 21) were formed on one surface of the glass substrate 20A with a thickness of 0.7 mm was used. Moreover, as the CF substrate 30, a substrate in which the facing electrode 30B made of ITO with a slit pattern (with a line width of 60 μm and a space of 10 μm: the slit section 31) was formed on the color filter of the glass substrate 30A with a thickness of 0.7 mm with the color filter formed thereon was used. An oblique electric field was added between the TFT substrate 20 and the CF substrate 30 by the slit patterns formed in the pixel electrode 20B and the facing electrode 30B. Next, a 4-μm spacer projection was formed on the TFT substrate 20.

On the other hand, an alignment film material was prepared. In this case, first, 1 mol of a compound having the crosslinkable functional group represented by the expression (A-7) as a diamine compound, 1 mol of a compound having the vertical alignment inducing structure section represented by the expression (B-6) and 2 mol of the tetracarboxylic dianhydride represented by the expression (C-2) were dissolved in N-methyl-2-pyrrolidone (NMP). Next, after this solution was reacted at 60° C. for 6 hours, a large excess of pure water was injected in the reacted solution to precipitate a reaction product. Next, after a precipitated solid was separated, the solid was cleaned with pure water, and was dried at 40° C. for 15 hours under reduced pressure, thereby synthesizing a polyamic acid which was a polymer compound precursor as the compound-to-be-subjected-to-alignment-process. Finally, after 3.0 g of the obtained polyamic acid was dissolved in NMP to form a solution with a solid content concentration of 3 wt %, and then the solution was filtered through a 0.2-μm filter.

Next, after each of the TFT substrate 20 and the CF substrate 30 was coated with the prepared alignment film material with use of a spin coater, coating films were dried for 80 seconds by a hot plate at 80° C. Next, the TFT substrate 20 and the CF substrate 30 were heated for 1 hour in an oven at 200° C. in a nitrogen gas atmosphere. Therefore, the alignment films 22 and 32 with a thickness of 80 nm (800 angstroms) were formed on the pixel electrodes 20B and the facing electrode 30B, respectively.

Next, a seal section was formed by coating an edge of a pixel section on the CF substrate 30 with an ultraviolet curable resin including silica particles with a particle diameter of 4 μm, and a liquid crystal material made of MCL-7029 (manufactured from Merck Ltd.) as a negative liquid crystal was dropped in a portion surrounded by the seal section. After that, the TFT substrate 20 and the CF substrate 30 were bonded together to allow a center of a line portion of each pixel electrode 20B and the slit section 31 of the facing electrode 30B to face each other, and the seal section was cured. Next, the seal section was heated for 1 hour in an oven at 120° C. to be completely cured. Therefore, the liquid crystal layer 40 was sealed, and a liquid crystal cell was able to be completed.

Next, in a state where an alternating electric field (60 Hz) of a rectangular wave with an RMS voltage of 10 volts was applied to the liquid crystal cell formed in such a manner, uniform ultraviolet radiation of 500 mJ (measured at a wavelength of 365 nm) was applied to the liquid crystal cell to react the compound-to-be-subjected-to-alignment-process in the alignment films 22 and 32. Therefore, the alignment films 22 and 32 including the compound-subjected-to-alignment-process were formed in both of the TFT substrate 20 and the CF substrate 30. Thus, the liquid crystal display (liquid crystal display element) illustrated in FIG. 11 providing the pretilt to the liquid crystal molecules 41A and 41B close to the TFT substrate 20 and the CF substrate 30 was able to be completed. Finally, a pair of polarizing plates with absorption axes thereof being orthogonal to each other were bonded to outside of the liquid crystal display.

Example 1B

In Example 1B, the same steps as those in Example 1A were performed, except that as the alignment film material, instead of the polyamic acid, an imidization polymer obtained by performing dewatering cyclization on the polyamic acid was used. At that time, after the polyamic acid synthesized in Example 1A was dissolved in N-methyl-2-pyrrolidone, pyridine and an acetic anhydride were added to form a mixture solution, and the mixture solution was reacted for 3 hours at 110° C. to be subjected to dewatering cyclization. Next, a large excess of pure water was injected into the reacted mixture solution to precipitate a reaction product, and after a precipitated solid was separated, the solid was cleaned with pure water. After that, the solid was dried for 15 hours at 40° C. under reduced pressure, thereby obtaining an imidization polymer as the compound-to-be-subjected-to-alignment-process.

Example 1C

In Example 1C, the same steps as those in Example 1A were performed, except that when the polyamic acid was synthesized, instead of the compound including the vertical alignment inducing structure section represented by the expression (B-6), a compound having a vertical alignment inducing structure section represented by the following expression (B-37) was used.

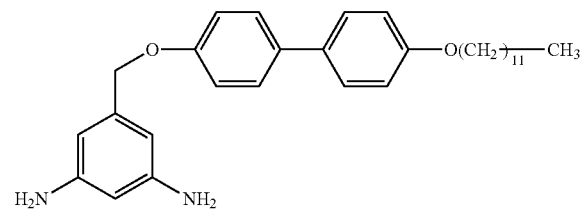

(B-37)

Example 1D

In Example 1D, the same steps as those in Example 1A were performed, except that when the polyamic acid was synthesized, instead of the tetracarboxylic dianhydride represented by the expression (C-2), the tetracarboxylic dianhydride represented by an expression (C-3) was used.

Example 1E

In Example 1E, the same steps as those in Example 1A were performed, except that when the polyamic acid was synthesized, instead of the tetracarboxylic dianhydride represented by the expression (C-2), the tetracarboxylic dianhydride represented by the expression (C-1) was used.

Example 1F

In Example 1F, the same steps as those in Example 1A were performed, except that when the polyamic acid was synthesized, the compound including the crosslinkable functional group represented by the expression (A-7) as the diamine compound was not used, and ultraviolet radiation applied to the liquid crystal cell was changed. More specifically, when the polyamic acid was synthesized, 2 mol of the compound including the vertical alignment inducing structure section represented by the expression (B-6) as the diamine compound was used. Moreover, uniform ultraviolet radiation of 100 mJ (measured at a wavelength of 250 nm) was applied to the liquid crystal cell in a state where an alternating electric field of a rectangular wave with an RMS voltage of 10 volts was applied.

Comparative Example 1A

In Comparative Example 1A, the same steps as those in Example 1A were performed, except that ultraviolet radiation was not applied to the liquid crystal cell.

Comparative Example 1B

In Comparative Example 1B, the same steps as those in Example 1F were performed, except that the ultraviolet radiation applied to the liquid crystal cell was changed to uniform ultraviolet radiation of 500 mJ (measured at a wavelength of 365 nm).

Figure 12:
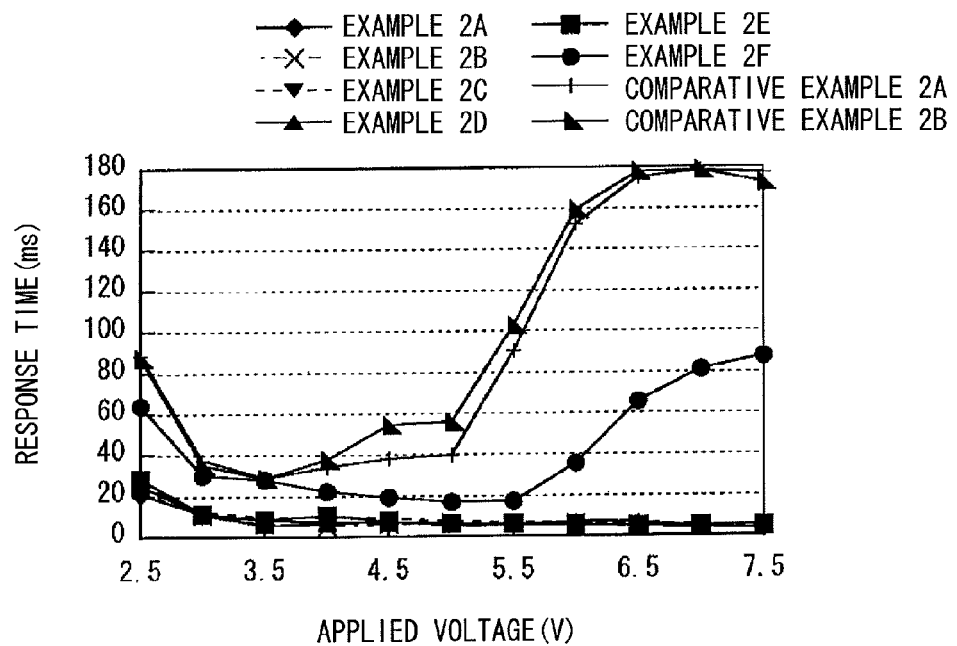
FIG. 12 is a plot illustrating a relationship between applied voltage and response time in Example 1.

When the response time of each of the liquid crystal displays (liquid crystal display elements) of Examples 1A to 1F, Comparative Examples 1A and 1B was measured, results illustrated in FIG. 12 were obtained. When the response time was measured, as a measurement device, LCD5200 (manufactured from Otsuka Electronics Co., Ltd.) was used, and a drive voltage (2.5 V to 7.5 V) was applied between the pixel electrodes 20B and the facing electrode 30B to measure time to increase luminance from 10% to 90% which is equivalent to a gradation level corresponding to the drive voltage.

As illustrated in FIG. 12, in Examples 1A to 1E in which the alignment films 22 and 32 included the polymer compound (the compound-subjected-to-alignment-process) including the polyimide structure with the cross-linked structure, compared to Comparative Examples 1A and 1B in which the polyimide in which the side chain was cross-linked was not included, the response time was reduced. Moreover, in Example 1F in which the alignment films 22 and 32 provided the pretilts θ1 and θ2 to the liquid crystal molecules 41A and 41B by decomposition of the polyimide, the response time was longer than that in Examples 1A to 1E, but was shorter than that in Comparative Examples 1A and 1B including the alignment films 22 and 32 in which the polyimide was not decomposed.

In other words, in Examples 1A to 1F, the alignment films 22 and 32 were formed to provide the pretilts θ1 and θ2 to the liquid crystal molecules 41A and 41B, and liquid crystal alignment was favorable. On the other hand, in Comparative Examples 1A and 1B, the same alignment films 22 and 32 as those in Examples 1A to 1F were not formed.

Accordingly, in the VA mode liquid crystal display (liquid crystal display element), in a state where the liquid crystal layer 40 was arranged, the compound-to-be-subjected-to-alignment-process in the alignment films 22 and 32 was cross-linked or the structure of the polymer compound was decomposed to allow the alignment films 22 and 32 to provide the pretilt θ to the liquid crystal molecules 41 in proximity thereto. Therefore, the response speed was allowed to be highly improved. In this case, it was confirmed that without using a large apparatus, the alignment films 22 and 32 capable of providing the pretilt to the liquid crystal molecules 41A and 41B were allowed to be formed. Accordingly, it was confirmed that response characteristics were allowed to be improved easily.

Reference Example 1A

Next, an alignment film was formed by the following steps, and crosslink density thereof was determined. More specifically, an alignment film was formed with use of the alignment film material of Example 1A. In this case, first, after one surface of a glass substrate was coated with the alignment film material (a polyamic acid solution with a solid content concentration of 3 wt %) used in Example 1A with use of a spin coater, a coating film was dried for 80 seconds by a hot plate at 80° C. After that, the glass substrate was heated for 1 hour in an oven at 200° C. in a nitrogen gas atmosphere to form an alignment film (a precursor film) with a thickness of 80 nm (800 angstroms) including the compound-to-be-subjected-to-alignment-process. Next, uniform ultraviolet radiation (random light) of 500 mJ (measured at a wavelength of 365 nm) was applied from the alignment film side of the glass substrate to react the compound-to-be-subjected-to-alignment-process in the precursor film, thereby forming an alignment film including the compound-subjected-to-alignment-process.

Reference Example 1B

The same steps as those in Reference Example 1A were performed, except that when ultraviolet radiation was applied, instead of random light, polarized light of 500 mJ (measured at a wavelength of 365 nm) was applied.

When the crosslink density of each of the alignment films of Reference Examples 1A and 1B was determined, results illustrated in Table 1 were obtained.

When the crosslink density was determined, with use of a reflective FT-IR (Nicoletnexus 470FT-IR; manufactured from Thermo Fisher Scientific K.K.), the infrared spectrum of the alignment film was measured. At that time, first, the infrared spectrum (reflection) of an alignment film (a precursor film) before being irradiated with ultraviolet radiation was measured, and an absorption peak area (an absorption peak area in the precursor film) at a wave number of 1642 $cm^{-1}$ was determined from the spectrum. The absorption peak at the wave number of 1642 $cm^{-1}$ was derived from stretching vibration of a cross-linking carbon double bond (C=C) of a crosslinkable functional group (a chalcone group) introduced into a polyimide. Next, the infrared spectrum of the alignment film irradiated with ultraviolet radiation was measured in the same manner as that described above to determine an absorption peak area (an absorption peak area in the alignment film irradiated with ultraviolet radiation) at a wave number of 1642 $cm^{-1}$. The crosslink density (%)=[1−(the absorption peak area of the alignment film irradiated with ultraviolet radiation/the absorption peak area of the precursor film)]× 100 was determined from the absorption peak areas before and after application of ultraviolet radiation.

TABLE 1

| | Ultraviolet Radiation (Outside Light) [Peak Wavelength: 365 nm] | | Crosslink Density |
|---|---|---|---|
| | Kind | Irradiance (milli-J) | (%) |
| Reference Example 1A | Random Light | 500 | 71.2 |
| Reference Example 1B | Polarized Light | 50o | 47.7 |

As illustrated in Table 1, in Reference Example 1A in which random light was applied, the crosslink density was 71.2% which was much higher than the crosslink density of 47.7% in Reference Example 1B in which polarized light was applied. This result indicated the following. The crosslinkable functional group in the precursor film was directed in a random direction by thermal motion. In the case where random light (non-polarized light) was applied in that case, when a physical distance between the crosslinkable functional groups came closer by thermal motion, the crosslinkable functional groups were reacted to crosslink side chains. However, when the polarized light was applied, by thermal motion, a polarization direction and the direction of a reaction part (a cross-linking C=C bond in a chalcone group) of the crosslinkable functional group were aligned in a predetermined direction and the physical distance came closer, the crosslinkable functional groups were reacted to crosslink side chains. Therefore, in the case where random light was used as ultraviolet radiation for cross-linking, compared to the case where polarized light was used, crosslink density in the alignment film was increased.

Therefore, it was confirmed that in the case where the alignment film including a polymer compound with a cross-linked structure was formed by application of ultraviolet radiation, when random light as ultraviolet radiation was used, crosslink density was allowed to be increased. Accordingly, it was suggested that in a liquid crystal display (liquid crystal display element) including an alignment film with high crosslink density formed in such a manner, reliability was improved.

Example 2

Example 2A

In Example 2A, a liquid crystal display (liquid crystal display element) illustrated in FIG. 1 was formed by the following steps. More specifically, first, the TFT substrate 20 and the CF substrate 30 were prepared. As the TFT substrate 20, a substrate in which the pixel electrodes 20B made of ITO with a slit pattern (with a line width of 4 μm and a space of 4 μm: the slit section 21) were formed on one surface of the glass substrate 20A with a thickness of 0.7 mm was used. Moreover, as the CF substrate 30, a substrate in which the facing electrode 30B made of ITO was formed on the whole color filter of the glass substrate 30A with a thickness of 0.7 mm with the color filter formed thereon was used. An oblique electric field was added between the TFT substrate 20 and the CF substrate 30 by the slit pattern formed on the pixel electrodes 20B. Next, a 3.5-μm spacer projection was formed on the TFT substrate 20 with use of a photosensitive acrylic resin PC-335 (manufactured from JSR Corporation).

On the other hand, the alignment film material was prepared. In this case, first, the compound including the crosslinkable functional group represented by the expression (A-8) as a diamine compound, the compound including the vertical alignment inducing structure section represented by the expression (B-4), the compound represented by the expression (D-4) including the skeleton represented by the expression (4), and the tetracarboxylic dianhydride represented by the expression (C-2) were dissolved in NMP at a ratio illustrated in Table 2. Next, after the solution was reacted for 4 hours at 60° C., and a large excess of methanol was injected into the reacted solution to precipitate a reaction product. Next, after a precipitated solid was separated, the solid was cleaned with methanol, and dried for 15 hours at 40° C. under reduced pressure, thereby synthesizing a polyamic acid which was a polymer compound precursor as the compound-to-be-subjected-to-alignment-process. Finally, after 3.0 g of the obtained polyamic acid was dissolved in NMP to form a solution with a solid content concentration of 3 wt %, the solution was filtered through a 0.2-μm filter.

Next, after the TFT substrate 20 and the CF substrate 30 were coated with the prepared alignment film material with use of a spin coater, coating films were dried for 80 seconds by a hot plate at 80° C. Next, the TFT substrate 20 and the CF substrate 30 were heated for 1 hour in an oven at 200° C. in a nitrogen gas atmosphere. Therefore, the alignment films 22 and 32 with a thickness of 90 nm were formed on the pixel electrodes 20B and the facing electrode 30B.

Next, a seal section was formed by coating an edge of a pixel section on the CF substrate 30 with an ultraviolet curable resin, and a liquid crystal material made of MLC-7029 (manufactured from Merck Ltd.) as a negative liquid crystal was dropped in a portion surrounded by the seal section. After that, the TFT substrate 20 and the CF substrate 30 with the pixel electrodes 20B and the facing electrode 30B facing each other were bonded together, and the seal section was cured. Next, the seal section was heated for 1 hour in an oven at 120° C. to be completely cured. Therefore, the liquid crystal layer 40 was sealed, and a liquid crystal cell was able to be completed.

Next, in a state where an alternating electric field (60 Hz) of a rectangular wave with an RMS voltage of 10 volts was applied to the liquid crystal cell formed in such a manner, uniform ultraviolet radiation of 500 mJ (measured at a wavelength of 365 nm) was applied to react the compound-to-be-subjected-to-alignment-process in the alignment films 22 and 32. Therefore, the alignment films 22 and 32 including the compound-subjected-to-alignment-process were formed in both of the TFT substrate 20 and the CF substrate 30. Thus, the liquid crystal display (liquid crystal display element) illustrated in FIG. 1 providing the pretilt to the liquid crystal molecules 41A and 41B on the TFT substrate 20 side and the CF substrate 30 side was able to be completed. Finally, a pair of polarizing plates with that absorption axes thereof being orthogonal to each other were bonded to outside of the liquid crystal display.

Example 2B and Example 2C

In Example 2B and Example 2C, the same steps as those in Example 2A were performed, except that when the alignment film material was prepared, the compound including the crosslinkable functional group represented by the expression (A-8), the compound including the vertical alignment inducing structure section represented by the expression (B-4), the compound represented by the expression (D-4) and the tetracarboxylic dianhydride represented by the expression (C-2) were used at a ratio illustrated in Table 2.

Comparative Example 2

In Comparative Example 2, the same steps as those in Example 2C were performed, except that instead of the compound represented by the expression (D-4), a compound represented by an expression (F-1) was used to prepare the alignment film material.

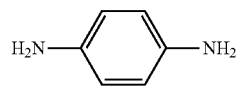
(F-1)

Figure 13:
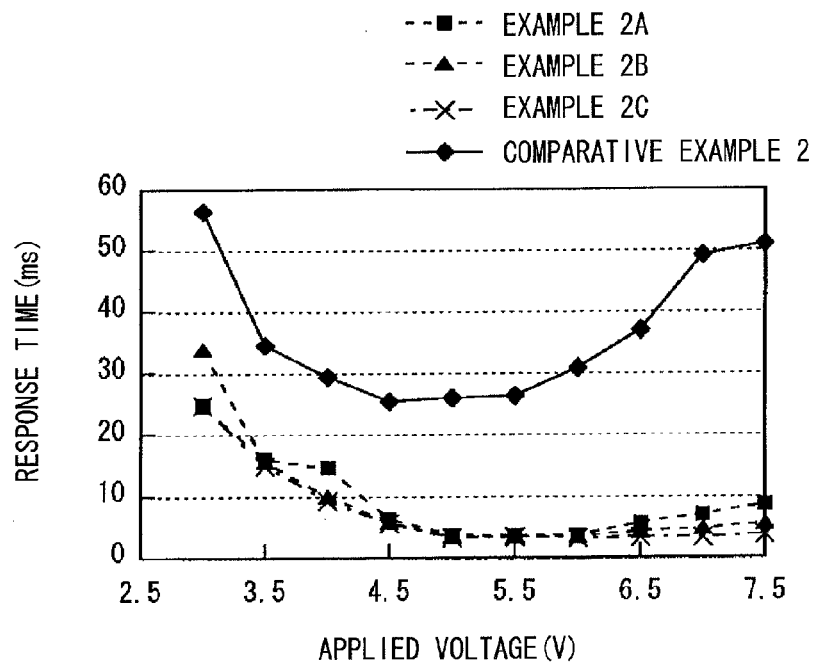
FIG. 13 is a plot illustrating a relationship between applied voltage and response time in Example 2.

When the pretilt θ and the film density of the alignment films 22 and 32 in the liquid crystal displays (liquid crystal display elements) of Examples 2A to 2C and Comparative Example 2 were measured and the response time was measured as in the case of Example 1A and the like, results illustrated in Table 2 and FIG. 13 were obtained.

The pretilt θ of the liquid crystal molecules 41 was determined by a crystal rotation method with use of He—Ne laser light based on a known method (a method described in T. J. Scheffer et al., J. Appl. Phys., vol. 19, p. 2013, 1980). The same method of measuring the pretilt θ was used also in the following various examples and comparative examples. Note that as described above and as illustrated in FIG. 2, the pretilt θ is an inclined angle of the director D of the liquid crystal molecule 41 (41A, 41B) with respect to a Z direction in a state where a drive voltage is off, where Z is a direction perpendicular to (normal to) the surfaces of the glass substrates 20A and 30A.

When the film density of the alignment films 22 and 32 was determined, after the liquid crystal display was disassembled and the surfaces of the alignment films 22 and 32 were cleaned, X-ray reflectivity of the alignment films 22 and 32 was measured by an X-ray reflectivity method. Fitting of the measurement values with respect to the theoretical X-ray reflectivity curve was performed to determine film density.

TABLE 2

| | Alignment Material (molar ratio: %) | | | | | Pretilt (degrees) | Film Density (g/cm³) | Response Speed (milliseconds) |
| --- | --- | --- | --- | --- | --- | --- | --- | --- |
| | Expression (A-8) | Expression (B-4) | Expression (D-4) | Expression (E-1) | Expression (C-2) | | | |
| Example 2A | 32.5 | 2.5 | 15 | 0 | 50 | 0.2 | 1.292 | 8.6556 |
| Example 2B | 22.5 | 2.5 | 25 | 0 | 50 | 0.3 | 1.291 | 5.4730 |
| Example 2C | 12.5 | 2.5 | 35 | 0 | 50 | 1.5 | 1.261 | 3.6996 |
| Comparative Example 2 | 12.5 | 2.5 | 0 | 35 | 50 | 0.1 | 1.384 | 50.985 |

As illustrated in Table 2 and FIG. 13, in Examples 2A to 2C in which the compound-subjected-to-alignment-process in the alignment films 22 and 32 included the skeleton represented by the expression (4), compared to Comparative Example 2 in which the skeleton was not included, the pretilt θ of the liquid crystal molecules 41A and 41B was increased, and the film density of the alignment films 22 and 32 was reduced. Then, in Examples 2A to 2C, the response time was reduced, compared to Comparative Example 2. Moreover, when Examples 2A to 2C were compared to one another, the higher content of the skeleton represented by the expression (4) was included in the compound-subjected-to-alignment-process, the more the film density was reduced, and the more the pretilt θ was increased, thereby reducing the response time accordingly.

This result indicated the following. Namely, when the skeleton represented by the expression (4) was included in the main chain of the compound-to-be-subjected-to-alignment-process, in the alignment films 22 and 32, gaps were formed between the twisted main chains of the compound-to-be-subjected-to-alignment-process, because the skeleton was sterically bulky, and the alignment films 22 and 32 were formed in a state where the density thereof was sparse. Next, after the liquid crystal layer 40 was sealed, when a predetermined electric field was applied to the liquid crystal layer 40, some of the liquid crystal molecules 41 in proximity to the alignment films 22 and 32 were embedded in the gaps in the compound-to-be-subjected-to-alignment-process of the alignment films 22 and 32, and were aligned to have predetermined inclination with respect to the substrate surface with some other liquid crystal molecules 41. The pretilt θ was provided to the liquid crystal molecules 41A and 41B in proximity to the alignment films 22 and 32 by cross-linking the side chain of the compound-to-be-subjected-to-alignment-process in this state, and the liquid crystal molecules 41 embedded in the gaps in the compound-to-be-subjected-to-alignment-process were fixed to be supported by the compound-subjected-to-alignment-process. Therefore, the liquid crystal molecules 41A and 41B fixed in the alignment films 22 and 32 provided the pretilt θ to the liquid crystal molecules 41A and 41B in proximity thereto. Therefore, the ratio of the liquid crystal molecules 41A and 41B having the pretilt θ in the liquid crystal layer 40 was increased to improve response speed.

Moreover, in this case, there was a tendency that when the film density was 1.30 g/cm$^3$ or less, the pretilts θ1 and θ2 were favorably provided to the liquid crystal molecules 41A and 41B to reduce the response time. In this case, it was suggested that when the film density of the alignment films 22 and 32 was within a range of 1.20 g·cm$^3$ to 1.29 g/cm$^3$ both inclusive, the response time was further reduced.

Note that in Examples 2A to 2C, results in the case where the compound-subjected-to-alignment-process in the alignment films 22 and 32 included the skeleton represented by the expression (4) was described; however, also in the case where the skeletons represented by the expressions (1) to (3) and the expressions (5) to (11) were included instead of the skeleton represented by the expression (4), the same result as those in Examples 2A to 2C was obtained.

Accordingly, in the VA mode liquid crystal display (liquid crystal display element), the following was confirmed. The alignment films 22 and 32 included the crosslinkable functional group as the side chain, and obtained the compound-subjected-to-alignment-process from the compound-to-be-subjected-to-alignment-process including one or more kinds of the skeletons represented by the expressions (1) to (11) in the main chain, and the compound-subjected-to-alignment-process provided the pretilts θ1 and θ2 to the liquid crystal molecules 41A and 41B. Therefore, the response characteristics were allowed to be further improved.

Example 3

Examples 3A to 3J and Examples 3a to 3j

In Example 3A, equal amounts of cyclobutane-1,2,3,4-tracarboxylic acetic dianhydride and a specific diamine compound represented by the expression (E-1) and γ-butyrolactone were dissolved in NMP, and the solution was reacted for 4 hours at 60° C. Next, the obtained reacted solution was injected into methanol to precipitate a reaction product. After that, a precipitated substance was separated, and cleaned with methyl alcohol, and was dried for 10 hours at 45° C. under reduced pressure. Therefore, a polyamic acid which was a polymer compound precursor as the compound-to-be-subjected-to-alignment-process was synthesized. Finally, after the obtained polyamic acid was dissolved in NMP to form a solution with a solid content concentration of 3 wt %, the solution was filtered through a 0.2-μm filter. A polyamic acid solution synthesized in such a manner is called "polyamic acid a".

In Example 3a, the polyamic acid obtained in Example 3A was dissolved in NMP, and pyridine and an acetic anhydride was added, and the solution was imidized for 3 hours at 110° C. to perform dewatering cyclization. Next, precipitation, separation, cleaning and drying of a reaction product were performed to obtain a polyimide. Finally, after the obtained polyimide was dissolved in NMP to form a solution with a solid content concentration of 3 wt %, the solution was filtered through a 0.2-μm filter. The polyimide solution synthesized in such a manner is called "polyimide a".

By the same steps as those in Example 3A except that instead of the specific diamine compound represented by the expression (E-1), the expressions (E-2) to (E-6), the expression (D-1), the expression (D-3), the expression (D-7) and the expression (D-6) were used, "a polyamic of Example 3B", "a polyamic of Example 3C", "a polyamic of Example 3D", "a polyamic of Example 3E", "a polyamic of Example 3F", "a polyamic of Example 3G", "a polyamic of Example 3H", "a polyamic of Example 3I", and "a polyamic of Example 3J" were obtained. Next, by the same steps as those in Example 3a except that instead of the polyamic acid a, these 9 kinds of polyamic acids were used, "a polyamide of Example 3b", "a polyimide of Example 3c", "a polyimide of Example 3d", "a polyimide of Example 3e", "a polyimide of Example 3f", "a polyimide of Example 3g", "a polyimide of Example 3h", "a polyamide of Example 3I" and "a polyimide of Example 3j" were obtained. Moreover, by the same steps as those in Example 3A except that instead of the specific diamine compound represented by the expression (E-1), the expression (F-1) was used, "a polyamic acid of Comparative Example 3A" was obtained. Next, by the same steps as those in Example 3a except that instead of the polyamic acid a, the polyamic acid of Comparative Example 3A was used, "a polyimide of Comparative Example 3b" was obtained.

Then, after the TFT substrate 20 and the CF substrate 30 were coated with the alignment film material made of one of these polyamic acids and polyimides with use of a spin coater, the coating films were dried for 80 seconds by a hot plate at 80° C. Next, TFT substrate 20 and the CF substrate 30 were heated for 1 hour in an oven at 200° C. in a nitrogen gas atmosphere. Therefore, the alignment films 22 and 32 with a thickness of 90 nm were formed on the pixel electrodes 20B and the facing electrode 30B. Next, a seal section was formed by coating an edge of a pixel section on the CF substrate 30 with an ultraviolet curable resin including silica particles with a particle diameter of 4 µm, and a liquid crystal material made of MLC-7029 (manufactured from Merck Ltd.) as a negative liquid crystal was dropped in a portion surrounded by the seal section. After that, the TFT substrate 20 and the CF substrate 30 were bonded together to allow a center of a line portion of each pixel electrode 20B and the slit section 31 of the facing electrode 30B to face each other, and the seal section was cured. Next, the seal section was heated for 1 hour in an oven at 120° C. to be completely cured. Therefore, the liquid crystal layer 40 was sealed, and a liquid crystal cell was able to be completed.

Next, in a state where an alternating electric field (60 Hz) of a rectangular wave with an RMS voltage of 20 volts was applied to the liquid crystal cell formed in such a manner, uniform ultraviolet radiation of 500 mJ (measured at a wavelength of 365 nm) was applied to react the compound-to-be-subjected-to-alignment-process in the alignment films 22 and 32. Therefore, the alignment films 22 and 32 including the compound-subjected-to-alignment-process were formed in both of the TFT substrate 20 and the CF substrate 30. Thus, the liquid crystal display (liquid crystal display element) illustrated in FIG. 4 providing the pretilt to the liquid crystal molecules 41A and 41B on the TFT substrate 20 side and the CF substrate 30 side was able to be completed. Finally, a pair of polarizing plates with absorption axes thereof being orthogonal to each other were bonded to outside of the liquid crystal display. The pretilt angle measurement values and the characteristic results of liquid crystal molecules in the liquid crystal displays (liquid crystal display elements) of Examples 3A to 3J and Examples 3a to 3j are illustrated in Table 3. It was obvious from Table 3 that the liquid crystal displays (liquid crystal display elements) using the polyamic acids of Examples 3A to 3J and the polyimides of Examples 3a to 3j had much higher response speed than the liquid crystal displays (liquid crystal display elements) using the polyamic acid of Comparative Example 3A and the polyimide of Comparative Example 3a. Note that in Table 3, the "response speed" was measured as in the case of Examples 1 to 6.

TABLE 3

| Polyamic Acid | Polyimide | Pretilt (degrees) | Response Speed (milliseconds) |
|---|---|---|---|
| Example 3A | | 0.9 | 8.73 |
| | Example 3a | 1.1 | 8.84 |
| Example 3B | | 1.3 | 9.24 |
| | Example 3b | 1.5 | 8.24 |
| Example 3C | | 1.2 | 10.24 |
| | Example 3c | 1.0 | 9.43 |
| Example 3D | | 1.5 | 8.34 |
| | Example 3d | 1.3 | 9.29 |
| Example 3E | | 1.0 | 7.54 |
| | Example 3e | 0.9 | 8.33 |
| Example 3F | | 1.1 | 8.55 |
| | Example 3f | 0.9 | 8.74 |
| Example 3G | | 1.2 | 9.84 |
| | Example 3g | 1.0 | 9.32 |
| Example 3H | | 1.1 | 8.72 |
| | Example 3h | 0.9 | 7.43 |
| Example 3I | | 1.0 | 8.74 |
| | Example 3i | 1.0 | 8.75 |
| Example 3J | | 0.9 | 8.23 |
| | Example 3j | 1.1 | 7.24 |
| Comparative Example 3A | | 0.2 | 50.99 |
| | Comparative Example 3a | 0.1 | 56.34 |

Example 4

Example 4 relates to the liquid crystal displays (liquid crystal display elements) according to the fifth to eighth modes and the methods of manufacturing a liquid crystal display (liquid crystal display element) according to the fifth to twelfth modes of the invention. In Example 4, the compound-to-be-subjected-to-alignment-process/compound-subjected-to-alignment-process including a photosensitive functional group was used. More specifically, azobenzene-based compounds represented by the following expressions (AZ-11) to (AZ-17) were used as the compound-to-be-subjected-to-alignment-process including a photosensitive functional group, and as described in Example 1A, the liquid crystal displays with the same structure and configurations as those illustrated in FIG. 11 were formed, and the response characteristics thereof were determined.

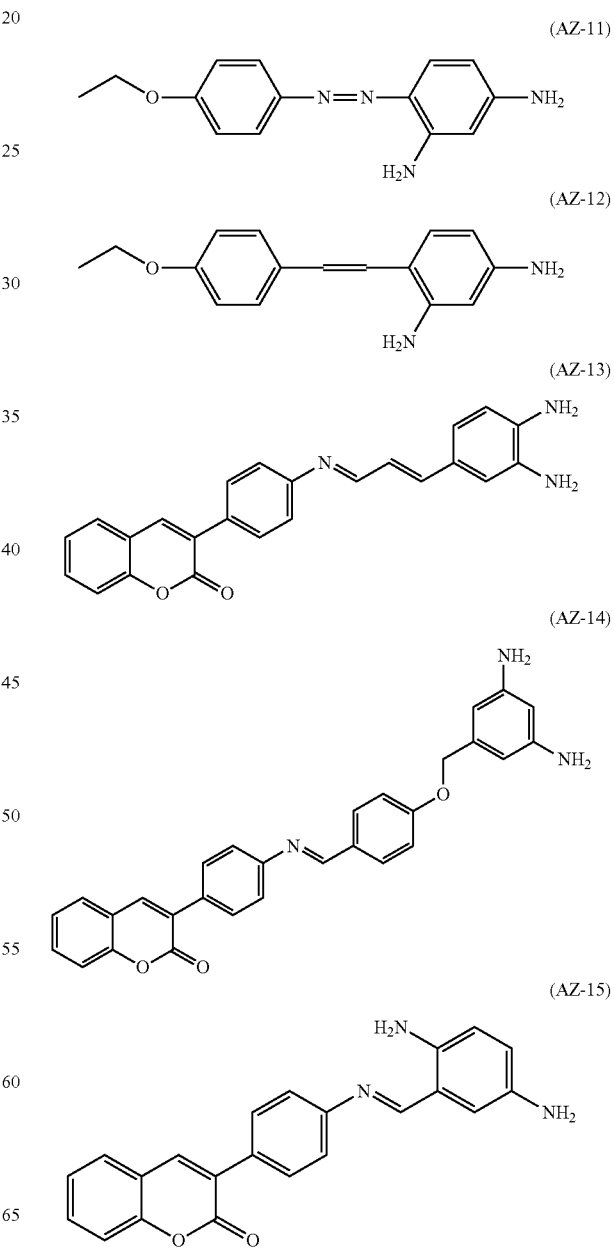

-continued

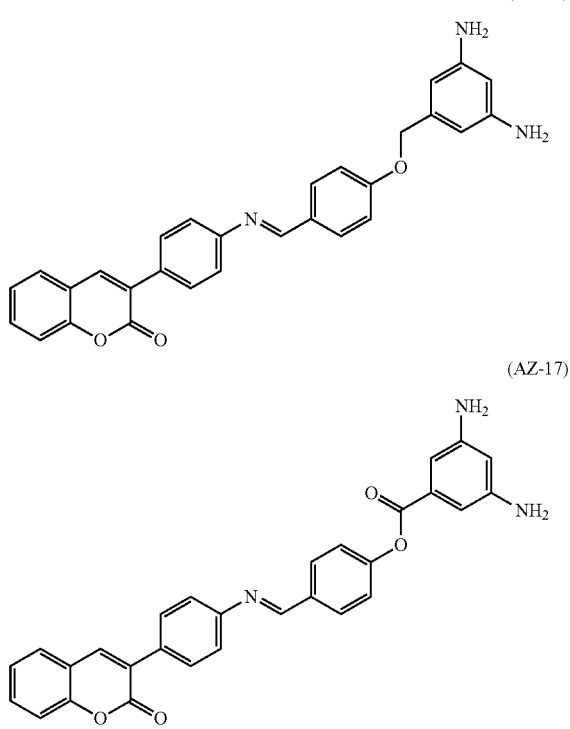

(AZ-16)

(AZ-17)

In Example 4, after the TFT substrate 20 and the CF substrate 30 were coated with a polyimide material including a compound represented by the expression (AZ-11) and a compound represented by the expression (A-16) at a weight ratio of 9:1 as diamine materials and the tetracarboxylic dianhydride represented by the expression (C-2) as an acid dianhydride with use of a spin coater, coating films were dried for 80 seconds by a hot plate at 80° C. Next, the TFT substrate 20 and the CF substrate 30 were heated for 1 hour in an oven at 200° C. in a nitrogen gas atmosphere. Therefore, the alignment films 22 and 32 with a thickness of 90 nm were formed on the pixel electrodes 20B and the facing electrode 30B.

Next, a seal section was formed by coating an edge of a pixel section on the CF substrate 30 with an ultraviolet curable resin including silica particles with a particle diameter of 3.5 μm, and a liquid crystal material made of MLC-7029 (manufactured from Merck Ltd.) which was a negative liquid crystal was dropped in a portion surrounded by the seal section. After that, the TFT substrate 20 and the CF substrate 30 were bonded together to allow a center of a line portion of each pixel electrode 20B and the slit section 31 of the facing electrode 30B to face each other, and the seal section was cured. Next, the seal section was heated for 1 hour in an oven at 120° C. to be completely cured. Therefore, the liquid crystal layer 40 was sealed, and a liquid crystal cell was able to be completed.

Next, in a state where an alternating electric field (60 Hz) of a rectangular wave with an RMS voltage of 20 volts was applied to the liquid crystal cell formed in such a manner, uniform ultraviolet radiation of 500 mJ (measured at a wavelength of 365 nm) was applied to deform the compound-to-be-subjected-to-alignment-process in the alignment films 22 and 32. Therefore, the alignment films 22 and 32 including the compound-subjected-to-alignment-process (deformed polymer compound) were formed in both of the TFT substrate 20 and the CF substrate 30. Thus, the liquid crystal display (liquid crystal display element) providing the pretilt to the liquid crystal molecules 41A and 41B on the TFT substrate 20 side and the CF substrate 30 side was able to be completed. Finally, a pair of polarizing plates with absorption axes thereof being orthogonal to each other were bonded to outside of the liquid crystal display.

Liquid crystal displays (liquid crystal display elements) were completed in the same manner as that described above with use of compounds represented by expressions (AZ-12) to (AZ-17) instead of the compound represented by the expression (AZ-11).

For the sake of comparison, a liquid crystal display (liquid crystal display element) was completed in the same manner as that described above with use of a compound represented by the following expression instead of the compound represented by the expression (AZ-11). Note that the liquid crystal display (liquid crystal display element) is called Comparative Example 4.

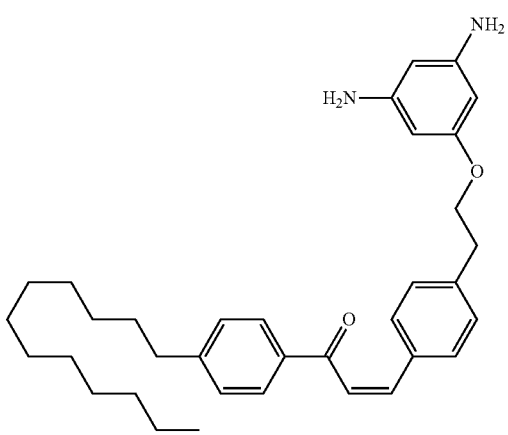 [SMILES: CCCCCCCCCCCCc1ccc(C(=O)/C=C\c2ccc(CCOc3cc(N)cc(N)c3)cc2)cc1]

Then, when the pretilt θ and the response time of each of the liquid crystal displays (liquid crystal display elements) formed in such a manner were measured, results illustrated in Table 4 were obtained.

TABLE 4

| Used Compound | Pretilt (degrees) | Response Speed (milliseconds) |
|---|---|---|
| Expression (AZ-11) | 0.5 | 18.2 |
| Expression (AZ-12) | 0.4 | 19.3 |
| Expression (AZ-13) | 1.2 | 12.0 |
| Expression (AZ-14) | 1.4 | 11.7 |
| Expression (AZ-15) | 0.9 | 15.2 |
| Expression (AZ-16) | 1.5 | 10.3 |
| Expression (AZ-17) | 1.4 | 11.4 |
| Comparative Example 4 | 0.1 | 51.0 |

It was obvious from Table 6 that the response speed in Example 4 was much higher than that in Comparative Example 4. Moreover, in Comparative Example 4, the pretilt θ was hardly provided.

Although the present invention is described referring to preferred embodiments and examples, the invention is not limited thereto, and may be variously modified. For example, in the embodiments and the examples, the VA mode liquid crystal display (liquid crystal display element) is described; however, the invention is not limited thereto, and is applicable to any other display modes such as a TN mode, an IPS (In-Plane Switching) mode, a FFS (Fringe Field Switching) mode and an OCB (Optically Compensated Bend) mode. In this case, the same effects are also obtained. However, in the invention, compared to the case where a pretilt process is not performed, in the VA mode, a specifically higher effect of improving response characteristics is allowed to be exerted, compared to the IPS mode or the FFS mode.

Moreover, in the embodiments and the examples, the transmissive liquid crystal display (liquid crystal display element) is exclusively described; however, the invention is not limited thereto, and may be applied to a reflective liquid crystal display (liquid crystal display element). In the case of the reflective liquid crystal display (liquid crystal display element), the pixel electrode is made of an electrode material having light reflectivity such as aluminum.

The invention claimed is:

1. A liquid crystal display comprising:
   a pair of substrates with facing surfaces;
   a pair of alignment films arranged on the facing surfaces of the pair of substrates;
   a liquid crystal layer including liquid crystal molecules arranged between the pair of alignment films, wherein,
   one or both of the pair of alignment films includes a compound including a polymer compound with a cross-linked side chain, the polymer compound including (i) a crosslinkable functional group as a side chain and (ii) at least one of a skeleton represented by expressions (1), (2), (3), (5), (6), (7), (8), or (9) in a main chain,
   the compound with the cross-linked side chain provides a pretilt to the liquid crystal molecules in the liquid crystal layer, and
   expressions (1), (2), (3), (5), (6), (7), (8), and (9) are:

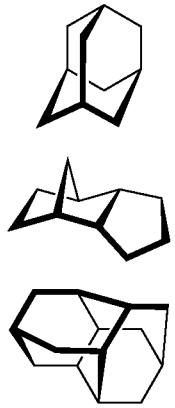

(1)

(2)

(3)

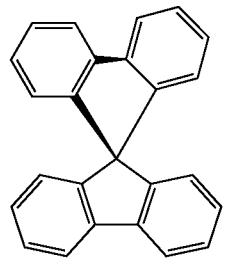

(5)

(6)

(7)

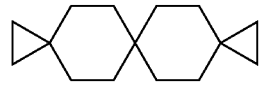

(8)

(9)

2. The liquid crystal display according to claim 1, wherein the pair of alignment films have the same composition.

3. The liquid crystal display according to claim 1, wherein the main chain includes an imide bond in a repeating unit.

4. The liquid crystal display according to claim 1 wherein the film density of one of the pair of alignment films is 1.30 g/cm$^3$ or less.

5. The liquid crystal display according to claim 1, wherein the compound includes a structure aligning liquid crystal molecules in a predetermined direction with respect to the pair of substrates.

6. The liquid crystal display according to claim 1, wherein the pair of substrates are configured of a substrate including a pixel electrode and a substrate including a facing electrode, and liquid crystal molecules have negative dielectric anisotropy.

7. The liquid crystal display according to claim 1, wherein in one or both of the pair of substrates, an electrode having a slit or a projection is provided on the liquid crystal layer side.

* * * * *